United States Patent
Kwan et al.

(10) Patent No.: US 12,388,763 B1
(45) Date of Patent: Aug. 12, 2025

(54) VISIBILITY SAMPLING

(71) Applicant: Innovium, Inc., Santa Clara, CA (US)

(72) Inventors: Bruce Hui Kwan, Santa Clara, CA (US); William Brad Matthews, Los Gatos, CA (US); Puneet Agarwal, Santa Clara, CA (US)

(73) Assignee: Innovium, Inc., Santa Clara, CA (US)

( * ) Notice: Subject to any disclaimer, the term of this patent is extended or adjusted under 35 U.S.C. 154(b) by 0 days.

(21) Appl. No.: 18/396,621

(22) Filed: Dec. 26, 2023

Related U.S. Application Data

(63) Continuation of application No. 17/385,503, filed on Jul. 26, 2021, now Pat. No. 11,855,901, which is a continuation of application No. 16/595,127, filed on Oct. 7, 2019, now Pat. No. 11,075,847, which is a continuation-in-part of application No. 15/407,159, filed on Jan. 16, 2017, now Pat. No. 10,735,339.

(51) Int. Cl.
*H04L 47/31* (2022.01)
*H04L 45/00* (2022.01)
*H04L 47/2441* (2022.01)
*H04L 47/33* (2022.01)

(52) U.S. Cl.
CPC .............. *H04L 47/31* (2013.01); *H04L 45/38* (2013.01); *H04L 47/2441* (2013.01); *H04L 47/33* (2013.01)

(58) Field of Classification Search
CPC ....................................................... H04L 47/31
See application file for complete search history.

(56) References Cited

U.S. PATENT DOCUMENTS

| | | | |
|---|---|---|---|
| 5,805,602 | A | 9/1998 | Cloutier et al. |
| 6,011,805 | A | 1/2000 | Esteve et al. |
| 6,373,399 | B1 | 4/2002 | Johnson et al. |
| 6,625,151 | B1 | 9/2003 | Alowersson et al. |
| 6,650,621 | B1 | 11/2003 | Maki-Kullas |
| 6,721,316 | B1 | 4/2004 | Epps et al. |

(Continued)

FOREIGN PATENT DOCUMENTS

CN 111183624 A 5/2020

OTHER PUBLICATIONS

U.S. Appl. No. 16/741,510, Notice of Allowance dated Feb. 18, 2021.

(Continued)

*Primary Examiner* — Abdeltif Ajid
(74) *Attorney, Agent, or Firm* — Shield Intellectual Property PC; Kirk D. Wong

(57) ABSTRACT

In response to certain events in a network device, visibility packets may be generated. A visibility packet may be or comprise at least a portion of a packet that is in some way associated with the event, such as a packet that was dropped as a result of an event, or that was in a queue at the time of an event related to that queue. A visibility packet may be tagged or otherwise indicated as a visibility packet. The network device may include one or more visibility samplers through which visibility packets are routed on their way to a visibility queue, visibility subsystem, and/or out of the network device. The samplers allow only a limited sample of the visibility packets that they receive to pass through the sampler, essentially acting as a filter to reduce the amount of visibility packets that will be processed.

15 Claims, 20 Drawing Sheets

(56) References Cited

U.S. PATENT DOCUMENTS

| | | |
|---|---|---|
| 6,865,160 B1 | 3/2005 | Bare |
| 6,977,930 B1 | 12/2005 | Epps et al. |
| 7,149,187 B1 | 12/2006 | Jacobson et al. |
| 7,295,562 B1 | 11/2007 | Acharya et al. |
| 7,360,217 B2 | 4/2008 | Melvin et al. |
| 7,382,244 B1 | 6/2008 | Donovan et al. |
| 7,813,348 B1 | 10/2010 | Gupta et al. |
| 7,898,959 B1 | 3/2011 | Arad |
| 8,004,990 B1 | 8/2011 | Callon |
| 8,281,033 B1 | 10/2012 | Riordan et al. |
| 8,588,242 B1 | 11/2013 | Izenberg et al. |
| 9,489,401 B1 | 11/2016 | Garcia et al. |
| 9,565,114 B1 | 2/2017 | Kabbani et al. |
| 9,805,018 B1 | 10/2017 | Richfield |
| 9,979,624 B1 | 5/2018 | Volpe et al. |
| 10,063,488 B2 | 8/2018 | Oran et al. |
| 10,313,255 B1 | 6/2019 | Matthews et al. |
| 10,320,691 B1 | 6/2019 | Matthews et al. |
| 10,389,643 B1 | 8/2019 | Matthews et al. |
| 10,505,849 B1 | 12/2019 | Iny et al. |
| 10,673,770 B1 | 6/2020 | Matthews et al. |
| 10,713,079 B2 | 7/2020 | Muramatti et al. |
| 10,721,187 B1 | 7/2020 | Goldman et al. |
| 10,735,339 B1 | 8/2020 | Matthews et al. |
| 11,044,204 B1 | 6/2021 | Matthews et al. |
| 11,621,904 B1 | 4/2023 | Matthews et al. |
| 11,665,104 B1 | 5/2023 | Matthews et al. |
| 2002/0133617 A1 | 9/2002 | Davies |
| 2003/0093567 A1 | 5/2003 | Lolayekar et al. |
| 2003/0131122 A1 | 7/2003 | Kondo et al. |
| 2003/0142685 A1 | 7/2003 | Bare |
| 2003/0152076 A1 | 8/2003 | Lee et al. |
| 2003/0154328 A1 | 8/2003 | Henderson et al. |
| 2003/0210695 A1 | 11/2003 | Henrion |
| 2003/0231646 A1 | 12/2003 | Chandra et al. |
| 2004/0196790 A1 | 10/2004 | Balakrishnan et al. |
| 2004/0218925 A1 | 11/2004 | Nahm |
| 2005/0007959 A1 | 1/2005 | Tomonaga et al. |
| 2005/0007961 A1 | 1/2005 | Scott et al. |
| 2005/0013248 A1 | 1/2005 | Mekkittikul et al. |
| 2005/0068970 A1 | 3/2005 | Srikrishna et al. |
| 2005/0086363 A1 | 4/2005 | Ji |
| 2005/0281279 A1 | 12/2005 | Dennison et al. |
| 2006/0036821 A1 | 2/2006 | Frey et al. |
| 2006/0067213 A1 | 3/2006 | Evans et al. |
| 2006/0117099 A1 | 6/2006 | Mogul |
| 2006/0218556 A1 | 9/2006 | Nemirovsky et al. |
| 2006/0274760 A1 | 12/2006 | Loher |
| 2007/0028003 A1 | 2/2007 | Rudkin |
| 2007/0091802 A1 | 4/2007 | Pan et al. |
| 2007/0195778 A1 | 8/2007 | Tatar et al. |
| 2007/0280117 A1 | 12/2007 | Katz et al. |
| 2008/0112343 A1 | 5/2008 | Oleszczuk |
| 2008/0212613 A1 | 9/2008 | Perkinson et al. |
| 2008/0259800 A1 | 10/2008 | Clark et al. |
| 2009/0010248 A1 | 1/2009 | Kanai |
| 2009/0028045 A1 | 1/2009 | Stellenberg et al. |
| 2009/0063431 A1 | 3/2009 | Erol et al. |
| 2009/0075668 A1 | 3/2009 | Rao |
| 2009/0109858 A1 | 4/2009 | Yamasaki et al. |
| 2009/0190591 A1 | 7/2009 | Sankaran |
| 2009/0304014 A1 | 12/2009 | Evans et al. |
| 2010/0046524 A1 | 2/2010 | Rune et al. |
| 2010/0091782 A1 | 4/2010 | Hiscock |
| 2010/0309783 A1 | 12/2010 | Howe |
| 2011/0051602 A1 | 3/2011 | Matthews et al. |
| 2011/0205895 A1 | 8/2011 | Chen et al. |
| 2011/0280126 A1 | 11/2011 | Fefer et al. |
| 2012/0008496 A1 | 1/2012 | Saavedra |
| 2012/0063451 A1 | 3/2012 | Keesara et al. |
| 2012/0201241 A1 | 8/2012 | Subramanian et al. |
| 2012/0236860 A1 | 9/2012 | Kompella et al. |
| 2012/0254931 A1 | 10/2012 | Oztaskent et al. |
| 2013/0259037 A1 | 10/2013 | Natarajan et al. |
| 2013/0329577 A1 | 12/2013 | Suzuki et al. |
| 2014/0092736 A1 | 4/2014 | Baillargeon |
| 2014/0105025 A1 | 4/2014 | Lavian et al. |
| 2014/0126396 A1 | 5/2014 | Matthews et al. |
| 2014/0126573 A1* | 5/2014 | Matthews ............... H04L 43/10 370/389 |
| 2014/0169189 A1 | 6/2014 | Kalkunte |
| 2014/0219087 A1* | 8/2014 | Matthews ............... H04L 47/28 370/231 |
| 2014/0247740 A1 | 9/2014 | Koo |
| 2014/0369426 A1 | 12/2014 | Li et al. |
| 2015/0016258 A1 | 1/2015 | Okner et al. |
| 2015/0016266 A1 | 1/2015 | Dumitrescu et al. |
| 2015/0043330 A1 | 2/2015 | Hu et al. |
| 2015/0124608 A1 | 5/2015 | Agarwal et al. |
| 2015/0139540 A1 | 5/2015 | Moraleda et al. |
| 2015/0295827 A1 | 10/2015 | Zhu et al. |
| 2016/0044695 A1 | 2/2016 | Gunner |
| 2016/0072717 A1 | 3/2016 | Ansari et al. |
| 2016/0087894 A1 | 3/2016 | Chen et al. |
| 2016/0134915 A1 | 5/2016 | Oran |
| 2016/0164792 A1 | 6/2016 | Oran |
| 2016/0254992 A1 | 9/2016 | Torvi et al. |
| 2016/0261500 A1 | 9/2016 | Revah et al. |
| 2016/0269284 A1 | 9/2016 | Cheng et al. |
| 2016/0308769 A1 | 10/2016 | Versteeg et al. |
| 2016/0373199 A1 | 12/2016 | Olofsson et al. |
| 2017/0048147 A1 | 2/2017 | Vaidya |
| 2017/0111264 A1 | 4/2017 | Shankarappa et al. |
| 2017/0126547 A1 | 5/2017 | Wood et al. |
| 2017/0134282 A1 | 5/2017 | Agarwal et al. |
| 2017/0149678 A1 | 5/2017 | Dumitrescu et al. |
| 2017/0279728 A1 | 9/2017 | Oran |
| 2017/0339074 A1 | 11/2017 | Melman et al. |
| 2018/0091388 A1 | 3/2018 | Levy et al. |
| 2018/0159800 A1 | 6/2018 | Tietz et al. |
| 2018/0356837 A1 | 12/2018 | Lisewski et al. |
| 2019/0089644 A1 | 3/2019 | Shpiner et al. |
| 2020/0007454 A1 | 1/2020 | Frink |
| 2020/0053026 A1 | 2/2020 | Rangachari et al. |
| 2020/0106710 A1 | 4/2020 | Ryoo et al. |
| 2020/0136973 A1 | 4/2020 | Rahman et al. |
| 2020/0249979 A1 | 8/2020 | Muramatti et al. |
| 2020/0274811 A1 | 8/2020 | Srivastava et al. |
| 2021/0021545 A1 | 1/2021 | Srivastava et al. |
| 2021/0243094 A1 | 8/2021 | Holness et al. |
| 2021/0409313 A1 | 12/2021 | Iorga et al. |
| 2022/0045972 A1 | 2/2022 | Aibester et al. |
| 2022/0150171 A1 | 5/2022 | Matthews et al. |
| 2024/0039852 A1 | 2/2024 | Matthews et al. |

OTHER PUBLICATIONS

U.S. Appl. No. 17/091,904, Non-Final Office Action dated Apr. 28, 2022.

U.S. Appl. No. 17/091,904, Notice of Allowance dated Nov. 17, 2022.

U.S. Appl. No. 17/091,916, Non-Final Office Action dated Mar. 15, 2023.

U.S. Appl. No. 17/091,916, Notice of Allowance dated May 26, 2023.

U.S. Appl. No. 17/091,916, Restriction Requirement dated Sep. 22, 2022.

U.S. Appl. No. 17/352,583, Final Office Action dated May 15, 2023.

U.S. Appl. No. 17/352,583, Non-Final Office Action dated Dec. 22, 2022.

U.S. Appl. No. 17/352,583, Notice of Allowance dated Aug. 9, 2023.

U.S. Appl. No. 17/367,330, Notice of Allowance dated Mar. 24, 2023.

U.S. Appl. No. 17/385,503, Non-Final Office Action dated Apr. 7, 2023.

U.S. Appl. No. 17/385,503, Notice of Allowance dated Aug. 10, 2023.

U.S. Appl. No. 18/108,546, Non-Final Office Action dated Jun. 23, 2023.

U.S. Appl. No. 18/108,546, Notice of Allowance dated Nov. 14, 2023.

(56) References Cited

OTHER PUBLICATIONS

U.S. Appl. No. 18/141,276, Notice of Allowance dated Dec. 20, 2023.
Chinese Patent Office, Application No. 202180089206.4, Office Action dated Jan. 26, 2024.
European Patent Office, Application No. 21890201.3, European Search Report dated Dec. 12, 2023.
Sinha et al. "Harnessing TCP's Burstiness with Flowlet Switching." (2004).
U.S. Appl. No. 15/407,149, Non-Final Office Action dated Aug. 28, 2018.
U.S. Appl. No. 15/407,149, Notice of Allowance dated Jan. 25, 2019.
U.S. Appl. No. 15/407,156, Notice of Allowance dated Jan. 24, 2019.
U.S. Appl. No. 15/407,159, Advisory Action dated Nov. 1, 2019.
U.S. Appl. No. 15/407,159, Final Office Action dated Aug. 13, 2019.
U.S. Appl. No. 15/407,159, Non-Final Office Action dated Jan. 4, 2019.
U.S. Appl. No. 15/407,159, Notice of Allowance dated Mar. 25, 2020.
U.S. Appl. No. 15/410,607, Final Office Action dated Dec. 18, 2018.
U.S. Appl. No. 15/410,607, Non-Final Office Action dated May 17, 2018.
U.S. Appl. No. 15/410,607, Notice of Allowance dated Apr. 3, 2019.
U.S. Appl. No. 15/410,644, Final Office Action dated Oct. 11, 2018.
U.S. Appl. No. 15/410,644, Non-Final Office Action dated May 3, 2018.
U.S. Appl. No. 15/410,644, Notice of Allowance dated Jan. 28, 2019.
U.S. Appl. No. 15/410,651, Final Office Action dated Oct. 11, 2018.
U.S. Appl. No. 15/410,651, Final Office Action dated Jun. 6, 2019.
U.S. Appl. No. 15/410,651, Non-Final Office Action dated May 15, 2018.
U.S. Appl. No. 15/410,651, Non-Final Office Action dated Feb. 15, 2019.
U.S. Appl. No. 15/410,651, Notice of Allowance dated Sep. 24, 2019.
U.S. Appl. No. 15/410,686, Final Office Action dated Nov. 8, 2018.
U.S. Appl. No. 15/410,686, Non-Final Office Action dated May 9, 2018.
U.S. Appl. No. 15/410,686, Notice Of Allowance dated Apr. 9, 2019.
U.S. Appl. No. 15/446,888, Advisory Action dated Mar. 15, 2019.
U.S. Appl. No. 15/446,888, Final Office Action dated Nov. 23, 2018.
U.S. Appl. No. 15/446,888, Non-Final Office Action dated May 10, 2018.
U.S. Appl. No. 15/446,888, Notice of Allowance dated Sep. 24, 2019.
U.S. Appl. No. 15/446,894, Non-Final Office Action dated Jul. 27, 2018.
U.S. Appl. No. 15/446,894, Notice of Allowance dated Feb. 19, 2019.
U.S. Appl. No. 15/446,901, Advisory Action dated Mar. 28, 2019.
U.S. Appl. No. 15/446,901, Final Office Action dated Jan. 15, 2019.
U.S. Appl. No. 15/446,901, Non-Final Office Action dated Aug. 29, 2018.
U.S. Appl. No. 15/446,901, Notice of Allowance dated May 28, 2019.
U.S. Appl. No. 16/288,165, Non-Final Office Action dated Aug. 22, 2019.
U.S. Appl. No. 16/288,165, Notice of Allowance dated Jan. 27, 2020.
U.S. Appl. No. 16/527,278, Non-Final Office Action dated Oct. 13, 2020.
U.S. Appl. No. 16/527,278, Notice of Allowance dated Feb. 19, 2021.
U.S. Appl. No. 16/575,343, Advisory Action dated Jun. 29, 2021.
U.S. Appl. No. 16/575,343, Advisory Action dated Jul. 25, 2022.
U.S. Appl. No. 16/575,343, Final Office Action dated Mar. 31, 2021.
U.S. Appl. No. 16/575,343, Final Office Action dated May 10, 2022.
U.S. Appl. No. 16/575,343, Non-Final Office Action dated Sep. 30, 2020.
U.S. Appl. No. 16/575,343, Non-Final Office Action dated Sep. 28, 2021.
U.S. Appl. No. 16/575,343, Non-Final Office Action dated Sep. 6, 2022.
U.S. Appl. No. 16/575,343, Notice of Allowance dated Jan. 11, 2023.
U.S. Appl. No. 16/595,127, Non-Final Office Action dated Oct. 16, 2020.
U.S. Appl. No. 16/595,127, Notice of Allowance dated Mar. 23, 2021.
World Intellectual Property Organization, Application No. PCT/US22/20087, International Search Report dated Jul. 19, 2022.

* cited by examiner

US 12,388,763 B1

VISIBILITY SAMPLING

PRIORITY CLAIM

This application claims benefit under 35 U.S.C. § 120 as a Continuation of application Ser. No. 17/385,503, filed Jul. 26, 2021, which is a Continuation of application Ser. No. 16/595,127, filed Oct. 7, 2019, now U.S. Pat. No. 11,075,847, issued Jul. 27, 2021, which is a Continuation-in-Part of application Ser. No. 15/407,159, filed on Jan. 16, 2017, now U.S. Pat. No. 10,735,339, issued Aug. 4, 2020, the entire contents of each of which are hereby incorporated by reference for all purposes as if fully set forth herein.

RELATED CASES

This application is related to U.S. patent application Ser. No. 15/410,644, filed on Jan. 19, 2017, now U.S. Pat. No. 10,320,691, issued Jun. 11, 2019, the entire contents of which are hereby incorporated by reference for all purposes as if fully set forth herein.

TECHNICAL FIELD

Embodiments relate generally to network communication, and, more specifically, to techniques for monitoring packet loss and other events within a networking device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As data units are routed through different nodes in a network, the nodes may, on occasion, discard, fail to send, or fail to receive data units, thus resulting in the data units failing to reach their intended destination. The act of discarding a data unit, or failing to deliver a data unit, is typically referred to as "dropping" the data unit. Instances of dropping a data unit, referred to herein as "drops" or "packet loss," may occur for a variety of reasons, such as resource limitations, errors, or deliberate policies. In many cases, the selection of which data units to drop is sub-optimal, leading to inefficient and slower network communications.

Moreover, many devices in networks with complex topologies, such as switches in modern data centers, provide limited visibility into drops and other issues that can occur inside the devices. Such devices can often drop traffic, such as packets, cells, or other data units, without providing sufficient information to determine why the traffic was dropped.

For instance, it is common for certain types of nodes, such as switches, to be susceptible to "silent packet drops," where data units are dropped without being reported by the switch at all. Another common problem is known as a "silent black hole," where a node is unable to forward a data unit due to a lack of valid routing instructions at the node, such as errors or corruption in forwarding table entries. Another common problem is traffic drops or routing errors due to bugs in particular protocols.

Beyond dropping data units, a variety of other low visibility issues may arise in a node, such as inflated latency. Inflated latency refers to instances where the delay in transmission of a data unit exceeds some user expectation of target threshold.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
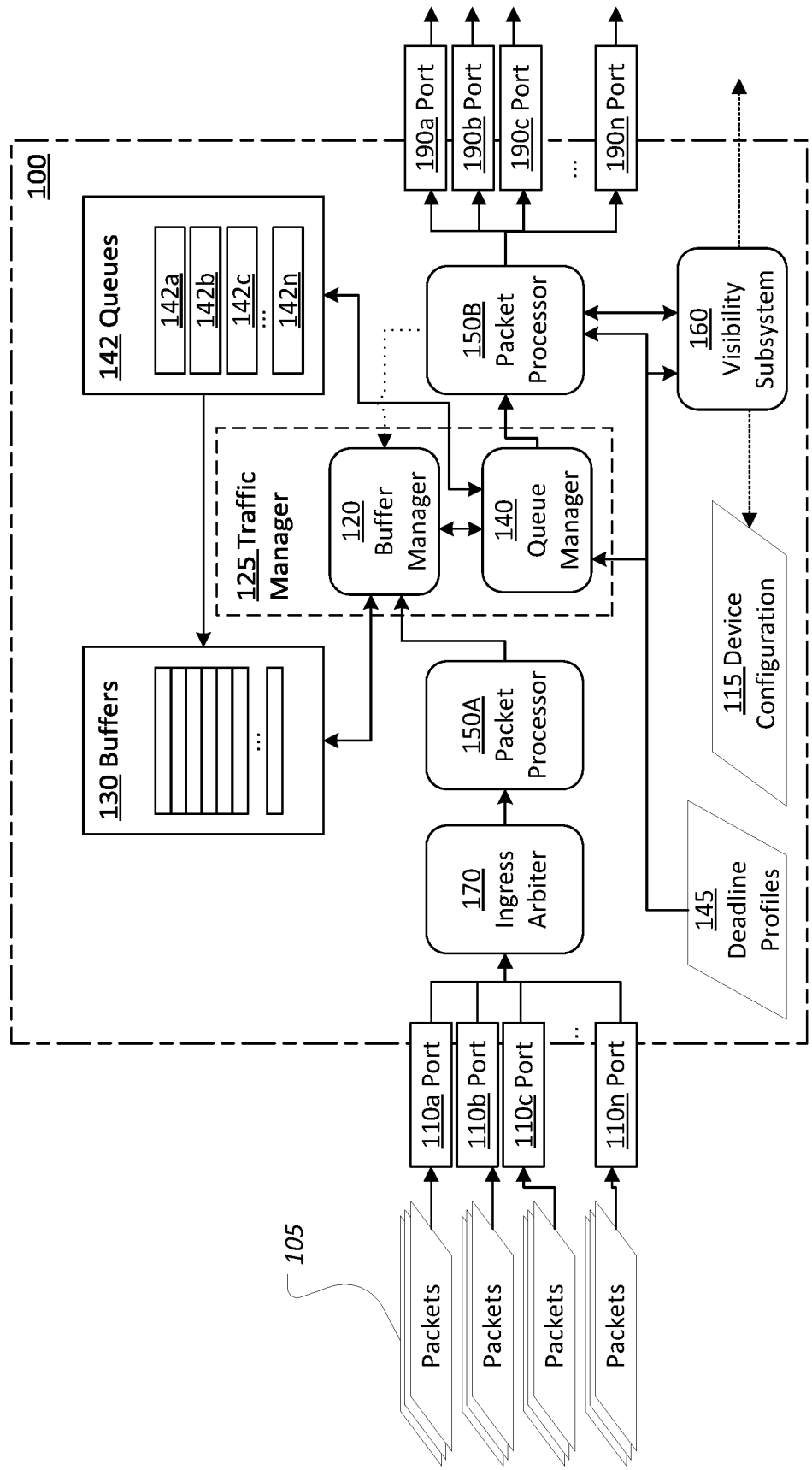
FIG. 1 is an illustrative view of various aspects of an example network device in which techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter. Embodiments are described herein according to the following outline:

- 1.0. General Overview
- 2.0 Structural Overview
  - 2.1. Network
  - 2.2. Ports
  - 2.3. Packet Processing Components
  - 2.4. Traffic Manager
  - 2.5. Ingress Arbiter
  - 2.6. Buffers
  - 2.7. Queues
  - 2.8. Visibility Packets
  - 2.9. Visibility Subsystem
  - 2.10. Visibility Samplers
  - 2.11. Miscellaneous
- 3.0. Functional Overview
  - 3.1 Transforming Packets into Visibility Packets
  - 3.2. Intelligent-Queue-Based Packet Handling
  - 3.3. Marker-Based Delay Tracking
  - 3.4. Drop Visibility and Queue Forensics
  - 3.5. Sampling
- 4.0. Implementation Examples
  - 4.1. Example Delay Tracking Use Case
  - 4.2. Alternative Delay Tracking Techniques
  - 4.3. Healing Engine
  - 4.4. Annotations
- 5.0 Example Embodiments
- 6.0. Implementation Mechanism-Hardware Overview
- 7.0. Extensions and Alternatives 1.0. General Overview Approaches, techniques, and mechanisms are disclosed for, among other aspects, improving the operation of a network device, particularly in situations that lead to, or are likely to lead to, packets being dropped or observations of excessive delays. The device organizes received packets into various queues, in which the packets await processing by associated processing component(s). Queues may be associated with, for instance, different sources, destinations, traffic flows, policies, traffic shapers, and/or processing components. Various logic within the device controls the rate at which packets are "released" from these queues for processing. A packet may pass through any number of queues before leaving a device, depending on the device's configuration and the properties of the packet.

According to an embodiment, queue management logic tracks how long certain packets remain in a queue, and produces a measure of delay for the queue, referred to herein as the "queue delay." In an embodiment, to avoid the potentially prohibitive expense of tracking the delay of each and every individual packet in the queue, certain packets within a queue may be designated as marker packets. The tracking may involve, for instance, tracking the delay of only a single marker packet in the queue at a given time, with the tail of the queue becoming the new marker packet when the marker packet finally leaves the queue. Or, as another example, the tracking may involve tracking delays for two or more marker packets. The queue delay is determined based on the marker packet(s). For example, the queue delay may be the amount of time since the oldest marker packet in the queue entered the queue.

In an embodiment, packets may be tagged with their respective queue delays as they leave their respective queues. In an embodiment, based on a comparison of the current queue delay to one or more thresholds, one or more delay-based actions associated with those threshold(s) may be performed. For instance, state variables associated with the queue may be modified. As another example, packets departing a queue may be tagged with delay classification tags that indicate to the next processing component that the packets should be treated in some special manner on account of the current queue delay. The thresholds may or may not vary depending on the queue and the delay-based action.

One example of such a tag may include, for instance, a delay monitoring tag that indicates that a copy of the packet and/or information about the packet, should be forwarded to a visibility subsystem. Or, as another example, certain tagged packets may be mirrored to the visibility subsystem. Based on the packets forwarded to it, the visibility subsystem may be configured to, for instance, generate logs and reports to provide insight to a network analyst, perform various automated analyses, reconfigure the network device to increase performance, or perform other appropriate actions.

In yet another embodiment, rather than copying or mirroring a packet, a system may temporarily divert certain tagged packets through a visibility subsystem before sending the packets out of the system. The visibility subsystem may opt to update the packet with additional information, such as updated statistics related to the packet. Or, the visibility subsystem may analyze the packet before sending the packet out, and pass configuration instructions or other information back to a packet processor based on the packet.

In an embodiment, delays above a certain threshold are determined to signify that a queue is experiencing excessive delay above a configured deadline. For example, different deadlines may correspond to different levels of delay. If a first deadline is passed, a first tag may be inserted into packets as they depart from the queue. If a second deadline is passed, a second tag may be inserted into packets as they depart from the queue. Any number of deadlines and associated tags may exist.

In an embodiment, delays above a certain threshold are determined to signify that an entire queue has expired. Consequently, the device may drop some or all of the packets within the queue without delivering the packets to their intended destination(s). Normal operations may then resume for the queue once the queue has been cleared, or once the delay has dropped below the threshold, depending on the embodiment. Expired packets may, in some embodiments, be tagged with additional information and diverted to a visibility subsystem, or a copy thereof may be forwarded to the visibility subsystem.

For example, as a result of delays greater than a certain length of time, the information within packets classified as belonging to a certain flow or having certain properties may be assumed to be no longer important to the intended destination of the packets. A queue comprised solely or predominately of traffic from the flow, or of traffic having the certain property, may therefore be associated with an expiration threshold based on the certain length of time. Whenever the queue delay exceeds the threshold, some or all of the packets within the queue simply expire, reducing unnecessary network communication and/or receiver processing of packets that in all likelihood are no longer needed by their respective destination(s).

In an embodiment, metadata associated with a queue and/or annotated to packets belonging in the queue may be utilized to provide greater insight into why a packet assigned to a queue may have been dropped before entering the queue. Such drops occur, for example, when a packet is assigned to a queue that has already exhausted its assigned buffers, a queue that has exceeded a rate at which it is permitted to accept new packets, a queue that has exceeded a class allocation threshold, and so forth. Rather than simply drop the packet, the device may divert the packet to a visibility subsystem. Additionally, or alternatively, copies of some or all of the packets already within the queue at the time the packet was dropped may also be forwarded to the visibility subsystem for analysis. The act of tagging packets in a queue (or associated with a port) to which an incoming packet was to be assigned, but was instead dropped, may also be referred to herein as queue forensics.

Certain techniques described herein involve facilitating debug of existing network devices. For example, in an embodiment, packets marked for visibility reasons, or copies thereof, are sent to a data collector for the purpose of debugging delay on a per hop basis.

According to an embodiment, in response to certain events referred to herein as "visibility events," such as determining that a queue is experiencing excessive delay or detecting that a packet has been dropped prior to entering a queue, visibility packets may be generated. The network device may include visibility event monitoring logic in a queue manager or other suitable component that detects such events and generates the visibility packets in response thereto.

A visibility event may be detected with respect to a packet based on various attributes, device states, or device events, with the triggers for different types of visibility events being hard-coded in some embodiments, and user-configurable in others. For instance, a visibility event may be detected in response to determining that a packet has a certain attribute or combination of attributes, such as certain header attributes, or belonging to a certain flow. Visibility events may further be detected based on a state of a resource (such as a queue or buffer) while the device is attempting to forward the packet. For instance, a visibility event may be detected in response to determining that a packet is currently in a queue that is of a certain size, or that is associated with a certain delay measure. Visibility events may further be detected based on an action that the device performs in association with the packet while the device is attempting to forward the packet. This may include actions that result in the packet failing to be forwarded, such as dropping the packet, purging an entire queue, failing to enqueue the packet, and so forth, as well as actions that do not affect the device's ability to forward the packet, such as dropping or failing to enqueue another packet in the same queue as the packet (e.g. when taking snapshots of the contents of a queue in response to a drop event). Visibility events may further be defined so as to be triggered by combinations of the foregoing, such as the dropping of a packet having a certain attribute.

In an embodiment, a visibility packet may be or comprise at least a portion of a packet that is in some way associated with the event, such as a packet that was dropped as a result of an event, or that was in a queue at the time of an event related to that queue. The visibility packet may, in some instances, be a copy of such a whole or partial packet. A visibility packet may be tagged or otherwise indicated as a visibility packet.

In an embodiment, there may be a large number of visibility packets generated within a network device, depending on system conditions. It may therefore be desirable to limit the number of visibility packets that are actually passed on to a visibility subsystem and/or to a collector outside of the network device. For instance, there may be a limited amount of resources available to handle visibility packets within the network device, such as a limited number of visibility queues, a limited amount of processing resources in the visibility subsystem, or a limited amount of storage available to store visibility events. It may also or instead be desirable to limit the amount of network bandwidth consumed by visibility packets that are being sent to a central collector and/or reduce the amount of resources needed by such a central collector. Accordingly, a network device may include sampling logic that limits the visibility packets to be generated and/or forwarded to a visibility subsystem to those associated with only a sample of the detected visibility events.

For example, in an embodiment, a network device may include one or more visibility samplers through which visibility packets are routed on their way to a visibility queue, visibility subsystem, and/or out of the network device. The samplers allow only a limited sample of the visibility packets that they receive to pass through them, essentially acting as filters to reduce the number of visibility packets that will be processed.

Samplers may sample visibility packets using any of a variety of sampling logic, including rate-aware sampling, probability-based sampling, class-based sampling, source-based sampling, flow-based sampling, recurrent event sampling, burst sampling, and so forth. Samplers may be arranged in chains, such that a visibility packet must pass through multiple samplers in order to reach a visibility subsystem or other collector. Samplers may further be arranged in hierarchies, such that an aggregating sampler collects and samples the visibility packets that are outputted by a group of lower-level samplers. In an embodiment, samplers may be coupled dynamically to specific visibility event monitoring logic and/or to other samplers, therefore allowing for customizable control of visibility packet processing.

In an embodiment, a pre-event sampler may tag certain packets as visibility-eligible prior to the packets being enqueued, based on various sampling criteria. The visibility event monitoring logic may only generate visibility events from the packets that are marked as visibility-eligible.

In an embodiment, visibility sampling logic may utilize flow tracking units to detect the first packet in each flow, such that, in a certain period of time, only the first visibility packet associated with a flow is sampled. The flow tracking unit may also begin counting packets that are seen for a given flow, and the number of packets counted may subsequently be correlated to the first visibility packet in the flow. In an embodiment, there may be a limited number of flow tracking units, which may be allocated to sampling logic dynamically.

In an embodiment, rate-aware samplers may utilize a ticket-based mechanism to control the rate at which visibility packets are sampled. While the sampler has tickets, the sampler may let visibility packets pass through the sampler, with each visibility packet costing a ticket. A ticket replenishment system generates batches of new tickets for the sampler at an assigned replenishment rate. The replenishment rate may, in some embodiments, be adjusted dynamically based on system conditions. Replenishment processes may further be synchronized between samplers and/or network devices. In an embodiment, the number of tickets available to a sampler at any given time may be capped.

In other aspects, the inventive subject matter encompasses computer apparatuses and/or computer-readable media configured to carry out the foregoing techniques. 2.0. STRUCTURAL OVERVIEW

FIG. 1 is an illustrative view of various aspects of an example network device 100 in which techniques described herein may be practiced, according to an embodiment. Network device 100 is a computing device comprising any combination of hardware and software configured to implement the various logical components described herein, including components 110-190. For example, device 100 may be a single networking computing device, such as a router or switch, in which some or all of the processing components described herein are implemented in application-specific integrated circuits (ASICs), field programmable gate arrays (FPGAs), or other integrated circuit(s). As another example, the device 100 may include one or more memories storing instructions for implementing various components described herein, one or more hardware processors configured to execute the instructions stored in the one or more memories, and various data repositories in the one or more memories for storing data structures utilized and manipulated by the various components.

Network device 100 is a node within a network. A computer network or data network is a set of computing components, including devices such as device 100, interconnected by communication links. Each computing component may be a separate computing device, such as, without limitation, a hub, switch, bridge, router, server, gateway, or personal computer, or a component thereof. Each computing component is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

Device 100 is generally configured to receive and forward packets 105 to other devices in a network by means of a series of operations performed at various components within the device. Note that, in an embodiment, some or all of the nodes in the network may each be or include a separate network device 100. In an embodiment, a node may include more than one device 100. In an embodiment, device 100 may itself be one of a number of components within a node. For instance, network device may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a packet 105 through components of a device 100 is as follows. The packet 105 may be received by a port 110. The packet 105 is buffered by an arbiter 170 until it can be processed by an ingress processor 150A, and then delivered to an interconnect. From the interconnect, the packet 105 is forwarded to a traffic manager 125. Traffic manager 125 stores the packet 105 in a buffer 130 and assigns the packet 105 to a queue 142. Traffic manager 125 manages the flow of the packet 105 through the queue 142 until the packet 105 is released to an egress processor 150B. Depending on the processing, the traffic manager 125 may then assign the packet 105 to another queue 142 so that it may be processed by yet another egress processor 150B, or the egress processor 150B may send the packet 105 to an egress arbiter from which the packet 105 is finally forwarded out another port 190.

2.1. Network

While each node within the network may or may not have a variety of other functions, in an embodiment, each node is configured to send, receive, and/or relay data to one or more other nodes via these links. In general, data is communicated as series of discrete units or structures of data represented by signals transmitted over the communication links.

Different nodes within a network may send, receive, and/or relay data units at different communication levels, or layers. For instance, a first node may send a data unit at the network layer (e.g. a Transport Control Protocol ("TCP") segment, Internet Protocol ("IP") packet, etc.) to a second node over a path that includes an intermediate node. This data unit will be broken into smaller data units at various sublevels before it is transmitted from the first node. These smaller data units may be referred to as "subunits" or "portions" of the larger data unit.

For example, a TCP segment may be broken into packets, then cells, and eventually sent out as a collection of signal-encoded bits to the intermediate node. Depending on the network type and/or the device type of the intermediate node, the intermediate node may rebuild the entire original data unit before routing the information to the second node, or the intermediate node may simply rebuild certain subunits of data (e.g. frames and/or cells) and forward those subunits to the second node without ever composing the entire original data unit.

The structure and transmission of data between nodes is governed by a number of different protocols. There may be multiple layers of protocols, typically beginning with a lowest layer such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes-often servers or end-user devices—may only have one or a handful of ports. Other nodes, such as switches, hubs, or routers, may have many more ports, and typically are used to relay information between the terminal nodes. The arrangement of nodes and links in a network is said to be the topology of the network, and is typically visualized as a network graph or tree.

A node implements various forwarding logic by which it is configured to determine how to handle each data unit it receives. This forwarding logic may, in some instances, be hard-coded. For instance, specific hardware or software within the node may be configured to always react to certain types of data units in certain circumstances in a certain way. This forwarding logic may also be configurable, in that it changes over time in response to instructions or data from other nodes in the network. For example, a node will typically store in its memories one or more forwarding tables (or equivalent structures) that map certain data unit attributes or characteristics to actions to be taken with respect to data units having those attributes or characteristics, such as sending the data unit to a selected path, or processing the data unit using a specified internal component.

When a node receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving node is not the destination for the data unit, the receiving node may look up the destination node within receiving node's routing information and route the data unit to another node connected to the receiving node based on forwarding instructions associated with the destination node (or an address group to which the destination node belongs). The forwarding instructions may indicate, for instance, an outgoing port over which to send the data unit, a label to attach the data unit, etc. In cases where multiple paths to the destination node are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

Data units may be single-destination or multi-destination. Single-destination data units are typically unicast data units, specifying only a single destination address. Multi-destination data units are often multicast data units, specifying multiple destination addresses, or addresses shared by multiple destinations. However, a given node may in some circumstances treat unicast data units as having multiple destinations. For example, the node may be configured to mirror a data unit to another port such as a law enforcement port or debug port, copy the data unit to a central processing unit for diagnostic purposes or suspicious activity, recirculate a data unit, or take other actions that cause a unicast data unit to be sent to multiple destinations. By the same token, a given data unit may in some circumstances treat a multicast data unit as a single-destination data unit, if, for example all destinations targeted by the data unit are reachable by the same egress port.

For convenience, many of the techniques described in this disclosure are described with respect to forwarding data units that are IP packets in an L3 (level 3) network, or forwarding the constituent cells and frames thereof in an L2 (level 2) network, in which contexts the described techniques have particular advantages. It will be recognized, however, that these techniques may also be applied to realize advantages in routing other types of data units conforming to other protocols and/or at other communication layers within a network. Thus, unless otherwise stated or apparent, the techniques described herein should also be understood to apply to contexts in which the packets are of any other type of data structure communicated across a network, such as segments or datagrams. That is, in these contexts, other types of data structures may be used in place of packets, cells, frames, and so forth.

2.2. Ports

Network device 100 includes ports 110/190. Ports 110, including ports 110a-n, are inbound ("ingress") ports by which packets 105 are received over the network. Ports 190, including ports 190a-n, are outbound ("egress") ports by which at least some of the packets 105 are sent out to other destinations within the network, after having been processed by the network device 100.

Although ports 110 are depicted as receiving entire packets 105, in some embodiments, the individual atomic data units upon which the depicted components may operate may be actually be subunits of the packets 105, such as cells or frames. For example, data units 105 may be received, acted upon, and transmitted at a cell or frame level. These cells or frames are logically linked together as the packets 105 to which they respectively belong for purposes of determining how to handle the cells or frames. However, the cells or frames may not actually be assembled into packets 105 within device 100, particularly if the cells or frames are being forwarded to another destination through device 100.

Ports 110/190 are depicted as separate ports for illustrative purposes, but may actually correspond to the same physical hardware ports (e.g. network jacks or interfaces) on the network device 110. That is, a network device 100 may both receive packets 105 and send packets 105 over a single physical port, and the single physical port may thus function as both an ingress port 110 and egress port 190. Nonetheless, for various functional purposes, certain logic of the network device 100 may view a single physical port as a separate ingress port 110 and egress port 190. Moreover, for various functional purposes, certain logic of the network device 100 may subdivide a single ingress port 110 or egress port 190 into multiple ingress ports 110 or egress ports 190, or aggregate multiple ingress ports 110 or multiple egress ports 190 into a single ingress port 110 or egress port 190. Hence, in various embodiments, ports 110 and 190 should be understood as distinct logical constructs that are mapped to physical ports rather than simply as distinct physical constructs.

In some embodiments, the ports 110/190 of a device 100 may be coupled to one or more transceivers, such as Serializer/Deserializer ("SerDes") blocks. For instance, ports 110 may provide parallel inputs of received data units into a SerDes block, which then outputs the data units serially into an ingress arbiter 220 or other suitable component. On the other end, an egress packet processor may output data units serially into another SerDes block, which the outputs the data units in parallel to ports 190. There may be any number of input and output SerDes blocks, of any suitable size, depending on the specific implementation (e.g. four groups of 4×25 gigabit blocks, eight groups of 4×100 gigabit blocks, etc.).

2.3. Packet Processing Components

Device 100 comprises various packet processing components 150, also referred to as packet processors 150. A packet processing component 150 may be implemented by, for example, a Field Programmable Gate Array (FPGA), Application-Specific Integrated Circuit (ASIC), or a general-purpose processor executing software-based instructions. The packet processor 150 reads or accepts packets 105 as input, and determines how to handle the packets 105 based on various logic implemented by the packet processor 150. In an embodiment, a first set of one or more packet processing components 150 may form a RX component (or pre-buffer manager), and a second set of one or more packet processing components 150 may form a TX component (or post-queue manager).

A packet processing component 150 is configured to perform one or more processing tasks with a packet 105. By way of example, such tasks may include, without limitation, sending the packet 105 out a specified port 190, applying rules or policies to the packet 105 (e.g. traffic flow control, traffic shaping, security, etc.), manipulating the packet 105, discarding a packet 105, locating forwarding information for a packet 105, annotating or tagging a data unit, performing statistical or debugging operations, or simply determining a next processing component 150 to which the packet 105 should be sent.

Based on decisions made while processing a packet 105, a packet processor 150 may, in some embodiments, and/or for certain processing tasks, manipulate a data unit 105 directly. For instance, the packet processor 150 may add, delete, or modify information in a packet header or payload. In other embodiments, and/or for other processing tasks, a packet processor 150 may generate control information that accompanies the packet 105, or is merged with the packet 105, as the data unit 105 continues through the device 100. This control information may then be utilized by other components of the device 100 to implement decisions made by the packet processor 150.

In an embodiment, a packet processor 150 need not necessarily process an entire packet 105, but may rather only receive and process a subunit of a packet 105, such as a cell comprising header information for the packet 105. For instance, a first cell, or a first subset of cells, of a packet 105 might be forwarded to a packet processor 150, while the remaining cells of the packet 105 (and potentially the first cell(s) as well) are forwarded in parallel to a merger component where they await results of the processing.

In some embodiments, device 100 comprises many processing components 150, potentially working in parallel, some or all of which may be configured to perform different tasks or combinations of tasks. In other embodiments, a single processor component 150 may be tasked with performing all of the processing tasks supported by the device 100, using branching logic based on the contents of a packet 105 and the context (e.g. the queue 142 in which the packet 105 is found) by which the packet 105 arrived at the packet processor 150.

As depicted, the packet processors 150 in device 100 include both ingress packet processors 150A dedicated to pre-processing packets 105 before the packets 105 are queued, and egress packet processors 150B, dedicated to processing packets 105 after those packets 105 depart from queues 142. While egress processors 150B may be configured to perform tasks such as already described, an ingress processor 150B may perform certain intake tasks on packets 105 as they arrive. These intake tasks may include, for instance, and without limitation, parsing packets 105, performing routing-related lookup operations, categorically blocking packets 105 with certain attributes and/or when the device 100 is in a certain state, duplicating certain types of packets 105, making initial categorizations of packets 105, and so forth. Once the appropriate intake task(s) have been performed, the data units 105 are forwarded to an appropriate traffic manager 125, to which the ingress processor 150B may be coupled directly or via various other components, such as an interconnect component In an embodiment, by means of the arrangement of packet processing components 150 and other components of device 100, device 100 may be configured to process a packet 105 in a series of stages, each stage involving a different set of one or more packet processors 150, or at least a different branch of packet processor 150 logic. Although only one stage is depicted, the processing may occur over any number of stages. Instead of the output of the first stage being fed to ports 190, the output of each stage is fed to the input of a next stage in the series, until a concluding stage where output is finally provided to ports 190. The collective actions of the processing component(s) 150 of the device 100 over these multiple stages are said to implement the forwarding logic of the device 100.

In an embodiment, there may be different egress packet processors(s) 150B assigned to different flows or other categories of traffic, such that not all packets 105 will be processed by the same egress packet processor 150B. In an embodiment, each egress processor 150B is coupled to a different group of egress ports 190 to which they may send packets 105 processed by the egress processor 150B. In an embodiment, access to a group of ports 190 may be regulated via an egress arbiter coupled to the egress packet processor 150B.

In the course of processing a packet 105, a device 100 may replicate a packet 105 one or more times. For example, a packet 105 may be replicated for purposes such as multicasting, mirroring, debugging, and so forth. Thus, a single packet 105 may be replicated to multiple queues 142. Hence, though certain techniques described herein may refer to the original packet 105 that was received by the device 100, it will be understood that those techniques will equally apply to copies of the packet 105 that have been generated for various purposes.

Tags

A packet processor 150, and/or other components described herein, may be configured to "tag" a packet 105 with labels referred to herein as tags. A packet 105 may be tagged for a variety of reasons, such as to signal the packet 105 as being significant for some purpose related to the forwarding logic and/or debugging capabilities of the device. A packet 105 may be tagged by, for example, inserting a label within the header of the packet 105, linking the packet 105 to a label with sideband data or a table, or any other suitable means of associating a packet 105 with a tag.

A packet processor 150 may likewise be configured to look for tags associated with a packet 105, and take some special action based on the detecting an associated tag. The packet processor 150 may send a tag along with a packet 105 out of the device 100, or the tag may be consumed by the device 100 internally, for example by a packet processor 150, statistics engine, CPU, etc. and not sent to external consumers, depending on the embodiment.

2.4. Traffic Manager

Device 100 comprises one or more traffic managers 125 configured to control the flow of packets 105 to egress processor(s) 150B. A traffic manager 125 receives packets 105 from ingress processors 150A and/or other components of device 100. A traffic manager 125 may include or be coupled to one or more buffer memories for buffering packets 105 prior to sending those packets 105 to their respective egress processor(s) 150B. A buffer manager 120 within the traffic manager 125 may temporarily store packets 105 in egress buffers as the packets 105 await processing by egress processor(s) 150B. A packet 105 in an egress buffer may eventually be "released" to one or more egress processor(s) 150B for processing, by reading the packet 105 from the buffer memory and sending the packet 105 to the egress processor(s) 150B. In an embodiment, a traffic manager 125 may release up to a certain number of packets 105 from the buffer memory to egress processors 150B each clock cycle or other defined time slot.

Beyond managing the use of the buffer memory to store packets 105 (or copies thereof), the traffic manager 125 may include queue management logic 140 configured to assign buffer entries to egress queues and manage the flow of packets 105 through the egress queues. The traffic manager 125 may, for instance, identify a specific queue to assign a packet 105 to upon receipt of the packet 105. The traffic manager may further determine when to release—also referred to as "dequeuing"-packets 105 (or portions thereof) from the queues and provide those packets 105 to specific egress processors 150B. Buffer management logic in the traffic manager 240 may further "deallocate" buffers that store packets 105 that are no longer linked to egress queues. These entries are then reclaimed for use in storing new data through a garbage collection process.

2.5. Ingress Arbiter

A device 100 may further include one or more ingress arbitration components, or arbiters, 170, deployed in front of one or more ingress processors 150A. Similar to an egress traffic manager 125, an ingress arbiter 170 controls the flow of packets 105 into a packet processor 150, though in the case of the ingress arbiter, that packet processor 150 is an ingress processor 150A.

Each arbiter 170 may comprise or be coupled to ingress buffers. An ingress arbiter 170 may utilize those ingress buffers to temporarily store incoming packets 105 before sending them to an ingress processor 150A. An ingress arbiter 170 may be configured to always store incoming data units 105 in buffers, or only when needed to avoid potential drops at oversaturated downstream components.

An ingress arbiter 170 may release up to a certain number of packets 105 from to an ingress processor 150A each clock cycle or other defined period of time. The next packet 105 to release may be identified using one or more ingress queues, which function similar to egress queues. For instance, each ingress port 210 or group of ports 210 may be assigned an ingress queue. An arbiter 170 may be coupled to a single ingress processor 150A, or multiple arbiters 170 may share an ingress processor 150A.

2.6. Buffers

Since not all packets 105 received by the device 100 can be processed by the packet processor(s) 150 at the same time, device 100 may temporarily store packets 105 in memory structures referred to as buffers 130 while the packets 105 are waiting to be processed. For example, the device's packet processors 150 may only be capable of processing a certain number of packets 105 in a given clock cycle, meaning that other packets 105 must either be ignored (e.g. dropped) or stored. At any given time, a large number of packets 105 may be stored in the buffers 130 of the device 100, depending on network traffic conditions.

A buffer 130 may be a portion of any type of memory, including volatile memory and/or non-volatile memory. Buffers 130 may exist in one or more buffer memories for any number of components within the device 100, including each traffic manager 125. Generally, a packet 105 awaiting processing by a component is held in a buffer 130 associated with that component until the packet 105 is "released" to the component for processing.

One or more buffer managers 120, such as depicted in traffic manager 125, are configured to manage use of buffers 130 by device 100. Among other processing tasks, a buffer manager 120 may, for example, allocate and deallocate specific segments of memory for buffers 130, create and delete buffers 130 within that memory, identify available buffer(s) 130 in which to store a newly received packet 105, maintain a mapping of buffers 130 to packets 105 stored in those buffers 130 (e.g. by a packet sequence number assigned to each packet 105 as the packet 105 is received), mark a buffer 130 as available when a packet 105 stored in that buffer 130 is dropped or sent from the device 100, determine when to drop a packet 105 instead of storing the packet 105 in a buffer 130, and so forth.

2.7. Queues

In an embodiment, to manage the order in which packets 105 are processed from the buffers 130, various components of a device 100 may implement queueing logic. For example, the flow of data units through ingress buffers associated with ingress arbiter 170 may be managed using ingress queues while the flow of data units through egress buffers associated with traffic manager 125 may be managed using egress queues. Example queues 142*a*-142*n* are depicted in FIG. 1 as being managed by queue management logic 140 within the traffic manager 125, though it will be recognized that other queues 142 may exist for other purposes, and be managed by queue management logic within other components of device 100 instead.

A packet 105, and the buffer(s) 130 in which it is stored, may be said to belong to a queue 142. A queue 142 may be a distinct, continuous portion of the memory in which buffers 130 are stored. Or, a queue 142 may instead be a set of linked memory locations (e.g. linked buffers 130). In some embodiments, the number of buffers 130 assigned to a given queue 142 at a given time may be limited, either globally or on a per-queue basis, and this limit may change over time.

As described in other sections, device 100 may process a packet 105 over one or more stages. A node may have many queues 142, and each stage of processing may utilize one or more of the queues 142 to regulate which packet 105 is processed at which time. To this end, a queue 142 arranges its constituent packets 105 in a sequence, such that each packet 105 corresponds to a different node in an ordered series of nodes. The sequence in which the queue 142 arranges its constituent packets 105 generally corresponds to the sequence in which the packets 105 in the queue 142 will be processed.

For instance, a queue 142 may be a first-in-first-out ("FIFO") queue. A FIFO queue has a head node, corresponding to the packet 105 that has highest priority (e.g. the next data unit to be processed, and typically the packet 105 that was least recently added to the queue). A FIFO queue further has a tail node, corresponding to the packet 105 that has lowest priority (e.g. the packet 105 that was most recently added to the queue). The remaining nodes in the queue are arranged in a sequence between the head node and tail node, in decreasing order of priority (e.g. increasing order of how recently the corresponding packets 105 were added to the queue).

Queue Assignment

Device 100 may comprise various assignment control logic by which the queue 142 to which a packet 105 should be assigned is identified. In an embodiment, different queues 142 may have different purposes. For example, different queues 142 may exist for different destinations. For instance, each port 110 and/or port 190 may have its own set of queues 142. The queue 142 to which a packet 105 is assigned may therefore be selected based on the port 110 through which it was received, and/or based on forwarding information indicating which port 190 the packet 105 should depart from. As another example, each packet processor 150 may be associated with a different set of one or more queues 142. Hence, the current processing context of the packet 105 may be used to select which queue 142 a packet 105 should be assigned to.

In an embodiment, there may also or instead be different queues 142 for different flows or sets of flows. That is, each identifiable traffic flow or group of traffic flows is assigned its own set of queues 142 to which its packets 105 are respectively assigned. In an embodiment, different queues 142 may correspond to different classes of traffic or quality-of-service (QOS) levels. Different queues 142 may also or instead exist for any other suitable distinguishing property of the packets 105, such as source address, destination address, packet type, and so forth.

In some embodiments, after each of the foregoing considerations, there may be times when multiple queues 142 still exist to which a packet 105 could be assigned. For example, a device 100 may include multiple similarly configured processors 150 that could process a given packet 105, and each processor 150 may have its own queue 142 to which the given packet 105 could be assigned. In such cases, the packet 105 may be assigned to a queue 142 using a round-robin approach, using random selection, or using any suitable load balancing approach. Or, the eligible queue 142 with the lowest queue delay or lowest number of assigned buffers may be selected. Or, the assignment mechanism may use a hash function based on a property of the packet 105, such as the destination address or a flow identifier, to decide which queue 142 to assign the packet 105 to. Or, the assignment mechanism may use any combination of the foregoing and/or other assignment techniques to select a queue 142 for a packet 105.

In some embodiments, a packet 105 may be assigned to multiple queues 142. In such an embodiment, the packet 105 may be copied, and each copy added to a different queue 142.

Dropping Packets

In some embodiments, there may be times when various rules indicate that a packet 105, or a copy of the packet 105, should not be added to a queue 142 to which the packet 105 is assigned. In an embodiment, the device 100 may be configured to reassign such a packet 105 to another eligible queue 142, if available. In another embodiment, the device 100 may instead be configured to drop such a packet 105 or a copy of the packet 105. Or, in yet other embodiments, the device 100 may be configured to decide between these options, and/or ignoring the rule, depending on various factors.

For example, in certain embodiments, a queue 142 may be marked as expired as a result of techniques described in other sections. In one such embodiment, if the queue 142 to which device 100 assigns a packet 105 is expired, then the device 100 may drop the packet 105, or copy of the packet 105, or take other action as explained herein.

As another example, as mentioned, in an embodiment, only a certain number of buffers 130 may be allocated to a given queue 142. Buffer manager 120 may track the number of buffers 130 currently consumed by a queue 142, and while the number of buffers 130 consumed meets or exceeds the number allocated to the queue 142, device 100 may drop any packet 105 that it assigns to the queue 142.

As yet another example, queue manager 140 may prohibit packets 105 from being added to a queue 142 at a certain time on account of restrictions on the rate at which packets 105 may be added to a queue 142. Such restrictions may be global, or specific to a queue, class, flow, port, or any other property of a packet 105. Device 100 may additionally or alternatively be configured to follow a variety of other such rules, indicating when a packet 105 should not be added to a queue 142, and the techniques described herein are not specific to a specific rule unless otherwise stated.

The device 100 may optionally maintain counters that are incremented whenever it drops a packet 105. Different counters may be maintained for different types of drop events and/or different ports, services, classes, flows, or other data unit properties. For example, the buffer manager 120 may maintain counters on a per-port basis that track drops to expired queues. The buffer manager 120 may also or instead set a "sticky bit" for queues for which drop events occur, such as an "expired queue drop" sticky bit. Such data may be reported, for example, to a device administrator, and/or utilized to automatically reconfigure the device configuration 115 of the network device 100 to potentially reduce such drops in the future.

Queue Manager

A component that utilizes queues 142 may comprise or be coupled to a queue manager 140 that manages queues 142. For instance, as depicted, traffic manager 125 comprises a queue manager 140. A queue manager 140 is coupled to a buffer manager 120, and is configured to receive, among other instructions, instructions to add specific packets 105 to specific queues 142. In response to an instruction to add a packet 105 to a queue 142, queue manager 140 is configured to add ("enqueue") the packet 105 in the specified queue 142 by placing the packet 105 at the tail of the queue 142.

Queue manager 140 is further coupled to packet processor(s) 150. At various times, queue manager 140 schedules the dequeue (release) of a packet 105 at the head of the queue, and provides the packet 105 (e.g. directly or by reference) to a corresponding packet processor 150. Queue manager 140 may determine to release a packet 105 in a variety of manners, depending on the embodiment. For example, queue manager 140 may wait until a packet 105 is requested by a packet processor 150. Or, queue manager 140 may automatically release a packet 105 from a queue at designated intervals (e.g. once per clock cycle). Or, queue manager 140 may include resource management logic by which queue manager 140 prioritizes queues 142 and selects a certain number of packets 105 to release each clock cycle based on a variety of factors. Some factors in this prioritization may include weight, priority, delay, queue length, port length, etc.

Queue manager 140 may dequeue packets 105 in response to yet other events in other embodiments. In an embodiment, queue manager 140 may comprise a scheduler that determines a schedule, for a certain amount of time in advance, of when packets 105 should be dequeued from specific queues 142. Queue manager 140 may then dequeue packets 105 in accordance to the schedule.

In an embodiment, the queue manager may be blocked from dequeueing a queue 142 at certain times (even if the queue 142 is scheduled for dequeueing) due to various factors. For example, there may be flow control restrictions on ports, port groups, queues, or other constructs associated with the queue 142 or packet 105. Or, there may be flow control restrictions on specific internal components, such as specific packet processors 150, port buffers, etc.

The techniques described herein are not specific to any particular mechanism for determining when queue manager 140 decides to dequeue a packet 105 from a queue 142.

Queue Delay

In an embodiment, queue manager 140 is further configured to track one or more measures of delay, associated with each queue 142. For example, the queue manager 140 may be configured to track a timestamp of when a packet 105 entered a queue 142 (the "enqueue time") and compute the amount of time the packet 105 has been in the queue 142 (the "packet delay") based on the difference between the enqueue time and the current time.

A queue delay may be computed for each queue 142 based on a packet delay of one of the packets 105 within the queue 142. For example, in some embodiments, the packet delay of each packet 105 within the queue may be tracked, and the queue 142 may be said to have a queue delay equal to the packet delay of the packet 105 at the head of the queue 142. In other embodiments, the packet delay is tracked only for one or more designated "marker" packets 105, thus avoiding the need to track timestamps for all packets 105 within the queue. The queue delay is said to be equal to the delay of the most recently dequeued marker packet 105, or the longest duration of time for which a current marker packet 105 has been observed to be in the queue 142 (whichever is largest).

In an embodiment, as one maker packet 105 leaves the queue 142, the packet 105 at the tail of the queue 142 is designated as a new marker packet 105. In this manner, the queue delay may be tracked simply by tracking an identifier of the marker packet 105, a timestamp of the marker packet 105, an identifier of the tail packet 105, and a timestamp of the tail packet 105. In other embodiments, similar techniques may be utilized to reduce the overhead of tracking a marker packet 105. In an embodiment with multiple marker packets 105 per queue, there may be a maximum number of marker packets 105 per queue 142, and the tail packet 105 may become the marker packet 105 under certain conditions, such as the passage of a certain amount of time, the additional of a certain number of packets 105 to the queue 142, the departure of a marker packet 105 from the queue 142, or any combination thereof.

In an embodiment, there may be different types of queue delays. For instance, there may be a tail queue delay corresponding to the current packet delay of the packet 105 at the tail of the queue 142, and a marker queue delay corresponding to the current packet delay of the oldest marker packet 105. Or, the queue delay may be a function of multiple packet delays (e.g. the average or weighted average of packet delays for multiple packets 105 within the queue).

In an embodiment, the queue manager 140 only calculates queue delay at certain refresh times. The queue delay is then stored with the data describing the queue 142. The queue delay thus need not accurately reflect the packet delay of a packet 105 at a given time, but rather reflects the packet delay as of the last refresh time.

For instance, a background process may cycle through each queue 142 at various intervals and update the queue delay of the queue 142. The background process may, for example, refresh the queue delay for a certain number of queues 142 per clock cycle. The queues 142 may be selected using a round robin approach, or using some prioritization scheme. The queue manager 140 may also or instead refresh the queue delay for a queue 142 whenever dequeuing a packet 105 from the queue 142.

To conserve resources, queue manager 140 need not track delay for all queues 142. For example, queue manager 140 may only track delay for certain types of queues 142 (e.g. only egress queues 142 or only queues 142 with a certain QoS level), and/or for queues 142 for which delay-based actions have been enabled.

Delay-Based Actions

According to an embodiment, queue manager 140 may be configured to take one or more actions based on the current queue delay of a queue 142. For example, in an embodiment, queue manager 140 may tag or otherwise annotate a packet 105 with information indicating the queue delay, or at least a categorization of the queue delay.

In an embodiment, certain delay-based actions may be associated with a corresponding delay thresholds. The queue manager 140 compares to the current queue delay measure of the queue 142 to each applicable threshold. If a threshold is exceeded, a corresponding action is taken. Such thresholds may be fixed for all queues 142, specific to certain types of queues 142, or set on a per-queue basis.

Furthermore, the thresholds may change over time. In an embodiment, thresholds may change dynamically based on the state of the device. For example, threshold management logic may lower deadline thresholds as the total amount of buffers in the device increases. Also, the thresholds may change based on the fill level across a set of queues or physical ports or logical ports.

In some embodiments, not all packets 105 in a queue 142 are necessarily subject to delay-based actions, even when the corresponding threshold is met. For example, a packet processor 150 may mark certain packets 105 as actionable (or, inversely, unactionable). When a threshold is met, any corresponding delay-based actions may only be applied to packets 105 marked by as being actionable, rather than to all packets 105.

One example of a delay-based action is delay-based visibility monitoring. Whenever the queue delay of a queue 142 exceeds a corresponding delay-based visibility monitoring threshold, thereby signaling a level of excessive delay, the queue manager 140 tags packets 105 as they depart from the queue 142 with a certain tag, such as "DELAY_VISIBILITY_QUEUE_EVENT." Optionally, the queue manager 140 may also update a queue state variable to indicate that delay-based visibility monitoring is currently active for the queue 142. Certain packet processing component(s) 150 within and/or outside of the device 100 may be configured to take various actions whenever detecting a packet 105 having this delay visibility tag. For instance, a packet processor 150 may forward a full or partial copy of the packet, optionally injected with additional information as described elsewhere in the disclosure, to a special visibility subsystem 160.

There may be any number of delay-monitoring thresholds, associated with different deadlines or tags. Each threshold may be associated with a different application target and further indicate the severity of the delay (e.g. high, medium, low, etc.). Metrics associated with the delay may furthermore be included in the tag. The tag may be used, for example, to identify packets to analyze when debugging network performance for the application.

Another example of a delay-based action is queue expiration. When the queue delay of a queue 142 exceeds a corresponding expiration threshold, the queue 142 is marked as expired (e.g. using an expiration state variable associated with the queue 142). The queue 142 is then "drained" of some or all of the packets 105 within the queue 142. The number of packets 105 that are drained depends on the embodiment and/or the queue delay, and may include all packets 105, a designated number of packets 105, or just packets 105 that are dequeued while the queue delay remains above the threshold. Draining may be performed through normal scheduling to get access to buffer bandwidth, or draining may be performed via an opportunistic background engine.

As these "drained" packets 105 are dequeued, they may be completely dropped, or diverted to a special visibility subsystem 160 for processing without being forwarded to their intended destination. Optionally, the packets 105 are tagged with a certain tag, such as "EXPIRED_QUEUE_EVENT." Moreover, in an embodiment, enqueues to the queue 142 may be restricted or altogether forbidden while the queue 142 is marked as expired. The queue is marked as unexpired once its packets 105 are completely drained, or the queue delay falls below the expiration threshold again.

According to an embodiment, in response to queue expiration, device 100 may be configured to adjust various device configuration settings 115. For instance, flow control and traffic shaping settings related to a queue 142 may be temporarily overridden while the queue 142 is expired.

A variety of other delay-based actions are also possible, depending on the embodiment. As a non-limiting example, in an embodiment, if a certain threshold is exceeded, a packet 105 may be annotated as the packet is dequeued. The packet 105 may be annotated to include, for example, any of a variety of metrics related to the queue 142, such as the current delay associated with the queue 142, the current system time, the identity of the current marker packet 105, an identifier of the queue 142, a size of the queue 142, and so forth. The packet 105 may also or instead be annotated with any other suitable information.

In an embodiment, queue manager 140 may be configured to take delay-based actions only if the capability to perform that action is enabled for the queue 142. For instance, for one or more delay-based actions (e.g. queue expiration, delay monitoring, etc.), a queue 142 may have a flag that, when set, instructs the queue manager 140 to perform the delay-based action when the corresponding threshold is exceeded. Otherwise, the queue manager 140 need not compare the queue delay to the corresponding threshold, or even track queue delay if no other delay-based actions are enabled. As another example, the threshold for the queue 142 itself may indicate whether the capability to perform delay-based action is enabled. A threshold having a negative or otherwise invalid value, for instance, may indicate that the delay-based action is disabled. In an embodiment, delay-based actions are disabled by default and only enabled for certain types of queues 142 and/or in response to certain types of events.

In an embodiment, a deadline profile 145 may describe a threshold and its associated delay-based action, or a set of thresholds and their respectively associated delay-based actions. Device 100 may store a number of deadline profiles 145, each having a different profile identifier. For example, one profile 145 might set an expiration threshold of 300 ns and a delay visibility monitoring threshold of 200 ns, while another profile 145 might set thresholds of 150 ns and 120 ns, respectively. Each queue 142 may be associated with one of these deadline profiles 145, and the threshold(s) applicable to that queue 142 may be determined from the associated profile 145.

The profile 145 associated with a given queue 142 may change over time due to, for example, changes made by a visibility subsystem 160 or configuration component of the device 100. Moreover, the profiles 145 themselves may change dynamically over time on account of the state of the device, as described elsewhere.

In an embodiment, the device 100 may include various mechanisms to disable queue expiration functionality. For example, there may be a flag that is provided with a packet 105 to indicate the packet 105 that should not be expired. As another example, there may be a certain pre-defined threshold whereby, once the delay for a packet 105 in an expired queue 142 falls below a given target, the queue 142 is no longer considered to be expired and the packet 105 is processed normally.

Drop Visibility and Queue Forensics

According to an embodiment, when a packet 105 assigned to a queue 142 is dropped before entering the queue 142, the queue manager 140 may store data indicating that a drop visibility event has occurred, thus potentially enabling queue forensics for the queue 142 (depending on the configuration of the queue 142 and/or device). For instance, buffer manager 120 may send data to queue manager 140 identifying a specific queue 142 to which a dropped packet 105 was to be assigned. The queue manager 140 may then tag some or all packets 105 that were in the queue 142 at the time the drop occurred with a certain forensics tag, such as "ENQ_DROP_VISIBILITY_QUEUE_EVENT." Such a tag may, for example, instruct a processing component 150 to forward a complete or partial copy (e.g. with the payload removed) of each tagged packet 105 to a special visibility queue 142, from which a special visibility subsystem 160 may inspect the contents of the queue 142 at the time of the drop so as to identify possible reasons for the drop event to have occurred.

In an embodiment, instead of being dropped completely, the packet 105 may likewise be forwarded to the special visibility queue 142 and provided with a drop visibility tag. For instance, the packet 105 may be linked to a special visibility queue 142, or even the original queue 142, and include a special tag indicating that a problem was encountered when trying to assign the packet 105 to the queue. In an embodiment, the packet 105 that could not be added may be truncated such that only the header and potentially a first portion of the payload are sent to the downstream logic.

Moreover, in an embodiment, each tagged packet 105 may also be tagged with information by which packets 105 that were in the queue 142 at the time the drop event occurred may be correlated to the dropped packet 105. Such information may include, for instance, a queue identifier, packet identifier, drop event identifier, timestamp, or any other suitable information. In this manner, device 100 has the ability to provide visibility into the drop event by (1) capturing the packet 105 being dropped and (2) capturing the contents of the queue 142 to which the dropped packet 105 would have be enqueued had it been admitted, thus allowing an administrative user or device logic to analyze what other traffic was in the device 100 that may have led to drop. The act of tagging the packets 105 in a queue 142 at the time a drop event occurs is also referred to herein as queue forensics.

In an embodiment, rather than immediately tag all packets 105 in a queue 142 with a forensics tag, the packet identifier of the tail packet 105 within the queue 142 may be recorded.

As the packets 105 within the queue 142 depart, they are each tagged in turn, until the packet 105 having the recorded packet identifier finally departs from the queue 142. The tagging then ceases, and the recorded identifier may be erased.

According to an embodiment, one or both of the drop visibility and queue forensics features may be enabled or disabled on a per-queue, per-physical-port, per-logical-port, or other basis. For example, each queue may include a flag that, when set, enables the above functionality to occur. In an embodiment, drop visibility and/or queue forensics may automatically be enabled for a port, for at least a certain amount of time, if a drop occurs upon enqueue to a queue 142 associated with the port or with respect to a packet 105 that was received via the port.

In an embodiment, drop visibility and/or queue forensics may be provided for all packets 105 that cannot be added to their assigned queues 142, or only to a probabilistically selected subset of such packets 105. For example, when dropping a packet, device 100 may execute a probabilistic sampling function to determine whether to enable drop visibility reporting and/or queue forensics with respect to the drop event. Such a function may randomly select, for instance, a certain percentage of drop events for visibility reporting over time (e.g. 5 randomly selected events out of every 100 events). In an embodiment, a rate-aware sampling function may be utilized. Rather than simply randomly selecting a certain percentage of drop events, a percentage of drop events are selected such that a cluster or set of consecutive drop events are reported, thus allowing better insight into a sequence of events that resulted in a drop (e.g. 5 consecutive drop events may be selected out of every 100 events).

Example Queue Data

Figure 2:
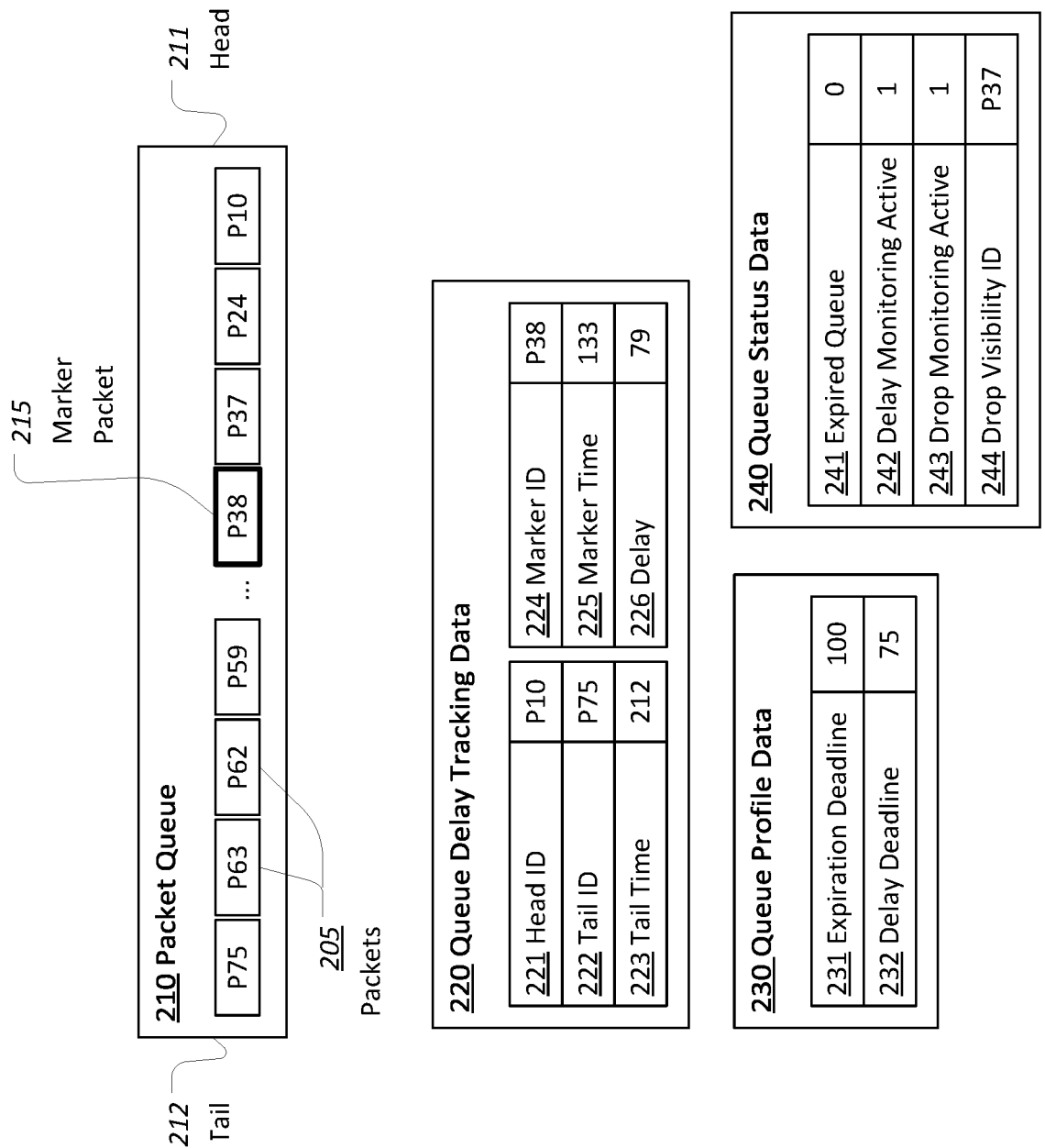
FIG. 2 illustrates example data structures that may be utilized to describe a queue.

Queue manager 140 stores data describing each queue 142, as well as the arrangement of packets 105 in each queue 142. FIG. 2 illustrates example data structures 200 that may be utilized to describe a queue, such as a queue 142, according to an embodiment. The various fields of queue data 200 may be stored within any suitable memory, including registers, RAM, or other volatile or non-volatile memories.

For instance, queue data 200 may include queue arrangement data 210 that indicates which packets 205 are currently in the queue. Each packet 205 is indicated by a packet identifier, which may be, for example, an address of the packet 205 within a memory (e.g. the buffer address), a packet sequence number, or any other identifying data. Queue arrangement data 210 further indicates the position of each of the packets 205 within the queue 200, including a tail 212 of the queue 200, at which new packets are enqueued, as well as a head 211 of the queue 200 at which packets are dequeued. The exact structure used to describe the arrangement of the packets 105 in a queue 142 may vary depending on implementation, but may be, without limitation, a linked list or ordered array of packet identifiers, position numbers associated with the packets 205 or packet identifier, and so forth.

Queue data 200 may further include queue delay tracking data 220. Queue delay tracking data 220 may optionally include, for convenience, a head packet identifier field 221 and a tail packet identifier field 222. Queue delay tracking data 220 may further include various other data used to track and compute one or more types of queue delay, such as a tail enqueue timestamp field 223, a marker packet identifier field 224, and a marker enqueue timestamp field 225. Queue delay tracking data 220 may furthermore include a stored delay field 226 that is frequently updated based on the current time and the marker timestamp field 225. The exact types of data stored within the queue delay tracking data 220 will depend on the manner(s) in which queue delay is calculated. For instance, the number of marker identifier fields 224 and marker enqueue timestamp fields 225 may vary depending on the number of marker packets kept for the queue.

Queue data 200 may further include queue profile data 230. Queue profile data 230 includes an expiration deadline 231 and a delay deadline 232, corresponding to a threshold for an expiration delay-based action and a threshold for a delay-based visibility monitoring action, respectively. Although only two thresholds are depicted, queue profile data 230 may include any number of other thresholds for other delay-based actions, depending on the embodiment. For example, there may be different deadlines to indicate the severity of delay (e.g. high, medium, or low). Queue data 200 may store queue profile data 230 directly, or contain a profile field that references a profile identifier mapped to the specific queue profile data 230 of the current queue.

Queue data 200 may further include queue status data 240, characterizing the current state of the queue. Queue status data 240 may include a variety of state information fields for the queue, such as an expired queue bit 241 indicating whether the queue is expired, a delay monitoring active bit 242 indicating whether delay-based visibility monitoring is active for the queue, a drop monitoring active bit 243 indicating whether drop-based visibility monitoring is active for the queue, and/or a drop visibility identifier field 244 indicating the last packet for which drop-based visibility monitoring and/or queue forensics should be performed.

The illustrated structures in FIG. 2 are merely examples of suitable data structures for describing a queue, and a variety of other representations may equally be suitable depending on the embodiment. Moreover, data structures depicted in FIG. 2 that are used only for certain specific techniques described herein, such as without limitation marker identifier field 224 and drop visibility identifier field 244, are of course not needed in embodiments where those techniques are not employed. Some or all of status data 240 may be calculated from other information on demand, rather than stored, in certain embodiments, as may delay field 226.

2.8. Visibility Packets

According to an embodiment, various components of the network device may transform certain packets 105, for various purposes, into diagnostic data units referred to herein as "visibility packets." For example, packets 105 that have been impacted in an exceptional or unexpected manner, such as being dropped or experiencing a high delay, may be transformed into visibility packets. Examples of such packets 105 may include, for instance, packets 105 that have been dropped due to an expire queue 142, packets 105 in a queue 142 when a delay-based monitoring or drop event occurs, packets 105 otherwise experiencing high latency, packets 105 to which no forwarding rules apply, corrupted packets 105, or packets 105 that need to be dropped because of resource constraints, errors, or special policies.

A packet 105 may be transformed into a visibility packet in a variety of manners, depending on the embodiment. For instance, a tag may be inserted into a packet 105 (e.g. in the packet header or in any other suitable location) indicating that the packet 105 is a visibility packet. Such a tag may be referred to as a visibility tag. Or, a packet 105 may be placed in a special memory structure, or linked to a special queue, that indicates that the packet 105 is a visibility packet. For simplification, a packet indicated to be a visibility packet, is said herein to be tagged as a visibility packet, regardless of the manner in which the indication is made.

In an embodiment, only a portion of a packet 105 is actually included in the visibility packet, with the rest of the packet 105 being discarded. For instance, if a switch is operating at a cell or frame level, a certain cell or frame may be detected as the "start of packet" (SOP), and include information such as the packet header. This cell or frame, and optionally a number of additional following cells or frames, may form the special visibility packet, and other cells or frames of the packet (e.g. cells or frames containing the payload and/or less important header information) may be discarded.

In some embodiments, a packet 105 having certain tags and/or undergoing certain types of issues may be duplicated before being forwarded to the visibility subsystem 160, so that the original packet 105 continues to undergo normal processing (e.g. in cases where an issue is observed, but the issue does not preclude normal processing of the packet 105), and the duplicate becomes the special visibility packet. For example, in an embodiment, upon detecting a visibility tag, a processing component may, in addition to processing the packet 105 normally, create a duplicate packet 105, remove its payload, forward the duplicate packet to the visibility subsystem 160, and remove the tag from the original packet. Or, as another example, the processing component may redirect the original packet 105 to the visibility subsystem 160 without further processing.

Visibility Tags

A visibility tag may be any suitable data in or associated with a packet, that is recognized as indicating that the packet is a special visibility packet or contains special visibility information (either in the packet or travelling along with the packet to the packet processor). Aside from the existence of the visibility tag marking the packet as a special visibility packet, the visibility tag may include annotated information, including without limitation information indicating the location of the drop or other issue in response to which the packet was tagged (e.g. a node identifier, a specific processing stage, and/or other relevant information), the type of drop or other issue that occurred, excessive delay information, expiration information, forensics information, and so forth. A packet processor may opt to use or consume tag data, forward tag data with the packet to a downstream component (e.g. to a traffic manager), or both.

A visibility tag may, for instance, be communicated as a sideband set of information that travels with the packet to the visibility queue (and/or some other collection agent). Or, a visibility tag may be stored inside the packet (e.g. within a field of the packet header, or by way of replacing the packet payload) and communicated in this way to an external element that consumes the tag. Any packet or portion of the packet (e.g. cell or subset of cells) that has an associated visibility tag is considered to be a visibility packet.

Visibility Event Monitors

According to an embodiment, device 100 may comprise various visibility event monitoring logic configured to generate visibility packets in response to various visibility events. Examples of such visibility event monitoring logic include the logic for monitoring for drop visibility events when enqueueing packets and the logic for detecting excessive queue delay events. The visibility event monitoring logic generates visibility packets in response to these events by, for example, transforming a dropped or delayed packet into a visibility packet, as described above.

Instances of visibility event monitoring logic are referred to herein as visibility event monitors, and may be found in or coupled to any suitable component of the device at which a visibility event may be detected, such as in a queue manager, traffic manager, ingress arbiters, and so forth. Some visibility event monitors may be associated with specific queues 142 that they monitor for events. For instance, there may be a different visibility event monitor for each queue 142 or group of queues 142. Other visibility event monitors may not be associated with queues at all.

A visibility event monitor may monitor for any event within the network device, such as packets dropped for any reason (e.g. queue tail drops, Active Queue Management ("AQM") drops, corrupted packets, forwarding errors, etc.), determining that a queue size or aggregate queue size surpasses some threshold, determining that a buffer utilization level surpasses some threshold in aggregate or on a per-entity basis (e.g. per port, per port group, per traffic flow, etc.), determining that a transmission or reception rate has been surpassed in aggregate or on a per-entity basis, other congestion events, encountering packets marked for any suitable reason (e.g. on account of Fast Congestion Notification ("FCN")), and so forth. There may be different visibility event monitors for different types of events (or groups of event types), with each visibility event monitor deployed within the device 100 at a suitable location to detect events of its corresponding type(s).

A visibility event monitor may generate one or more visibility packets for each event it detects. In an embodiment, the visibility event monitor may do so by transforming each packet associated with the event into a visibility packet. For example, a dropped packet may be transformed into a visibility packet. As another example, for a traffic flow or other group of packets associated with a congestion event, each packet in the flow may be transformed into a visibility packet until the congestion event is over. As another example, in the event that an entire queue is expired, or a queue is marked as being delayed, some or even all of the packets within the queue may be transformed into visibility packets. In an embodiment, the visibility event monitor may also or instead generate visibility packets by creating entirely new visibility packets, instead of by copying or transforming a packet that the device 100 previously received. Such packets may include various metrics related to the operation of the device 100, such as statistics related to buffers 130 or queues 142.

A visibility event monitor sends the visibility packets it generates to a visibility subsystem, such as visibility subsystem 160, as explained subsequently. The visibility event monitor may send the visibility packets directly, or via one or more samplers, as also explained subsequently.

2.9. Visibility Subsystem

Device 100 further comprises a visibility subsystem 160 configured to receive packets 105 that have been tagged with certain tags for visibility purposes, and to perform various visibility actions based on the tags. The visibility subsystem 160 may be dedicated hardware within device 100, logic implemented by a CPU or microprocessor, or combinations thereof.

In an embodiment, the visibility subsystem 160 is an inline component inside device 100 that operates on information provided by the traffic manager to determine next visibility actions such as, without limitation, annotating packets, reconfiguring device parameters, indicating when duplicate packets should be made, or updating statistics, before transmitting the packet to ports. In an embodiment, the visibility subsystem 160 may be a sidecar component (either inside the chip or attached to the chip) that may not have the ability to directly modify packets in-flight, but may collect state information and/or generate instructions (such as healing actions) based on observed state information. In an embodiment, the visibility subsystem 160 may be a designated data collector (such as an endpoint) that automatically produces logs, notifications, and so forth.

Alternatively, the visibility subsystem 160 may reside on an external device, such as a special gateway or network controller device.

A visibility subsystem 160 may receive visibility packets 105 in real-time, as they are generated. For example, a visibility event monitor may immediately forward the visibility packets it generates to the visibility subsystem 160. Or the visibility subsystem 160 may be configured to receive such packets 105 from one or more special visibility queues on a delayed and potentially throttled basis. For example, a visibility event monitor may add visibility packets to a visibility queue directly, or by looping visibility packets back to the traffic manager 125. In the latter case, the traffic manager 125 may be configured to link incoming packets 105 that have been tagged as visibility packets to a visibility queue, which is subsequently processed by the visibility subsystem 160.

A visibility queue may be represented as a queue, FIFO, stack, or any other suitable memory structure. In an embodiment, a visibility queue is simply a queue 142 that has been purposed specifically for visibility packets. Visibility packets may be linked to the visibility queue only (i.e. single path), when generated on account of visibility events (e.g. dropping). Or, visibility packets may be duplicated to the visibility queue (i.e. copied or mirrored) such that the original packet follows its normal path, as well as traverses the visibility path (e.g. for non-terminal events such as non-critical delay monitoring).

In some embodiments, an existing queue 142 may temporarily be processed by a visibility subsystem 160 as a special visibility queue 142 (e.g. where the queue 142 has a delay greater than a certain threshold, or where an assigned packet 105 has been dropped before entering the queue 142).

The visibility subsystem may utilize visibility packets for a number of different purposes, depending on the embodiment. For instance, visibility packets 105 may be stored for some period of time in a repository, where they may be viewed and/or analyzed through external processes. A visibility subsystem 160 may automatically produce logs or notifications based on the visibility packets 105. As another example, certain types of special visibility packets may be sent to or consumed by custom hardware and/or software-based logic (deemed a "healing engine") configured to send instructions to one or more nodes within the network to correct problems associated with those types of special visibility packets. For instance, the visibility subsystem 160 may include a healing engine that dynamically changes configuration settings 115 of device 100 directly in response to observing visibility packets having certain characteristics. Or, such a healing engine may be coupled to a collector node (also known as a "collector") that is external to the device 100, and the visibility subsystem 160 may forward visibility packets to the collector.

In an embodiment, the visibility subsystem 160 may comprise or be implemented by a central processing unit within the device 100 that may be configured programmatically to utilize the visibility packets in a variety of manners. As another example, the visibility subsystem 160 may include its own packet processing logic that sends some or all of the visibility packets to various outgoing interfaces, such as an Ethernet port, external CPU, sideband interface, and so forth. Visibility packets may also or instead be sent for data mining to a collector node, which may be one or multiple network nodes (e.g. cluster of servers).

Visibility Reports

According to an embodiment, a visibility subsystem such as visibility subsystem 160 may be configured to generate visibility reports based on the visibility packets it receives. A visibility report may include metadata related to one or more visibility events, such as one or more dropped packets, contents of a queue related to the event(s), a delay value indicating the delay experienced by the queue(s), a queue size, a queue size acceleration value, a flow identifier, a heavy flow indicator, and so forth. Generating the visibility report may involve correlating visibility packets based on a flow identifier, queue identifier, event identifier, or other suitable attribute identifier, and then calculating statistics based thereon. A visibility report may also or instead involve looking up statistics or other metadata related to corresponding queues, flows, or events. In an embodiment, the visibility report may be stored in a suitable repository. Or, a notification comprising the visibility report may be sent to a system administrator, healing engine, or other suitable entity.

2.10. Visibility Samplers

According to an embodiment, device 100, or any other device configured to generate visibility packets, may include visibility sampling logic configured to reduce the number of visibility packets that are generated and/or delivered to a downstream component of the device 100, such as the visibility subsystem 160 and/or an external collector. Instances of the visibility sampling logic, which may be referred to herein as visibility samplers, may be deployed at any suitable location within the device 100.

For instance, one or more visibility samplers may be deployed between one or more visibility event monitors and a visibility subsystem 160 to reduce the number of visibility packets that reach the visibility subsystem 160. As another example, if a visibility subsystem 160 forwards visibility packets on to another collector, one or more visibility samplers may be coupled to the output of the visibility subsystem 160. As yet another example, a visibility event monitor may comprise a visibility sampler that reduces the number of packets that are actually transformed into visibility packets. As yet another example, a visibility sampler may be deployed prior to the visibility event monitor (e.g. coupled to the queue assignment logic, ingress packet processor, etc.) to mark particular packets 105 as being eligible for transformation to visibility packets.

In an embodiment, a visibility sampler reduces the number of visibility packets by identifying a sample (subset) of packets processed by the sampler that may be interest from a visibility standpoint, and blocking packets that are not part of that sample from visibility operations. This thereby limits visibility traffic to a rate that is manageable for a visibility subsystem 160 or other suitable collector of the visibility traffic. In determining that a packet is part of such a sample, the visibility sampler is said to select, or "sample," the packet. From another perspective, the visibility sampler may be seen as sampling actual visibility events, by blocking packets not associated with the sampled visibility events from becoming visibility packets and/or being forwarded to a visibility subsystem.

In the case of post-event samplers that process packets after visibility event(s) related to the packets have already occurred, a sampler allows only the sample that it identifies to pass through the sampler, blocking other packets deemed not to be of interest. In the case of pre-event samplers that process packets prior to events occurring, a sampler marks each packet in the sample it identifies to be visibility-eligible, thus indicating to downstream visibility event monitoring logic that each packet in the sample may trigger a visibility event and/or be transformed into a visibility packet in response to a visibility event.

For example, to avoid overloading device 100 with traffic on account of visibility packets, a traffic shaper may be utilized as a visibility sampler to limit the amount of visibility traffic to a certain amount (e.g. a packet rate limit or byte rate limit). If the rate is surpassed, the visibility sampler may drop visibility packets before they enter the visibility queue to avoid overloading the device 100. Such a rate may be set globally, and/or rates may be prescribed for specific tags, groups, flows, or other packet characteristics, and/or for specific visibility queues associated therewith.

One example use of samplers is to provide buffer drop capture, in which a certain number of data units dropped from a buffer are selected for visibility, with the SOP portion of each sampled packet added to a visibility queue. Another example use of samplers is to provide sampling on queue drop forensics. That is, instead of sending a snapshot of an entire queue at the time of a packet drop to a collector, the data units in the queue are marked as forensic packets and forwarded to a sampler that is configured to select only a limited number of the data units in the queue for transmission to a collector. As yet another example, samplers may be used to provide high delay capture, in which a snapshot is taken of the data units in a queue whose monitored delay exceeds a threshold. The data units are marked as high delay packets, and sent to a sampler configured to select only a limited number of the data units in the queue for transmission to a collector. Of course, samplers may be utilized for sampling any set of visibility packets, regardless of their type, or indeed any other data unit sent thereto.

Figure 9:
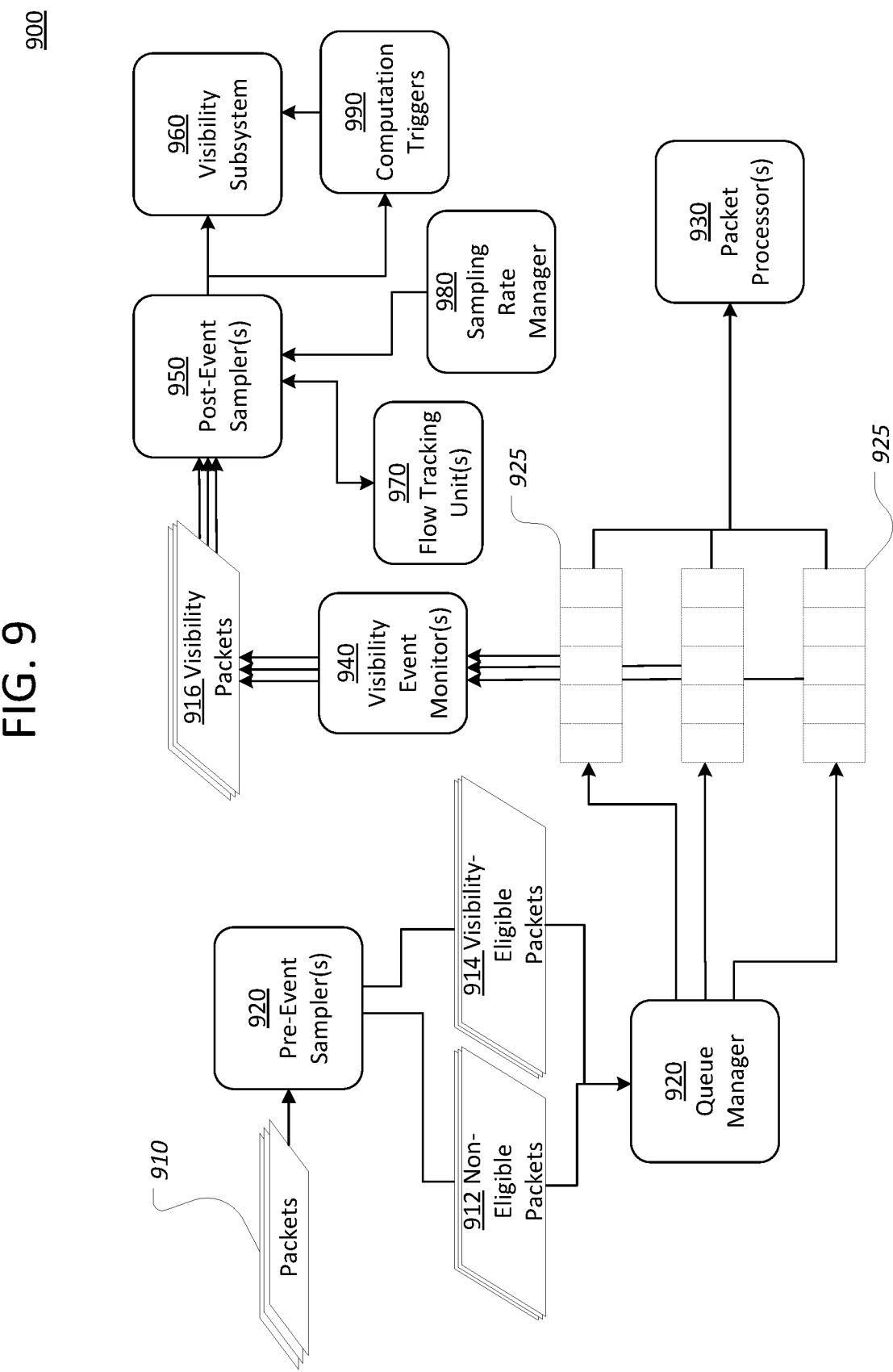
FIG. 9 is a block diagram of a subsystem for generating and sampling visibility packets within a network device.

FIG. 9 is a block diagram of a subsystem 900 for generating and sampling visibility packets within a network device, according to an embodiment. Subsystem 900 may be implemented in any network device, including without limitation network device 100 as well as other contexts. The various components 920-990 of subsystem 900 may be implemented by any combination of hardware-based logics within one or more ASICs, FPGAs, or other integrated circuits of the device. In some embodiments, some or all of the components 920-990 may alternatively be implemented by general-purpose processor(s) executing software-based instructions.

Pre-Event Sampling

Subsystem 900 includes a pre-event sampler 920 configured to receive packets 910, or portions thereof. The pre-event sampler 920 may be found in a traffic manager, such as traffic manager 125, or any other suitable component.

The pre-event samplers 920 determine, for each packet 910, whether the packet 910 is a visibility-eligible packet 914 or a non-eligible packet 912. In an embodiment, the pre-event sampler 910 may associate metadata indicating eligibility for visibility operations with each visibility-eligible packet 914, such as by inserting a special tag in the packet header. Non-eligible packets 912 need not necessarily be associated with any metadata, so long as they are differentiable from the visibility-eligible packets 914. In an embodiment, the pre-event sampler 920 may insert a special tag into each non-eligible packet 912 instead of each visibility-eligible packet 914.

In some embodiments, a visibility-eligible packet 914 may be eligible for some types of visibility events, but not others. Hence, the metadata may indicate for which visibility event type(s) the visibility-eligible packet 914 is eligible. A single pre-event sampler 920 may determine eligibility for each event type, or there may be different pre-event samplers 920 that determine eligibility for different types of visibility events, and each packet 910 may pass through some or all of such samplers 920 depending on the configuration.

The sample of the packets 910 that become visibility-eligible packets 914 may be determined using any suitable sampling logic. For example, the pre-event sampler 920 may determine the sample based on packet header fields or other packet attributes. Each packet 910 that has a specific attribute, or an attribute in a specific set of attributes, may be sampled. In the case of the pre-event sampler 920, this means that packets 910 with those attribute(s) are marked as a visibility-eligible packets 914 while other packets 910 are determined to be non-eligible. Attributes may include, without limitation, a priority level for the packet, a specific source port or address, a specific destination port or address, an assigned queue 142, a specific flow or flow type (e.g. lossy versus lossless), a traffic class, and so forth. For instance, a system administrator may desire insight into delays on storage traffic. A pre-event sampler 920 may therefore tag any packet that is determined to be storage traffic with metadata indicating that it is eligible for visibility processing in the event of queue delay.

In an embodiment, only a subset of packets in a flow over a certain period of time (e.g. a specific time interval, or while the flow is considered to be active) are marked as visibility-eligible packets 914. For instance, the subset may be the first packet in a flow, or first number of packets in a flow. Or, the subset may be a sequence of packets in the middle of the flow, such as after seeing a certain number of packets in the flow.

One example of such flow-based sampling may be referred to as repeating flow filtering, which prevents the sampler 920 from sampling a flow of data units more than a certain number of times. For instance, the second time (and subsequent times) a visibility event is detected for a given flow in a given period, the sampler 920 might automatically mark the associated visibility packet as being not visibility-eligible so as to filter out repeated visibility events associated with the flow.

Flow tracking logic may be utilized to determine the flow to which a packet belongs 910. For instance, such logic may calculate a flow identifier for a packet based on one or more of its attributes. The flow tracking logic may further determine whether the packet is first in the flow within a time period by updating flow counters for the flow or other suitable mechanisms. In an embodiment, the flow tracking logic may include a flow tracking unit 1050 as described in other sections, though any other suitable flow tracking mechanism may be utilized. In some embodiments, a sampler may also or instead mark packets 910 as visibility-eligible packets 914 when they are determined to belong to flows that are "heavy," in that a count of the number of packets received for that flow exceeds some threshold, either in aggregate or over a specific period of time, depending on the embodiment.

As another example, the pre-event sampler 920 may determine the sample based on rate-aware sampling logic. The rate-aware sampling logic selects a certain number of packets 910 to sample in a given time period. For instance, the pre-event sampler 920 may mark every third or every tenth packet 910 as visibility-eligible, or the first five packets 910 out of every one-hundred packets 910. Although any rate-aware mechanism may be utilized, in an embodiment, a ticket-based mechanism may be utilized, as described elsewhere herein.

As another example, the pre-event sampler 920 may determine the sample based on probabilistic sampling logic. Rather than keeping track of an exact rate at which packets 910 are sampled, the pre-event sampler 920 may determine whether a given packet 910 is visibility-eligible using a randomization mechanism that is weighted such that the likelihood of the given packet 910 being sampled is equal to a certain percentage, also referred to as the sampling rate. This makes it highly likely that, over an extended period of time, approximately the certain percentage of the packets 910 processed by the pre-event sampler 920 will be sampled.

Pre-event samplers 920 may further use combinations of the foregoing and/or other sampling logic. For instance, a pre-event sampler 920 may sample the first packet in each flow only a certain percentage of the time, or sample only three out of every 100 packets from a certain flow.

The non-eligible packets 912 and visibility-eligible packets 914 are provided, with appropriate metadata, to a queue manager 920, so that they may be assigned to one or more queues 925. The pre-event sampler 920 need not necessarily be deployed immediately before the queue manager 920, but rather the packets 912 and 914 may pass through other components before arriving at the queue manager 925. Queue manager 925 may function as any other queue manager described herein, and includes queue assignment logic configured to determine which queue(s) 925 to assign a given packet 910 to. In an embodiment, the queue assignment logic is agnostic as to whether a packet 910 has been designated as visibility-eligible.

In an embodiment, pre-event samplers 920 may be optional, and thus not included in a network device, or at least not necessarily found in every packet processing pipeline. In such cases, packets 910 are provided to queue manager 920 directly without visibility-eligibility tagging, and all packets 910 may be treated as visibility-eligible packets 914.

Event Monitoring and Contextual Sampling

Subsystem 900 further includes one or more visibility event monitor(s) 940. The visibility event monitor(s) 940 may be part of queue manager 920 and/or a traffic manager, or they may be separate and discrete units within the implementing device. Visibility event monitors(s) 940 are examples of visibility event monitoring logic described elsewhere herein.

A visibility event monitor 940 monitors one or more of the queues 925 for events of interest. While most packets 910 will pass through queues 925 to packet processors 930 (e.g. packet processors 150B) without event, some packets 910 may experience unexpected, undesirable, or otherwise exceptional events into which a visibility event monitor 940 provides insight. These visibility events may include, without limitation, queue tail drops or other dropped packets, enqueuing or dequeuing a packet marked in a certain way, expired queues, dequeuing the last packet in a queue 925, or any other event described herein. The visibility event monitor 940 either transforms the affected packets 910 into visibility packets 916, or generates a new visibility packet 916 comprising information associated with the event.

In an embodiment, a visibility event monitor 940 may detect a visibility event each time a packet 910 from a queue 925 is processed when the queue 925 is in a certain state, thus sampling the packets 910 in queues 925 contextually. Visibility event monitors 940 may thus have access to various queue statistics, such as queue sizes, counters, and so forth, so as to determine the state of each queue 925 that it monitors. Example queue states of interest may include, without limitation, a congested state as indicated by a queue size above a certain threshold, a delayed state as indicated by a queue delay above a certain threshold, a shallow queue state indicated by queue size falling below a certain threshold (e.g. indicating that other queues are monopolizing resources), a flow control state, and so forth. Combinations of the foregoing may be used, such as a combination of a high queue delay state and a shallow queue size state, or a high queue delay when a queue is in a "transmit off" (e.g. PFC Xoff) flow control state.

In an embodiment, a queue growth rate may be utilized to characterize the state of a queue 925. A queue growth rate indicates how quickly the size of a queue 925 grows (or decreases) over time, indicating bursts of network traffic. Hence, visibility packets 916 may be generated when the growth rate is high so as to gain insight into traffic bursts at a specific queue 925. A variety of mechanisms may be utilized to track the queue growth rate, including directly comparing historical queue sizes for the queue 925 at various time intervals, or maintaining a running average of the queue size (e.g. using an exponentially weighted moving average). A user may define various thresholds that indicate specific states corresponding to the queue growth, such as a low growth rate, normal growth rate, or high growth rate. The thresholds may be global, or queue-specific.

In an embodiment, a queue growth acceleration may also or instead be utilized to characterize a queue state. The acceleration indicates how quickly the queue growth rate is changing over time. For instance, the acceleration may be a difference in the growth rate at the current time and the last time the acceleration was updated. Or, a moving average of this difference may be utilized. Again, various thresholds for this metric may correspond to different queue states.

According to an embodiment, the visibility event monitor(s) 940 only generates visibility events for a certain number or percentage of queues 925 that have the highest queue size and/or queue delay, thereby contextually sampling only the most congested or more delayed queues 925. For instance, the visibility event monitor(s) may generate visibility packets for visibility events in only the top five percent of queues 925, or fifty queues 925, in terms of queue sizes and/or delays.

In an embodiment, rather than determining whether the size or delay of a given queue falls within the highest percentile each time a packet from the queue is processed, such a determination may be made at certain intervals of time. Data classifying the queue as belonging or not belonging to the highest percentile may be stored and used until the next determination occurs at the start of the next time interval. The determination may be made for all queues at the same time, or the determination may be made for subsets of queues on a rolling basis. For instance, size and/or delay percentiles may be re-calculated based on the latest measures for a first set of queues in a first clock cycle, for a second set of queues in a second clock cycle, and so forth, until all queues have been processed, at which time the pattern may repeat. Alternatively, or additionally, percentiles for certain queues may be updated more frequently than others (e.g. when their delay measures are updated, or when their size measures are above a threshold).

In an embodiment, to determine which queues belong to this context, visibility event monitor(s) 940 may be configured to compare the sizes and/or delays of each queue 925, which may be a relatively costly process. In an embodiment, to reduce costs, the minimum and maximum sizes (or delays) of queues 925 over a period of time are calculated. Optionally, an average or median size (or delay) may be calculated as well. Based on the maximum and minimum sizes (or delays), and optionally the average or median, a threshold size (or delay) may be calculated, and all queues 925 with sizes (or delays) above the threshold, are considered to have a high size (or delay) for the purpose of detecting visibility events. The threshold may be recalculated in similar manner over time.

Example mechanisms for tracking queue sizes and tracking queue states are described in, without limitation, U.S. application Ser. No. 14/958,830, entitled "Efficient Resource Tracking," by Matthews et al., filed Dec. 3, 2015, the entire contents of which are hereby incorporated by reference for all purposes as if set forth herein.

In an embodiment, visibility event monitor 940 only detects, or generates visibility packets 916 for, visibility events involving visibility-eligible packets 914. For instance, if a queue 925 is currently in a congested state, the visibility event monitor 940 may nonetheless ignore any non-eligible packets 912 that are dequeued from the queue 925, and only generate visibility packets 916 when a visibility-eligible packet 914 is dequeued. As another example, a visibility event monitor may ignore dropped non-eligible packets 912. As another example, visibility event monitor 940 may only determine certain queue states when dequeuing visibility-eligible packets 914.

Post-Event Sampling

Visibility packets 916 are processed by one or more post-event samplers 950. Each post-event sampler 950 determines a sample of the visibility packets 916 to pass on to a visibility subsystem 960, such as visibility subsystem 160 or any other suitable visibility subsystem. The post-event sampler 950 may sample visibility packets 916 using any suitable sampling techniques, including the probability-based, rate-aware, attribute-based, and flow-based sampling techniques already described with respect to the pre-event sampler 920, with the difference being that, instead of sampling packets 910 to identify visibility-eligible packets 914, the visibility packets 916 are being sampled to determine which visibility packets 916 are to be sent to the visibility subsystem 960. Moreover, the post-event sampler 950 may also sample based on queue context, as described above.

In an embodiment, for at least certain event types, a post-event sampler 950 may be configured to only sample visibility packets 916 for recurrent events. Hence, the first one or more times a visibility event occurs (e.g. the first time a packet having a certain attribute is dropped), the visibility packet 916 for the event may be discarded. After the event occurs more than a certain number of times, the associated visibility packets 916 may be sampled.

In an embodiment, upon determining to sample a packet, a post-event sampler 950 may trigger additional computations with respect to that packet, or with respect to a queue or flow to which the packet belongs. For instance, there may be a defined set of computation triggers 990 that are activated when a certain type of visibility packet 916 is sampled. Such computations may be utilized to collect additional state information or statistics. In some embodiments, the state information and/or statistics are added to the triggering visibility packet 916, while in other embodiments, the state information and/or statistics are recorded in a repository where they can be subsequently be correlated to the visibility packet 916 using a flow identifier, event identifier, or other suitable identifier.

In an embodiment, a post-event sampler 950 may be embedded within the visibility event monitor 940, such that visibility packets 916 are not generated unless a packet 910 associated with a visibility event is sampled by the post-event sampler 950. In yet other embodiments, a post-event sampler 950 may be deployed within the visibility subsystem 960, such that visibility packets 916 may be received by the visibility subsystem 960, but discarded without consideration if not sampled by the post-event sampler 950. In yet other embodiments, a post-event sampler 950 may be deployed after the visibility subsystem 960, such that visibility packets 916 forwarded by the visibility subsystem 960 to an external collector may be sampled.

In an embodiment, post-event samplers 950 are optional. In such an embodiment, visibility subsystem 960 may rely exclusively on pre-event sampling to reduce the number of visibility packets 916.

Flow Identification

Repeating flow filtering and/or other sampling techniques may be based on a flow to which a packet belongs. The flow may be identified using any suitable flow identification mechanism, such as a combination of one or more packet attributes.

In an embodiment, to determine whether a visibility packet is the first such packet to have been generated for a flow, a device or each visibility event monitor 940 may maintain a counter of how many visibility packets have been received for each possible flow, which may optionally be reset after a period of inactivity (e.g. using a flow timeout value).

In an embodiment, for sampling of visibility events that are detected when dequeuing packets, flow tracking may be performed on a per-egress-pipeline or per-ingress pipeline basis. In an embodiment, for sampling of visibility events that are detected on enqueue, if there are multiple ingress pipelines enqueuing on the same clock cycle, flow tracking may be performed per each ingress pipeline in parallel.

Of course, depending on the granularity with which flows are identified, this may be a relatively expensive approach, since memory must be dedicated to each possible flow for storing a counter, and optionally a timeout value. If each pipeline and/or visibility event monitor tracks flows separately, the amount of memory needed quickly multiplies.

In an embodiment, to reduce costs associated with tracking the first visibility packet for a flow, a special flow tracking unit 970 may be utilized. Each pre-event sampler 920 and/or post-event sampler 950 may have its own flow tracking unit 970. Alternatively, each queue 925 may have its own flow tracking unit 970. Or, there may be a limited number of flow tracking units 970, and the flow tracking units 970 may be dynamically allocated to samplers that are configured to perform flow-based sampling as needed (e.g. on a first-come-first-serve basis). Flow tracking units 970 may be deallocated if a sampler becomes inactive or ceases performing flow-based sampling.

In an embodiment, flow tracking is performed separately for each possible visibility event type. For instance, the first visibility packet in each flow for each possible visibility event type may be sampled. Hence, there may be a separate flow tracking unit 970 for each visibility event type.

Figure 10:
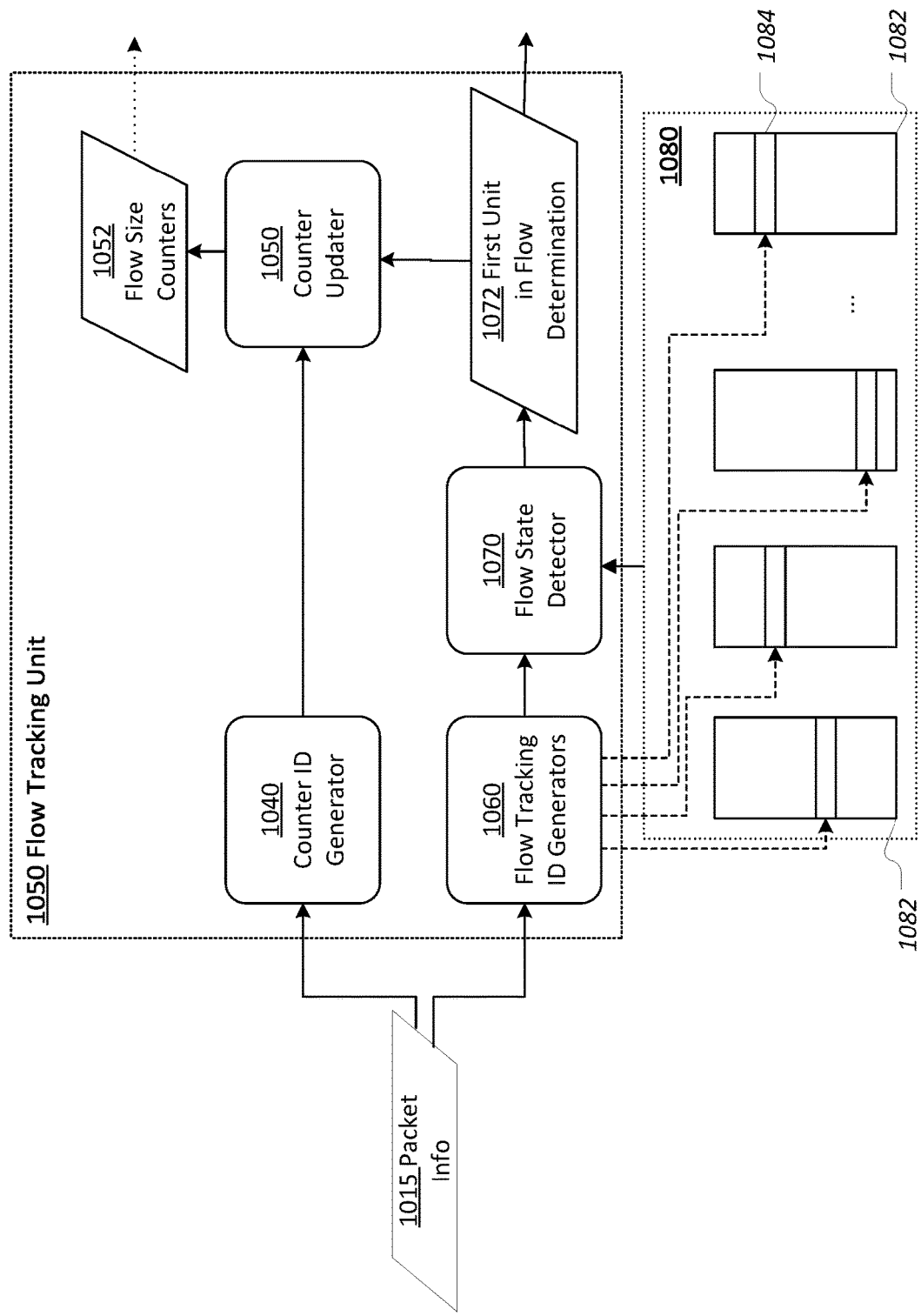
FIG. 10 illustrates an example flow tracking unit.

FIG. 10 illustrates an example flow tracking unit 1050, according to an embodiment. Flow tracking unit 1050 is an example of a flow tracking unit 970, though a flow tracking unit 970 may take other forms, and flow tracking unit 1050 may be used in other contexts. For instance, one or more flow tracking units 1050 may be deployed at other locations within the packet processing pipeline, such as for tracking traffic flows on packet ingress.

When a sampler or other component needs to determine whether a packet is the first packet seen for a particular flow in a particular context (e.g. for a specific queue and/or specific visibility event type), the sampler inputs packet information 1015 for the packet into the flow tracking unit 1050. The packet information 1015 may be the entire packet, the packet header(s), or just specific attributes of the packet.

The packet information 1015 is inputted into one or more flow tracking identifier generators 1060. Each flow tracking identifier generator 1060 uses a different mapping mechanism to determine a flow tracking identifier to map to the packet information 1015. For instance, each mapping mechanism may be a function, such as a hash function, of the packet information 1015. There may be any number of flow tracking identifiers (e.g., two, four, eight, etc.).

Each flow tracking identifier corresponds to a specific memory entry 1084 in a different portion 1082 of a memory 1080. There is one portion 1082 for each function or other mapping mechanism. Each portion 1082 may be a different physical memory bank, or some or all of the portions 1082 may be different locations in a same memory bank. For instance, each portion 1082 may be a different multi-ported, or pseudo multi-ported, memory that supports Read-Modify-Write operations. Each memory entry 1084 stores a single value (e.g. a bit).

Based on the flow tracking identifiers generated for a packet, a flow state detector 1070 determines whether the packet is the first packet in a flow. When any value of any memory entry 1084 that corresponds to one of the flow tracking identifiers generated for a given packet is empty, null, zero, or otherwise in a default state, the flow state detector 1070 determines the packet to be the first packet in its flow. Moreover, all values of all memory entries that correspond to the flow tracking identifiers generated for a given packet are then set to a non-default value (e.g. one), so that subsequent packets in the flow will not be determined to be the first packets in the flow. The flow state detector 1070 outputs a determination 1072 of whether the packet is the first in its flow.

The memory entries 1084 may be reset periodically and/or in response to certain events, such that after some time, a flow for which a packet has already been received may be considered new again. For instance, each memory entry 1084 may be reset to a default value every certain number of seconds. As another example, each memory entry 1084 may be reset to a default value after sending a queue snapshot in response to certain types of visibility events. As another example, each memory entry 1084 may be reset to a default value after a queue delay has fallen below a configurable threshold that indicates that the queue has exited a high delay state. As another example, each memory entry 1084 may be reset to a default value if more than a certain number of packets have been received after a queue delay has risen above a threshold indicating a high delay state.

Heavy Flow Reporting

Optionally, in an embodiment, if a packet is determined to belong to a flow for which a packet has already been received, flow tracking unit 1050 may be configured to track a size of the flow. The packet information 1015 may be provided to a flow counter identifier generator 1040. The flow counter identifier generator 1040 generates another flow identifier based on the packet information 1015, such as by using a hash function or other mapping mechanism. A counter updater 1050 maps each flow counter identifier to a corresponding flow tracking counter 1052, and updates the counter 1052 associated with that identifier, thereby indicating a current size or weight of the flow. In an embodiment, flow size counters 1052 may be reset along with memory entries 1084.

In yet other embodiments, other techniques of maintaining flow size counters may be utilized, such as maintaining flow size counters for all flows, regardless of visibility events, which counters may be reset at certain intervals and/or in response to certain events.

A visibility subsystem or other suitable component may harvest a flow tracking report from the flow tracking unit (e.g. at the end of a visibility event, when a queue exits a high-delay, queue expiration, or other visibility-related state, and so forth). Flow size counters indicating the sizes of flows may be correlated to visibility packets belonging to those flows, thereby providing further insight into flows associated with visibility events.

In an embodiment, flow size counters may further be utilized to identify "heavy" flows-those with flow size counters above a certain threshold. Packets from those flows may subsequently be marked (e.g. using Explicit Congestion Notification ("ECN")) to indicate congestion to support congestion control. In an embodiment, congestion marking logic may be configured to use the flow size counter for a flow, or a state derived therefrom, to determine whether to mark packets for the flow. For instance, all packets for a heavy flow may be marked, or a certain percentage of packets from a flow may be marked, where the percentage is selected based on the heaviness of the flow.

In an embodiment, an aggregate weight count across some or all of the tracked flows is also calculated or maintained. The aggregate weight count is useful for determining the relative size of a flow relative to other tracked flows, and may be reported along with the flow size counter of a flow. In yet other embodiments, the sizes of all of the other tracked flows may be reported instead of the aggregate weight count, though this may require additional reporting bandwidth and processing.

In an embodiment, a dropped packet counter is also maintained for each flow, or at least each flow being tracked by a flow tracking unit 1050. For instance, upon dropping a packet for a queue, the flow tracking unit 1050 may be queried to determine if there is already flow size counter 1052 for the flow associated with the dropped packet. If so, a dropped packet counter corresponding to the flow size counter 1052 may be incremented. A dropped packet counter may be reported along with the flow size counter for a flow. In an embodiment, contextual sampling may also or instead be performed based on the dropped packet counter (e.g. based on comparing a drop rate determined from the dropped packet counter to a configurable drop rate threshold).

Flow tracking unit 1050 is but one example of a flow-tracking mechanism configured to identify the first packet in a flow and/or maintain flow counters. Other mechanisms may include fewer or different elements in varying arrangements. For instance, in another embodiment, there may be only a single memory portion 1082 and single flow tracking identifier, which in some cases may also be used as the flow counter identifier. Each memory entry 1084 may store a flow size count instead of a single bit.

One application of flow identification may be, for instance, to take a snapshot of a queue, where only the first packet of each flow within the queue appears in the snapshot. For instance, the queue may be expired, dropped, or marked for forensics, such that each packet is to be tagged for visibility processing. Rather than forward each packet to the visibility subsystem, however, a flow tracking unit may be allocated to a sampler, and the sampler may process each packet in the queue. Only those packets within the queue that are indicated to be the first packet in each flow pass through the sampler. However, the flow tracking unit may optionally keep a count of each flow size, which may then be correlated with each flow's sampled packet. The flow tracking unit may then be reset upon completion of the snapshot.

Chained Samplers

According to an embodiment, samplers may be deployed one after another in a series. For instance, in FIG. 9, instead of a single pre-event sampler 920, there may be a chain of pre-event samplers 920. Or, instead of a single post-event sampler 950, there may be a chain of post-event samplers 950. A chain may have any number of samplers in it.

A chain of samplers may be disjunctive or conjunctive. For example, if a chain of pre-event samplers 920 is disjunctive, then a packet 910 marked as a visibility-eligible packet 914 by a first sampler 920 in the chain would remain a visibility-eligible packet 914 even if not sampled by another sampler 920 in the chain. Conversely, a packet 910 marked as a non-eligible packet 912 by a first sampler 920 in the chain could nonetheless become a visibility-eligible packet 914 if another sampler 920 sampled the packet 910.

If the chain is conjunctive, on the other hand, a packet 910 would need to be sampled by all pre-event samplers 920 in the chain to be considered a visibility-eligible packet 914-thus, a pre-event sampler 920 in the chain might be configured to remove a visibility-eligible tag that was previously inserted into a packet 910 if the sampler 920 does not also sample that packet 910. Of course, chains might further include both pre-event samplers 920 that operate disjunctively and pre-event samplers 920 that operate conjunctively.

In an embodiment, post-event samplers 950 may be configured to discard any non-sampled visibility packets, and pass down the chain only the visibility packets 916 that they sample. Hence, the post-event samplers 950 would operate conjunctively. Nonetheless, in another embodiment, a chain of disjunctive post-event samplers 950 may be deployed if they are configured to tag the visibility packets 916 that they sample, and to pass all visibility packets 916 down the chain. A final member of the chain would then, based on the tags, discard all non-sampled visibility packets 916.

Figure 14:
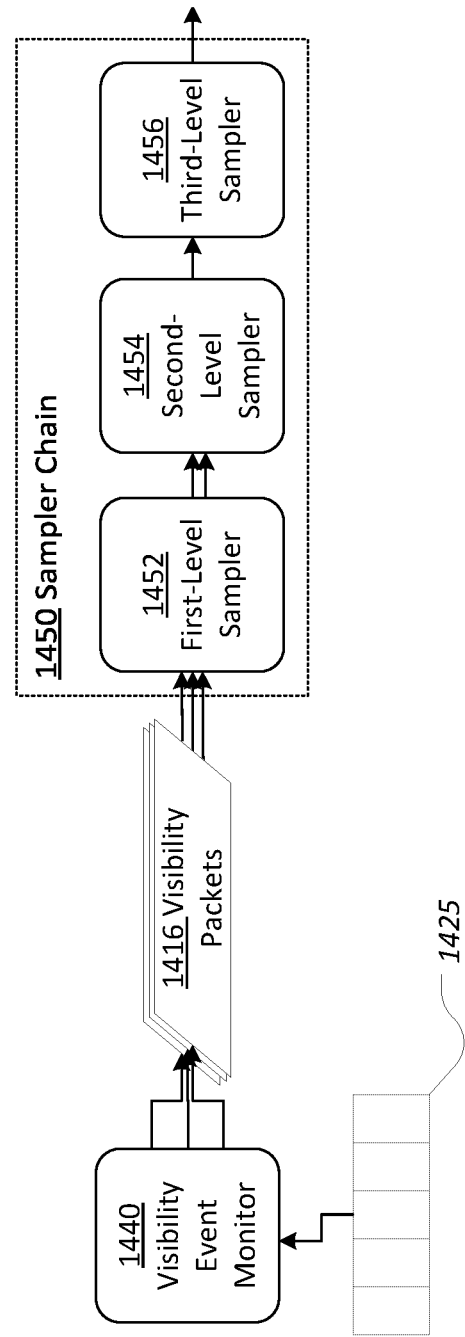
FIG. 14 illustrates a sampler chain.

FIG. 14 illustrates a sampler chain 1450, according to an embodiment. In FIG. 14, visibility event monitor(s) 1440 for one or more queue(s) 1425 generate visibility packets 1416 and outputs those visibility packets 1416 into a sampler chain 1450. Sampler chain 1450 comprises a first-level sampler 1452 coupled to a second-level sampler 1454 which is in turn coupled to a third-level sampler 1456. Each of the samplers 1452-1456 may sample visibility packets 1416 based on different criteria. For instance, sampler 1452 might sample all visibility packets 1416 belonging to queue(s) 1425 that have an acceleration above a certain threshold, while sampler 1454 might sample visibility packets 1416 belonging to queue(s) that have a queue delay above a configurable threshold, while sampler 1456 might sample only the first packet in each flow. Assuming the chain 1450 is conjunctive, then the end result would be that the only visibility packets 1416 that will be sampled are those that are first in their respective flows and that belong to queues that have both a high delay and high acceleration.

Any combination of sampling logic may be used. For instance, a two-sampler chain might have a first sampler that samples for packets that belong to queues having a queue delay above a certain threshold and a second sampler that further samples for packets belong to queues having a queue delay in a top quartile relative to all other queues. As yet another example, a three-sampler chain might first sample for packets belonging to queues having a shallow queue size, then sample for packets belonging to queues having a queue delay above a threshold, and finally sample based on a batch ticket policy, as explained subsequently.

Sampler Aggregation

Figure 15:
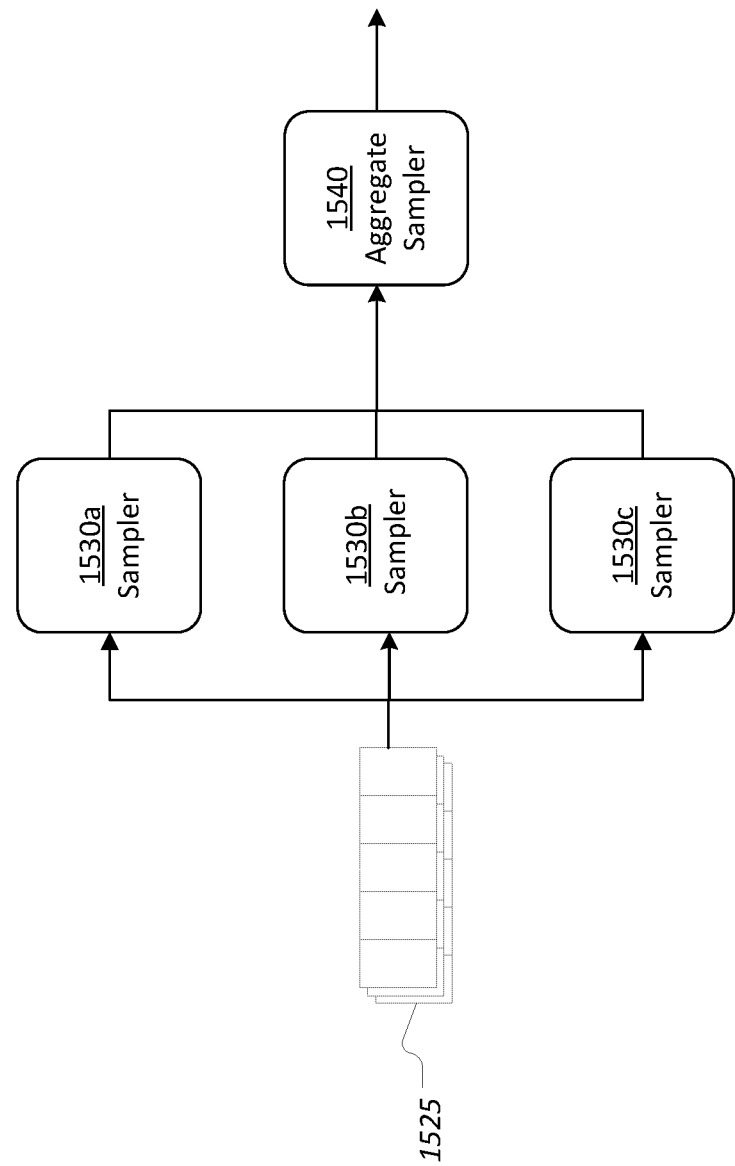
FIG. 15 illustrates a hierarchy of samplers.

In an embodiment, samplers may further be arranged hierarchically. For example, FIG. 15 illustrates a hierarchy of samplers, according to an embodiment. Visibility packets from queues 1525 are fed to different first-level samplers 1530a-c in parallel. Samplers 1530 may each process the same visibility packets, but using different sampling logic. Or, samplers 1530 may each process different visibility packets from different visibility event monitors (e.g. monitoring for different events and/or monitoring different queues 1525). Those visibility packets sampled by samplers 1530 are passed on to a single aggregate sampler 1540 that samples all of the packets it receives.

For instance, aggregate sampler 1540 may be a probabilistic or rate-aware sampler, whereas the first-level samplers 1530 may sample for specific types of events. Or, first-level samplers 1530 may be associated with specific ports, groups of ports, classes of service, or other constructs.

In an embodiment, aggregate sampler 1540 may filter out duplicate visibility packets. For instance, a packet may have been duplicated and/or assigned to multiple queues 1525. If multiple copies of the packet are transformed into visibility packets that eventually pass through different samplers 1530, the aggregate sampler 1540 may eliminate all but one of these copies.

FIG. 15 illustrates a relatively simple hierarchy. Other hierarchies may comprise additional samplers and/or levels. For instance, there may be multiple levels of aggregate samplers 1540. Moreover, each level may have one, two, or any number of samplers.

Ticket-Based Rate-Aware Sampling

Figure 11:
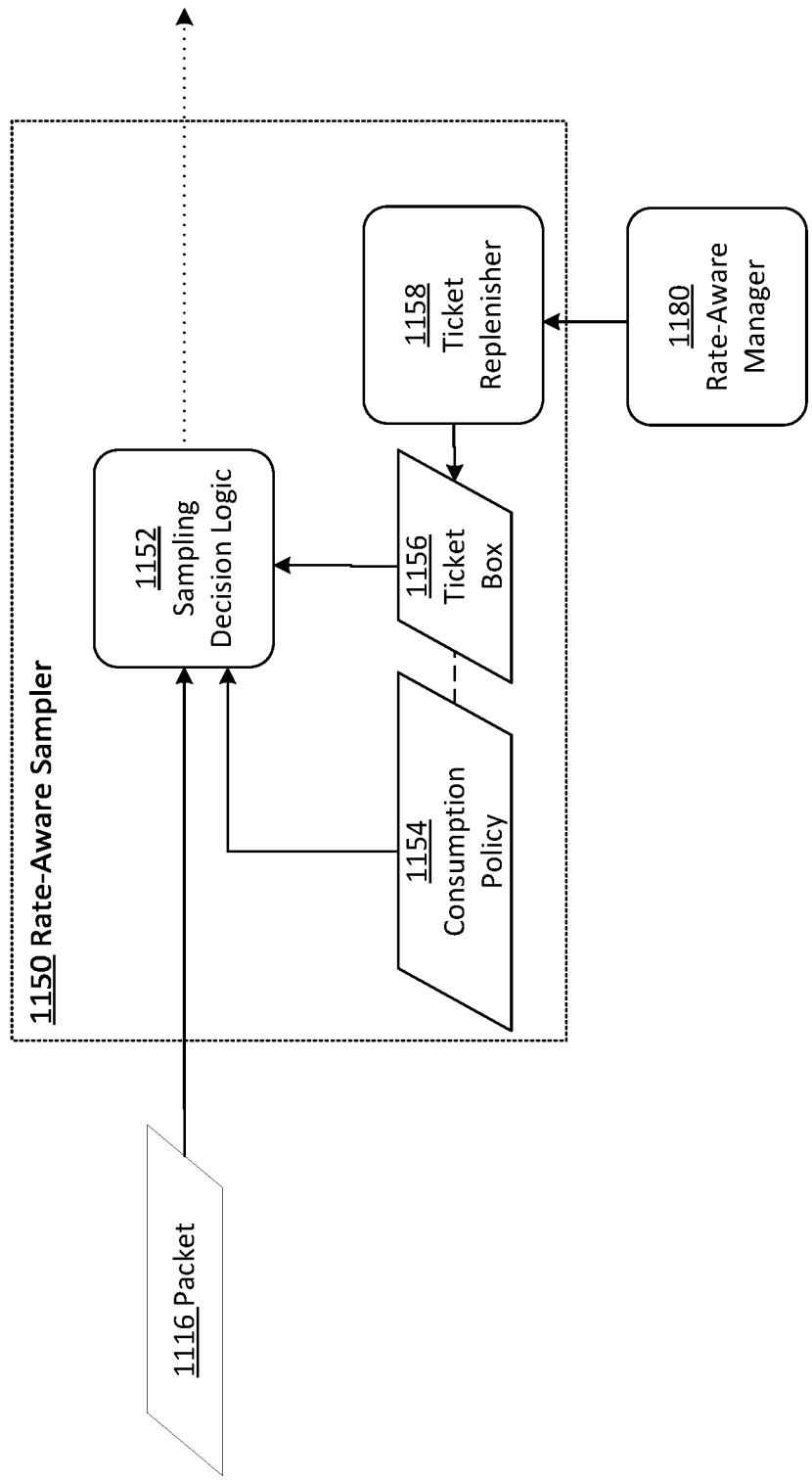
FIG. 11 illustrates an example rate-aware sampler.

Although any rate-aware mechanism may be used for rate-aware sampling logic, in some embodiments, a ticket-based rate-aware sampling mechanism may provide certain advantages. FIG. 11 illustrates an example rate-aware sampler 1150, according to an embodiment. Each time a packet 1116 is received or processed by the rate-aware sampler 1150, sampling decision logic 1152 in the rate-aware sampler 1150 determines whether to sample the packet 1116, or to discard the packet. If there are any tickets remaining in a ticket box 1156, the sampling decision logic 1152 may, potentially contingent upon other conditions, determine to sample the packet 1116. Otherwise, the sampling decision logic 1152 discards the packet 1116.

If the packet 1116 is sampled, a ticket is removed from the ticket box 1156. In embodiments where the decision is contingent upon other conditions, the other conditions may include any other sampling considerations described herein, such as visibility-eligibility, attribute-based considerations, contextual considerations, and so forth. Hence, a ticket is used only if, after all other considerations, the packet 1116 is still sampled.

In an embodiment, a consumption policy 1154 may indicate conditions under which a ticket may be consumed for a packet. The consumption policy might, for instance, temporarily allow for a ticket to be consumed even if the ticket box 1156 is empty (e.g. accruing a negative ticket balance) to permit sampling of traffic bursts. If the number of tickets falls below the level indicated by the consumption policy, the ticket box 1156 enters a "consumed all" state. This state may optionally be broadcast to other entities such as an aggregate sampler or a sampling rate manager 1180, as described subsequently.

Tickets are added to the ticket box 1156 periodically, or at other intervals, via a ticket replenisher 1158. For instance, a ticket replenisher may be configured to add a batch of tickets to the ticket box 1156 every certain number of seconds. The ticket replenisher 1158 may be a sampler-specific component within the rate-aware sampler, or there may be a shared ticket replenisher for multiple rate-aware samplers 1150. In an embodiment, the ticket box 1156 may have a maximum capacity, beyond which no further tickets may be added.

As discussed above, in an embodiment, under certain circumstances, a ticket box 1156 may be allowed to accrue a negative ticket balance. In an embodiment, the ticket replenisher 1158 may be configured to adapt to a negative balance by adjusting the replenishment period to be longer so as to maintain the target average rate.

In an embodiment, a sampler may include different ticket boxes 1156 for different visibility event types or other purposes. In this manner, a sampler may only sample visibility events if they are of an event type that has not occurred more than a certain number of times in a certain period. Each of these ticket box 1156 may be replenished at a same rate, or the ticket replenisher 1158 may be configured to replenish the ticket boxes 1156 at different rates.

A visibility event may be considered to be a re-occurring event if it shares certain predefined attributes with another visibility event that has occurred within a period of time. For example, in an embodiment, there might be various types of re-occurring events, such as buffer drop capture events, high delay capture events, and queue forensic events. In an embodiment, events may not be considered re-occurring unless they occur with respect the same queue. That is to say, for instance, if there has already been a buffer drop from a first queue within a certain period of time, another buffer drop event from the first queue would be considered re-occurring, whereas a buffer drop from a second queue would not (assuming there has been no buffer drops from that second queue). Of course, there may be other types of re-occurring events in other embodiments. As a further example, without limitation, events of the same type from the same source or flow might be considered re-occurring events, without regard to the queue in which they occurred.

By providing tickets in batches, the ticket-based rate-aware sampling mechanism enables sampling of bursty traffic in cases where visibility events of interest occur in batches or bursts of activity. Because there is a fixed rate of replenishment, the bursts of activity may be sampled while still maintaining a configurable average rate. This sampling mechanism might thus also be referred to as burst sampling.

In another embodiment, the tickets might be referred to as tokens, with the ticket boxes being considered token buckets. In yet another embodiment, instead of a ticket-based mechanism, each time an event of a certain type occurs, an associated counter may be incremented. If the counter is ever above a threshold (e.g. one, two, etc.), further events of the same type may not be sampled until the counter is reset. The maximum rate at which re-occurring events are reported is thus a function of the threshold and the period of time before the counter is reset.

Regardless of the implementation, the re-occurring event control rate may be global, or specific to queues and/or event types, depending on the embodiment. Hence, for instance, different ticket boxes, token buckets, or counters may have different replenishment rates or reset periods.

Sampling Rate Management

Returning briefly to FIG. 9, subsystem 900 may include a sampling rate manager 980. Although depicted as coupled to post-event sampler 950, a sampling rate manager 980 may be coupled to any number of samplers, including pre-event samplers 920 in some embodiments. Sampling rate manager 980 controls the rate at which a rate-aware sampler 920 or 950 samples packets 910. For instance, sampling rate manager may instruct a sampler 920 or 950 to sample a certain percentage of packets, or to replenish tickets for rate-aware sampling at a certain rate. The sampling rate manager 980 may change the rate for any of a variety of reasons, including in response to changes in the states of queues 925 or other device components.

As for the ticket-based rate aware mechanism of FIG. 11, the rate-aware sampler 1150 may be coupled to a sampling manager 1180, which is a specific example of the sampling rate manager 980. In some embodiments, the batch size for a batch of tickets, the replenishment period, and/or the ticket box capacity may be sampler-specific and/or dynamically adjustable by a sampling rate manager 1180.

In an embodiment, the batch size and/or replenishment period may be jittered randomly to avoid synchronization issues, whereby certain visibility events are missed entirely because they or other visibility events occur at a specific frequency that aligns with the replenishment period. For each ticket box 1156, there may be a base batch size (e.g. ten tickets) or base replenishment period (e.g. 100 nanoseconds), which will correspond to the average batch size or replenishment period over time. A jitter offset is randomly calculated and added to the base ticket size (e.g. plus or minus up to three tickets) or base replenishment period (e.g. plus or minus up to ten nanoseconds) to determine the actual ticket size or replenishment period for any given replenishment period.

In an embodiment, the batch size, replenishment period, and/or ticket box capacity may be adjusted based on a variety of other factors, such as port speed, priority, and so forth. In an embodiment, there may be different profiles that indicate different batch sizes, replenishment periods, and/or ticket box capacities. The profiles used for a given sampler may vary based on various factors.

For instance, in an embodiment, different profiles may be selected based on a current time-of-day, day of the week, day of the month, and/or other time-based factors. The profile may be loaded using, for instance, a hardware-based clock that is synchronized with other devices. For instance, a time synchronization protocol, such as specified by IEEE 1588, may be used to synchronize clocks between devices. The devices may then replenish tickets at an exact same time, or they may precisely align their replenishment periods with each other, such that each device starts its replenishment period at a certain offset relative to the devices to which it is connected. Synchronization may allow for precise synchronization of batch ticket samplers in case anomalous events require coordination of batch ticket samplers to be able to correlate network issues. In some embodiments, software-based synchronization may be utilized instead.

According to an embodiment, sampling rate adjustments may take into consideration the specific arrangement of samplers in a series and/or hierarchy. For example, there may be a hierarchy of ticket-based samplers, in which lower-level ticket-based samplers (e.g. samplers 1530) have, in aggregate, a larger ticket capacity than a higher-level aggregate sampler (e.g. sampler 1540) into which they feed. Consequently, there may be times where packets provided by a subset of the lower-level samplers quickly exhaust the number of available tickets in the higher-level aggregate sampler, preventing packets supplied by other samplers from being sampled by the aggregate sampler.

For instance, suppose a hierarchy in which the lower-level samplers are port-specific, with eight samplers corresponding to eight ports. Each lower-level sampler is provided a batch of 256 tickets each replenishment period, with the replenishment period set to one second. Each lower-level sampler (and corresponding port) would thus sample up to 256 visibility packets per second, for a total of 2048 packets per second in aggregate. The aggregate sampler might be provided a smaller number of tickets than provided, in aggregate, to the lower-level samplers—such as one fourth the total, or only 512 visibility packets per second. In some circumstances, therefore, the hierarchy may enter into a pattern of the aggregate sampler immediately using up all 512 packets at the beginning of each replenishment period for packets provided by a small set, or even just two, of the lower-level samplers, leaving the aggregate sampler unable to sample packets from the other lower-level samplers.

A batch size adjustment policy might therefore be tailored to preventing or minimizing occurrences of such situations. A sampler rate manager may be configured to periodically input state information from each sampler, such as current batch sizes and/or an indication of whether each lower-level and aggregate sampler has consumed all of its tickets. Based on this information, the sampler rate manager may select new batch sizes for each sampler. For instance, the sampler rate manager may increase a batch size for a sampler if the aggregate sampler has not consumed all of its tickets. However, if the aggregate sampler has consumed all of its tickets, the sampler rate manager may decrease the number of tickets supplied to samplers that have consumed all of their tickets, while leaving the batch size of other samplers the same.

In some embodiments, there may be fixed batch size levels, such as a set of five fixed batch sizes (e.g. 64, 128, 256, 384, and 512), and the policy may move a sampler up or down one or more levels based on the foregoing logic. In an embodiment, there may be a policy table that indicates the number of tickets to provide to a lower-level sampler based on its current batch size, as well as whether the lower-level sampler has consumed all of its tickets and whether the aggregate sampler has consumed all of its tickets.

In an embodiment, instead of having a constant batch size, the batch size changes each replenishment period, based on a decaying function (e.g. growing smaller each new period until reaching a minimum value and then jumping back to a maximum value), a random function, or any other suitable function.

Miscellaneous

In an embodiment, a device may have a fixed number of sampler units, which are dynamically configurable to support various sampling logic. In an embodiment, there may be different types of samplers, with a fixed number of each type. In an embodiment, the samplers may be coupled dynamically to different inputs and outputs based on need. For instance, to diagnose certain problems in a network device, a system administrator might activate a visibility event monitor for a certain queue, and dynamically couple a chain of samplers to the visibility event monitor, with the last sampler in the chain outputting to a visibility subsystem.

In an embodiment, the arrangement of samplers within a device may be fixed, but the sampling logic for each sampler may be adjusted or even deactivated as needed. For instance, a network device might ship with certain chain(s) or hierarch(ies) of samplers in place, but in a passthrough state whereby they "sample" all packets (e.g. mark all packets as visibility-eligible, or let all visibility packets pass through). Some or all of the samplers may subsequently be reconfigured to sample based on criteria as described elsewhere herein.

2.11. Miscellaneous

Device 100 and subsystem 900 illustrate only some of many possible arrangements of components configured to provide the functionality described herein. Other arrangements may include fewer, additional, or different components, and the division of work between the components may vary depending on the arrangement. For instance, a subsystem 900 may include additional samplers 920/950, event monitors 940, visibility subsystems 960, or other components deployed in different locations. Components such as computation triggers 990, sampling rate manager 980, and/or flow tracking units 970 may be optional in some embodiments.

As another example, in some embodiments, deadline profiles 145, ingress arbiter 170, ingress packet processor 150A, and/or visibility subsystem 160 may be omitted, along with any other components relied upon exclusively by the omitted component(s). As another example, there may be any number of ports 110/190.

As another example, in an embodiment, a device 100 may include any number of buffer managers 120, each coupled to a different set of packet processors 150. As a packet 105 is processed by one packet processor 150, assuming the packet 105 is not sent out of the device 100, the packet 105 may be forwarded to the buffer manager 120 for the next packet processor 150 to handle the packet 105. For example, there may be an ingress buffer manager 120 for newly received packets 105, a buffer manager 120 for traffic flow control, a buffer manager 120 for traffic shaping, and a buffer manager 120 for departing packets. The buffer managers 120 may share buffers 130, such that the packets 105 are passed by memory reference and need not necessarily change locations in memory at each stage of processing. Or, each buffer manager 120 may utilize a different set of buffers 130. In such embodiments, there may be a single queue manager 140 for all queues 142, regardless of the associated buffer manager 120, or there may be different queue managers 140 for different buffer managers 120 (e.g. for an ingress buffer manager, egress buffer manager, etc.).

Though only one egress processor 150B and a single traffic manager 125 are depicted in FIG. 1, a device 100 may comprise any number of egress processors 150B and traffic managers 125. For instance, different sets of ports 110 and/or ports 190 may have their own traffic managers 125 and egress processors 150B. Or, there may be different traffic managers 125 and egress processors 150B for different stages of processing. Similarly, there may be any number of ingress arbiters 170 and any number of ingress processors 150A. Moreover, the number of ingress processors 150A need not necessarily correspond to the number of egress processors 150B within device 100. Nor need the number of egress processors 150B correspond to the number of traffic managers 125.

In an embodiment, a device 100 may include multiple pipelines of data unit processing components. A pipeline may include, for instance, an ingress arbiter 170, an ingress packet processor 150A, an egress traffic manager 125, and an egress packet processor 150B. Each pipeline is coupled to a set of ingress ports 110 from which the ingress arbiter 170 receives packets 105. The ingress arbiter 170 manages the flow of packets 105 to an ingress packet processor 150A. An interconnect is coupled to each ingress packet processor 150A on one end and each egress traffic manager 125 on the other. The ingress packet processors 150A control which egress traffic manager 125 the data units 105 they process are sent to. A pipeline's egress traffic manager 125 then regulates the flow of the data units 105 it receives to the pipeline's egress packet processor 150B, which is coupled to a set of egress ports 190. The set of egress ports 190 corresponds to the pipeline's ingress ports 110. In yet other embodiments, an egress traffic manager 125 and/or other components may be shared between such pipelines.

For simplification, the traffic managers, packet processors, and other components are on occasion described herein as acting upon or with respect to a data unit, when in fact only a portion of the data unit may be sent to or otherwise available to the component. For instance, a packet processor may be said to process a data unit, when in fact only the data unit control portion is available to the packet processor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

It will be appreciated that the actual physical representation of a data unit may change as a result of the processes described herein. For instance, a data unit may be converted from a physical representation at a particular location in one memory to a signal-based representation, and back to a physical representation at a different location in a potentially different memory, as it is moved from one component to another within a network device or even between network devices. Such movement may technically involve deleting, converting, and/or copying some or all of the data unit any number of times. For simplification, however, the data unit is logically said to remain the same data unit as it moves through the device, even if the physical representation of the data unit changes. Similarly, the contents and/or structure of a data unit may change as it is processed, such as by adding or deleting header information, adjusting cell boundaries, or even modifying payload data. A modified data unit is nonetheless still said to be the same data unit, even after altering its contents and/or structure.

3.0. Functional Overview 3.1. Transforming Packets into Visibility Packets

Figure 12:
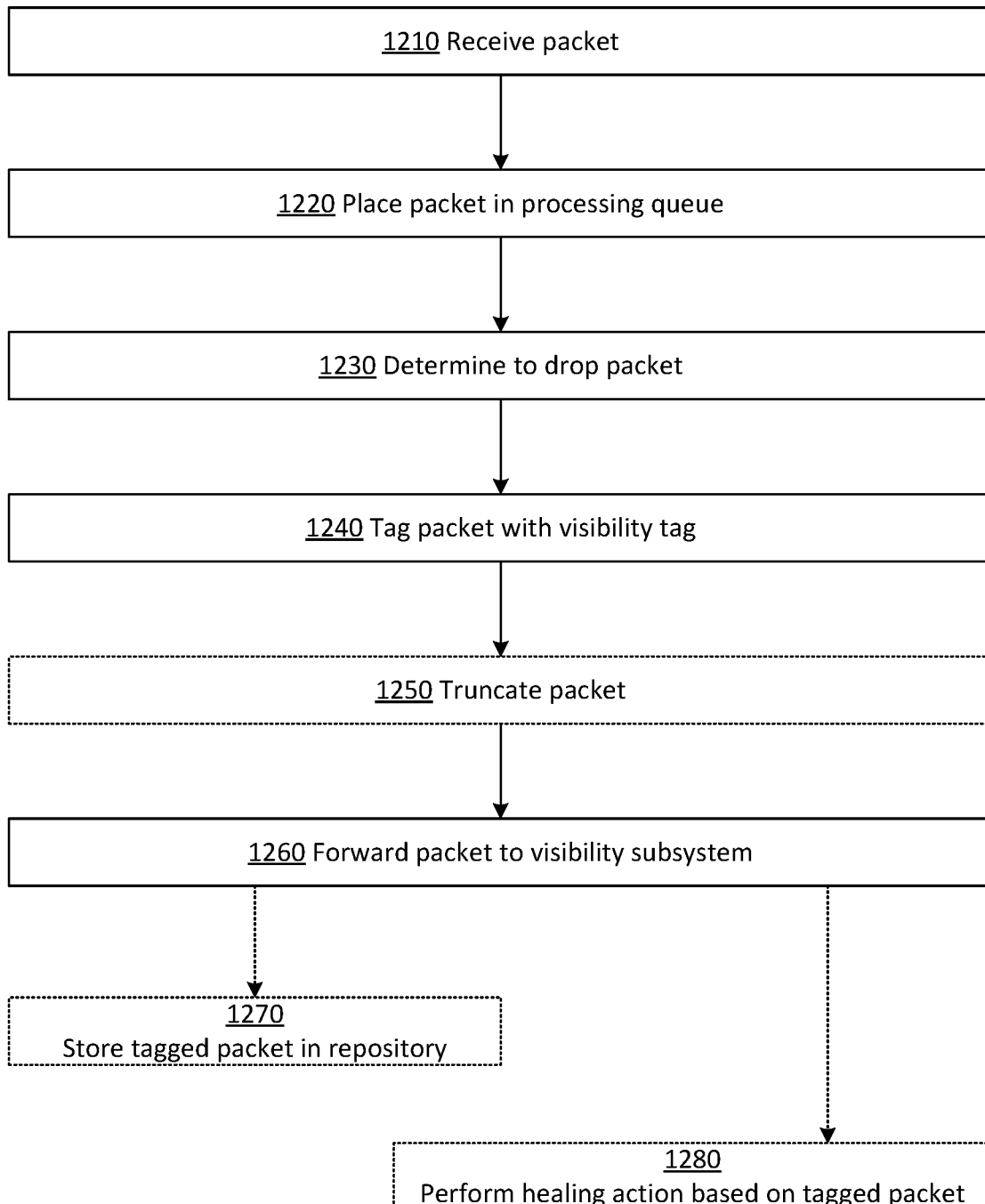
FIG. 12 illustrates an example flow for transforming dropped packets into visibility packets.
Figure 13:
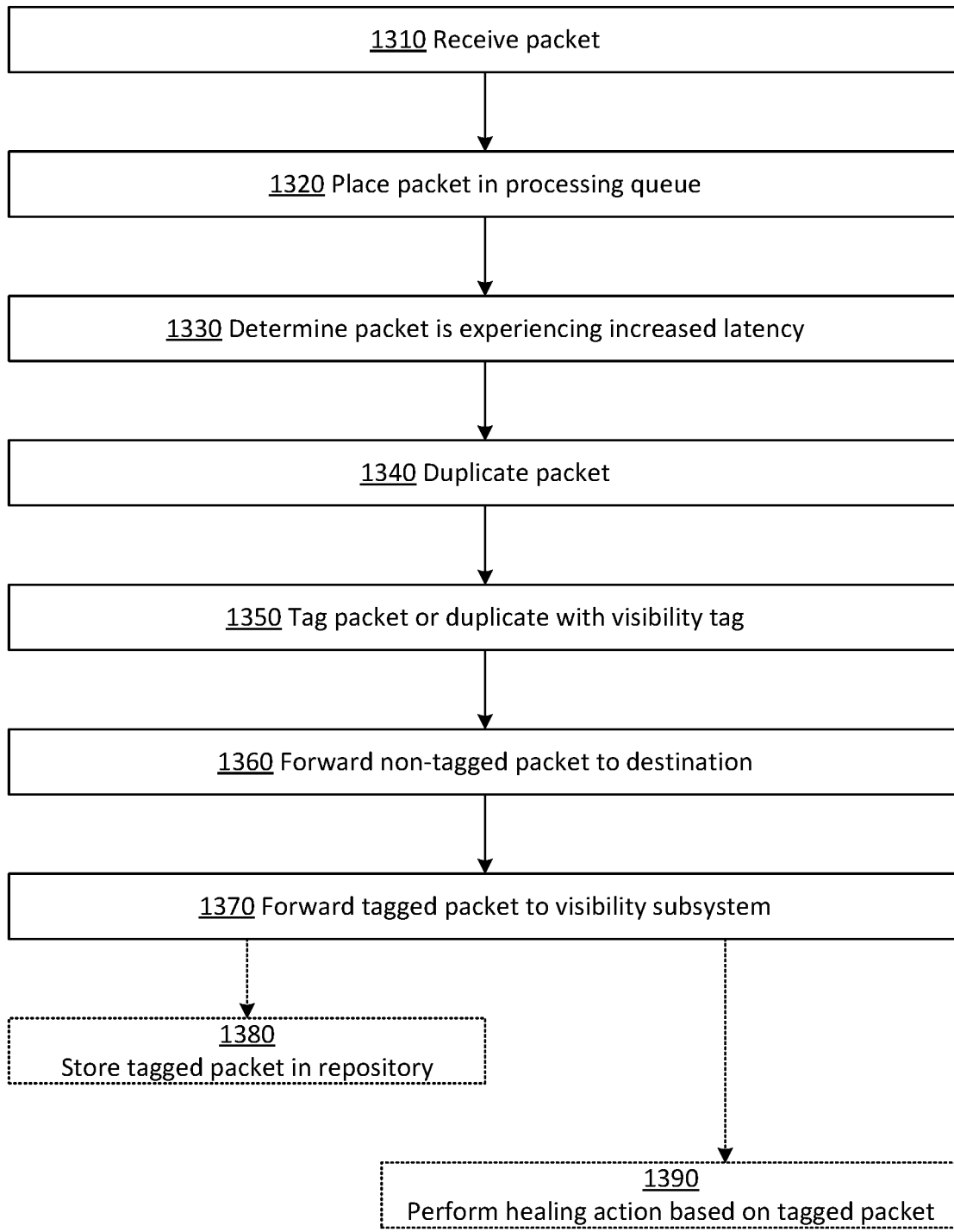
FIG. 13 illustrates an example flow for generating visibility packet for delayed packets.

FIG. 12 illustrates an example flow 1200 for transforming dropped packets into visibility packets, according to an embodiment. FIG. 13 illustrates an example flow 1300 for generating visibility packet for delayed packets, according to an embodiment. The various elements of flows 1200 and 1300 may be performed in a variety of systems, including systems such as system 100 described above. In an embodiment, each of the processes described in connection with the functional blocks described below may be implemented using one or more integrated circuits, computer programs, other software elements, and/or digital logic in any of a general-purpose computer or a special-purpose computer, while performing data retrieval, transformation, and storage operations that involve interacting with and transforming the physical state of memory of the computer. Depending on the embodiment, a device may be configured to perform flow 1200 or 1300 at least partially concurrently with other flows described herein, or a device may be configured only to perform flow 1200 and/or 1300.

Block 1210 comprises receiving a packet, such as a packet 105, at a device, such as device 100. Block 1220 comprises placing the packet in a processing queue while the packet awaits processing by the forwarding logic of the device. The queue may be selected based on a variety of characteristics of the packet, such as the ingress port through which it was received, the destination address of the packet, a type or class of the packet, a flow of the packet, and so forth. The packet may, in some embodiments, have already been processed in one or more other queues by one or more other stages of processing.

Block 1230 comprises determining to drop the packet. Such a determination may be made for a variety of reasons, such as described elsewhere herein. For instance, there may be a table lookup failure whereby the forwarding logic of the device cannot find a valid path for the packet's destination address in the device's forwarding table. Or, the packet itself may be corrupt, the packet may be delayed for more than a threshold amount of time, or there may simply be no available queues or buffers for handling or storing the packet.

The determination to drop the packet may be an implicit determination. That is, rather than explicitly determining to drop the packet, the forwarding logic may revert to performing blocks 1240-1280 by default when certain events, such as those mentioned above, occur. For instance, blocks 1240-1280 may correspond to a default or "catch-all" path in a forwarding table, that applies to any packets that the forwarding logic cannot resolve to other paths.

Block 1240 comprises tagging the packet with a visibility tag in response to the determination to drop the packet. The tagging of the packet effectively transforms the packet into a visibility packet.

Block 1240 may be performed for any packet that is to be dropped, or only for packets that meet other additional criteria. For example, block 1240 may only be performed for packets associated with certain flows, destinations, sources, packet types, service classes, and so forth. Additionally, or instead, qualifying packets may be selected only at a certain frequency (e.g. once a second, one out of every twenty dropped packets, etc.), which optionally may vary based on characteristics of the packet. Hence, block 1240 may be preceded by one or more steps of determining whether these additional criteria are met. Criteria may be fixed for the device, specified programmatically, and/or adjusted by logic internal to the device.

The forwarding logic may tag the packet with a visibility tag in any number of ways, depending on the embodiment. For example, the forwarding logic may annotate the header of the packet, replace some or all of the payload with the tag, or generate sideband information that is associated with an identifier of the packet or its corresponding buffer. The visibility tag may include a flag, label, or other identifier that is recognized as signifying that the packet is a visibility packet and should thus be handled by a visibility subsystem. The tag may optionally include other information to help diagnose problem(s) that may have led to the drop, such as an identifier of the processing queue to which the packet was assigned, an identifier of the network device, an error or drop type, related statistics, and so forth.

In an embodiment, not all of the packet need be tagged. For example, where different subunits of the packet may be processed independently (e.g. where the packet is subdivided into cells or frames) a start-of-packet subunit of the packet may be tagged. Other portions of the packet may be unaffected.

Block 1250 comprises optionally truncating the packet. This may involve, for example, truncating the packet to a certain size, or removing certain designated portions (such as any portion of the payload that does not correspond to the tag). Or, where separate subunits of the packet are processed individually (e.g. cells or frames), this may involve discarding subunits of the packet other than the start-of-packet subunits and optionally one or more following subunits.

Block 1260 comprises forwarding the tagged packet to a visibility subsystem. The visibility subsystem may take different forms in different embodiments. For example, in an embodiment, the visibility subsystem is internal to the network device that transformed the packet into a visibility packet. The packet is "forwarded" to the subsystem by being placed in (or linked to) a visibility queue, from which it is eventually read by the visibility subsystem. As another example, the visibility subsystem may be on a network device external to the device that transformed the packet into a visibility packet. After waiting in a visibility queue, the packet may be forwarded to the subsystem by encapsulating the packet within another header that targets the address at which the visibility subsystem is found. In yet other embodiments, there may be multiple visibility subsystems. For example, after performing some preliminary analysis, a device's internal visibility processing logic may forward all visibility packets that it has generated, or a sample of those visibility packets, to an external device for additional analysis.

The visibility subsystem may perform a variety of actions with visibility packets. Two non-limiting examples of such actions are illustrated in blocks 1270 and 1280. Block 1270 comprises storing the visibility packet in a repository. The repository may serve, for example, as a log which may be inspected by a network administrator to diagnose network problems. The repository may keep all visibility packets, or only those that meet certain filtering conditions specified by the network administrator. Visibility packets may be kept in the repository for a certain period of time, and/or aged out as necessary to make room for new visibility packets.

Block 1280 comprises performing one or more healing actions based on the tagged packet. Block 1280 presupposes that the visibility subsystem comprises a healing engine, or that the repository of block 1270 is monitored and analyzed by a healing engine. Actions may be taken solely on the basis of the tagged packet, or based on trends or metrics related to a number of similarly generated visibility packets.

A healing action may involve reconfiguring any aspect of the network in which flow 1200 is performed. For instance, the healing action may involve updating a forwarding table, adjusting a path weight, restarting a system, changing a policy or priority level for a flow or class of traffic, and so forth. In some cases—for example, if the healing engine is external to the device at which the visibility packet is generated-performing the healing action may involve sending an instruction to another device to update its configuration. Specific actions may be defined by various customizable rules stored at the healing engine.

Turning now to FIG. 13, flow 1300 begins with blocks 1310 and 1320, which are the same as blocks 1210 and 1220, respectively.

Block 1330 comprises determining that the packet is experiencing increased latency. The determination may be made based on timestamps associated with the packet itself, or may be inferred more generally based on metrics associated with device. That is, if a certain port to which the packet is to be forwarding is experiencing high levels of congestion, an increase in latency may be inferred for the packet.

Optionally, block 1330 may comprise determining whether additional criteria for transforming the packet into a visibility packet are met. For example, in addition to requiring increased latency, the forwarding logic of the device may check to see whether the packet has certain other specified characteristics, such as being associated with certain flows, destinations, sources, packet types, service classes, and so forth. Additionally, or instead, qualifying packets may be selected for transformation only at a certain frequency (e.g. once a second, one out of every twenty dropped packets, etc.), which optionally may vary based on characteristics of the packet.

In yet other embodiments, block 1330 may more generally be viewed as determining whether visibility transformation criteria, such as described above, apply. The existence of high latency may be viewed as but one of several criteria to be evaluated. The criteria may include evaluating for other events instead of or in addition to the packet experiencing increased latency. Criteria may be fixed for the device, specified programmatically, and/or adjusted by logic internal to the device.

Block 1340 comprises duplicating the packet. In an embodiment, the entire packet need not be duplicated, but rather only a certain portion of the packet may be duplicated (e.g. the first n bytes of the packet, the packet header, the start-of-packet, etc.).

Block 1350 comprises tagging the packet or duplicate packet with a visibility tag in response to the determination to drop the packet, as described with respect to block 1240. Since the packet and duplicate packet are the same, in an embodiment, it does not matter which packet is tagged. However, in embodiments where only a portion of the packet is duplicated, then the duplicate packet is tagged.

Block 1360 comprises forwarding the non-tagged packet to its specified destination. That is, unlike in flow 1200 where the packet is dropped, the packet of flow 1300 (or its duplicate) continues to be forwarded to its destination address.

Meanwhile, block 1370 comprises forwarding the tagged packet to a visibility subsystem, as described with respect to block 1260. Blocks 1380 and 1390 then correspond to blocks 1270 and 1280, respectively.

Flows 1200 and 1300 illustrates only several of many possible flows by which the forwarding logic of an apparatus may generate visibility packets. Other flows may include fewer, additional, or different elements, in varying arrangements. For example, blocks 1250, 1270, and/or 1280 may be optional for flow 1200, while blocks 1380 and 1390 may be optional for flow 1300. As another example, a visibility subsystem may perform yet other actions than those identified in blocks 1270, 1280, 1380, and 1390. Moreover, visibility packets may be generated for other reasons and at other times beyond those illustrated with respect to FIGS. 12 and 13.

Figure 3:
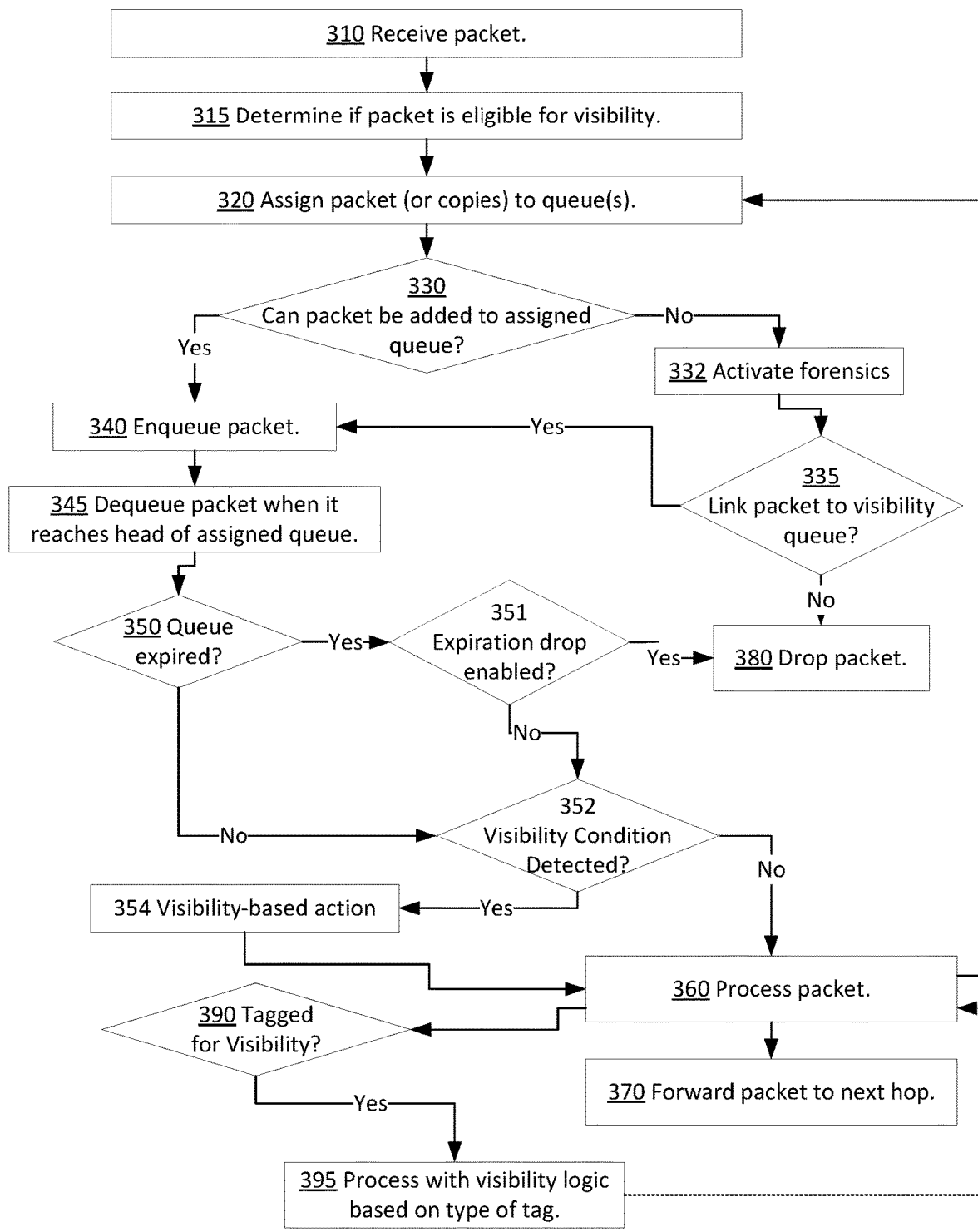
FIG. 3 illustrates an example flow for handling packets using queues within a network device.

As another example, the forwarding logic has been simplified to address only decisions related to visibility tagging. It will be recognized that a device's forwarding logic includes a number of other elements utilized for other purposes, and these elements may result in logical decisions that precede and obviate certain steps of flows 1200 and 1300, and/or that occur after some or all of the steps in flow 1200 or 1300. 3.2. INTELLIGENT-QUEUE-BASED PACKET HANDLING FIG. 3 illustrates an example flow 300 for handling packets using queues within a network device, according to an embodiment. The various elements of flow 300 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 310 comprises receiving a packet, such as a packet 105. The packet may be received from another device on a network. For example, the packet may be a packet addressed from a source device to a destination device, and the device receiving the packet may be yet another device through which the packet is being forwarded along a path. As another example, if the packet is generated by the network device itself, the packet may be received from an internal component that generated the packet. The packet, when received, may be processed by a packet processor, such as a packet processor 150, for various reasons described elsewhere.

Block 315 comprises determining that a packet is eligible for visibility processing. For various reasons, in some embodiments, certain types of packets are deemed visibility ineligible. For example, the user may only want to have visibility on certain high priority flows. As another example, the incoming packet may be a visibility packet from an upstream device that the receiving device may thus elect not to perform additional visibility processing on. If the packet is ineligible for visibility processing, the packet is enqueued (if resources permit) and dequeued normally, without special consideration for visibility processing.

Block 320 comprises assigning the packet (or one or more copies thereof) to a queue, such as a queue 142. Block 320 may comprise, for instance, the buffer manager sending the packet, or information indicating a location in memory where the packet has been stored, to queue management logic, along with an indication of a queue that has been selected for the processing of the packet (e.g. as provided by upstream logic, such as packet processor 150A). Selection of the queue to which the packet should be assigned may involve consideration of a variety of factors, including, without limitation, source or destination information for the packet, a type or class of the packet, a QoS level, a flow to which the packet is assigned, labels or tags within the packet, instructions from a processing component that has already processed the packet, and so forth.

Block 330 comprises determining whether the packet may be added ("enqueued") to the assigned queue. There may be any number of reasons why the device may not be able to add the packet to the assigned queue. For instance, the queue may be expired. Or, the size of the queue may be too large to add additional packets. Or, there may be too few buffers available for the queue because other queues have consumed all of the available buffers. Or, adding the packet may cause the queue to surpass a rate limit for processing queues over a recent period time. Size and rate restrictions may be global, queue-specific, or even specific to a particular property of the packet. Yet other reasons for not being able to add the packet to the assigned queue may also exist, depending on the embodiment.

If, in block 330, the packet cannot be added to its assigned queue, the flow proceeds to block 332. In block 332, optionally, forensics may be activated for the queue to which the packet was assigned. For example, if the packet is assigned to Port 0, Queue 3, but is dropped due to the queue length being greater than the queue size limit, Queue 3 (or all queues for Port 0) may be placed in a forensics state where the contents of the queue(s) are provided a drop forensics tag upon departure from the queue(s).

Meanwhile, in block 335, it is determined whether the packet can and should be linked to a visibility queue for processing by a visibility subsystem. In an embodiment, only packets having certain characteristics (e.g. ports, flows, groups, protocol types, sources, assigned queues, etc.) are added to a visibility queue. There may be different queues for some or all of the characteristics. In an embodiment, packets are further or instead selected for linking to a visibility queue based on probabilistic sampling (e.g. every third packet that has a certain characteristic, one packet every other clock cycle, etc.) or rate-aware sampling (e.g. a set of ten consecutive packets every one thousand packets). Or, in an embodiment, there may be a single queue to which all packets are automatically added. In any case, block 335 may further comprise determining whether there is actually room for the packet in the special visibility queue, or whether a visibility rate limit will be surpassed.

If, in blocks 330/335, it is determined that the packet cannot be added to its assigned queue or a visibility queue, flow 300 proceeds to block 380, where the packet is dropped, meaning that it is either removed or diverted from normal processing.

On the other hand, if, in blocks 330 or 335, it is determined that the packet can be added to a queue, flow 300 proceeds to block 340. At block 340, the packet is enqueued. The packet is typically added at the tail of the queue. Queue management logic will, over time, shift the packet closer and closer to the head of the queue, until in block 345, the packet reaches the head of the queue and is dequeued. In an embodiment, packets within the queue are processed in a first-in-first-out (FIFO) order. Optionally, for delay tracking purposes, a marker identifier and timestamp for the assigned queue may be created and/or updated at this time.

Block 350 comprises determining whether the queue is expired, as may occur from time to time in certain embodiments if a queue expiration delay-based action is enabled. This determination may be made in a number of manners, such as detecting an expiration tag in the dequeued packet, receiving a signal from queue management logic, reading a status of the queue, comparing a queue delay to an expiration delay threshold, and so forth. If the queue is expired, and if expiration dropping determined to be enabled per block 351, flow proceeds to block 380. Otherwise flow proceeds to block 352.

Block 352 comprises determining whether a visibility condition is detected. For instance, a visibility condition may be detected if the queue is expired (per block 350) or if the queue is in a state of excessive delay. This determination may be made in similar manner as to above, but with respect to one or more thresholds or states associated with one or more levels of excessive delay. If the queue is in such a state, then at block 354, a visibility-based action is performed, such as tagging the packet with a tag associated with the level of delay, annotating the tag with queue metrics or system metrics, and so forth. Otherwise, flow proceeds to block 360. Note that the exact order of blocks 350 and 354 may vary, depending on the embodiment. Blocks 350 and 354 may, for example, be a combined step that determines a delay level based on multiple ranges or thresholds, with the dropping of the packet being but one example of a possible action to perform when the delay is above a specific one of the levels.

Block 360 comprises processing the dequeued packet. The packet may be processed, for instance, by any suitable processing component that is associated with the queue to which the packet was assigned. The processing may involve, for instance, determining where to send the packet next, manipulating the packet, dropping the packet, adding information to the packet, or any other suitable processing steps. As a result of the processing, the packet will typically be assigned to yet another queue for further processing, thereby returning to block 320, or forwarded out of the device to a next destination in block 370.

In certain embodiments, block 360 may comprise a block 390. Block 390 comprises determining whether the packet is tagged for visibility purposes. For instance, depending on the configuration of the device, the packet may have been tagged in response to a delay-based visibility monitoring event, drop visibility event, or expiration event. If no tag exists, no additional action is implicated. On the other hand, if a tag exists, a block 395 may be performed with respect to the packet.

Block 395 comprises processing the packet with visibility logic, such as described with respect to visibility subsystem 160, based on the type of tag that is associated with the packet. The processing may lead to a variety of actions, such as generating a log or notification, reconfiguring one or more settings of the device (or another device), forwarding the packet to a downstream component such as a server or data collector to perform such functions, and so forth. In cases where the packet has been dequeued from a special visibility queue, note that block 395 and block 360 are in fact the same processing, with the packet processor of block 360 being, in essence, the special visibility subsystem.

Note that, if the packet was not dropped, block 395 may be performed concurrently or at any other time relative to the continuing processing of the packet in flow 300. In an embodiment, to avoid the packet departing the device or being subject to further manipulation before block 395 can be performed, block 395 may be performed on a copy of the packet while the original packet proceeds through flow 300 in the manner previously stated. In another embodiment, the packet may be returned to the processing of block 360 after block 395.

Flow 300 illustrates only one of many possible flows for handling a packet using queues. Other flows may include fewer, additional, or different elements, in varying arrangements. For example, in some embodiments, some or all of blocks 330, 332, 335, 350, 351, 352, 354, 390, and/or 395 may be omitted.

Note that flow 300 may be repeated by a device any number of times with respect to any number of packets. Some of these packets may be processed concurrently with each other. Different packets may be assigned to different queues, depending on the characteristics of the packets and the purposes of the queues. Moreover, a single packet may be assigned to different queues at different times, as the flow loops through blocks 320-360.

3.3. MARKER-BASED DELAY TRACKING

Figure 4:
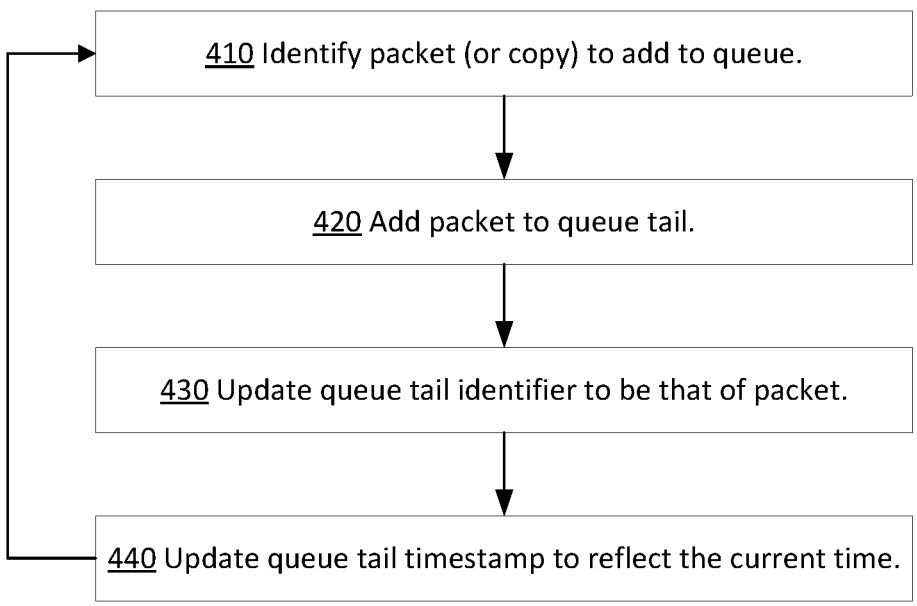
FIG. 4 illustrates an example flow for enqueuing packets with marker-based delay tracking.

FIG. 4 illustrates an example flow 400 for enqueuing packets with marker-based delay tracking, according to an embodiment. Flow 400 may be performed, for instance, by queue management logic, such as queue management logic 140, as part of block 340 in FIG. 3, or to enqueue a packet for any other process flow when marker-based delay tracking is employed. The various elements of flow 400 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 410 comprises identifying a packet, such as a packet 142, or a copy of a packet, to add to a queue, such as a queue 142, or to multiple queues (e.g. by mirroring, copying, etc.). The packet may be identified using a memory location in which the packet is stored, a sequence number, or via any other identifier.

Block 420 comprises adding the packet to the tail of the queue. Depending on the structure used to represent the queue, this may comprise steps such as adding the packet or packet identifier as a node in a linked list, manipulating an ordered array of packets or packet identifiers, or other suitable queue management techniques. While a FIFO queue is described herein, note that in other embodiments, similar techniques may be extended to other types of queues, such as push-in-first-out (PIFO).

Block 430 comprises updating a queue tail identifier to be that of the packet. This step may be optional where the identifier is readily discernable from the structure used to represent the queue.

Block 440 comprises updating queue delay tracking data, such as queue delay tracking data 220, to record an enqueue timestamp of the packet. In an embodiment, an enqueue timestamp may be recorded for each packet in the queue. In another embodiment, only certain enqueue timestamps are kept, including an enqueue timestamp for the packet within the queue that is currently at the tail of the queue, and/or for the last designated marker packet. In an embodiment, the timestamp recorded in block 440 may overwrite a timestamp stored for the tail of the queue or the last designated marker packet.

Flow 400 illustrates only one of many possible flows for enqueuing a packet. Other flows may include fewer, additional, or different elements, in varying arrangements. For example, in some embodiments, block 430 may be omitted. As another example, in an embodiment, block 440 may only be performed for certain packets or at certain times. Flow 400 may be repeated for any number of packets, and be performed concurrently for any number of queues. In yet other embodiments, no marker-based delay tracking is utilized, and blocks 430 and 440 would thus both be omitted.

Figure 5:
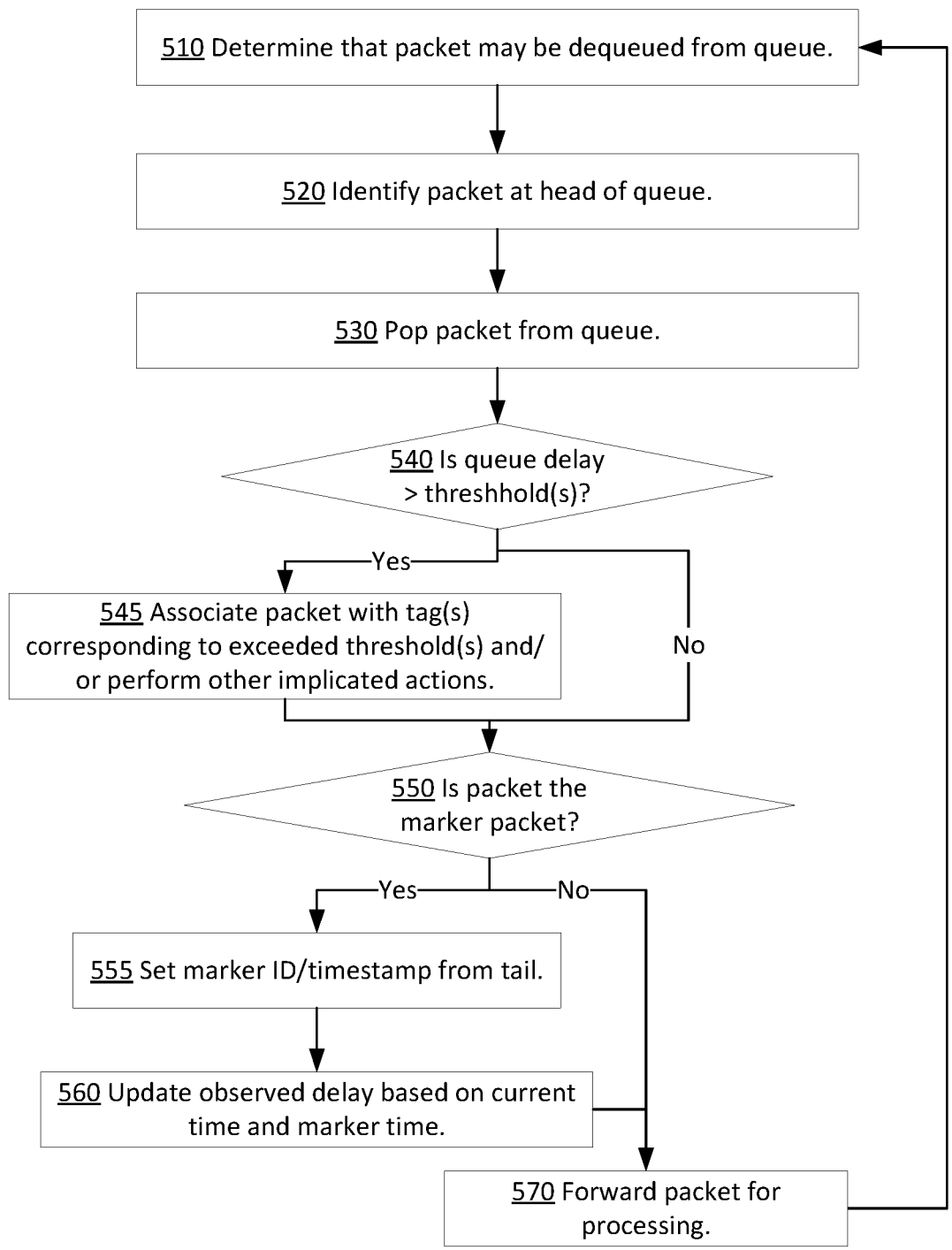
FIG. 5 illustrates an example flow for dequeuing a packet with marker-based delay tracking.

FIG. 5 illustrates an example flow 500 for dequeuing a packet with marker-based delay tracking, according to an embodiment. Flow 500 may be used, for example, to dequeue packets that were enqueued using flow 400. Flow 500 may be performed concurrently with respect to flow 400 for the same queue. That is, while one process is enqueuing packets at the tail of the queue, another process may simultaneously dequeue packets at the head of the queue. Flow 500 may be utilized in performance of block 345, or to dequeue packets in any other process flow. Flow 500 may be performed for many different queues concurrently.

The various elements of flow 500 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 510 comprises determining that a packet, such as a packet 105, may be dequeued from a queue, such as a queue 142. The determination to dequeue a packet may occur based on a variety of factors, depending on the embodiment. For example, a determination of whether a packet, or a portion of a packet, may be dequeued from a queue may be made every clock cycle. A packet may be dequeued in that clock cycle if, for example, a processing component coupled to the queue has signaled that it is ready for another packet. As yet another example, a resource manager may determine that a certain number of packets may be released from a queue at a certain time based on available processing components or other resources. Queues may be prioritized based on various factors such that some queues are authorized to release packets, or portions of packets (e.g. frames or cells) in a given clock cycle, while others are not. In some embodiments, more than one packet may be released each clock cycle, while in other embodiments, a packet may be released only every other clock cycle or at longer intervals.

The techniques described herein are not specific to any particular logic for determining when to dequeue a packet from the queue, except to the extent that use of the logic introduces queue delay at least on some occasions (e.g. on at least some occasions, more packets may be enqueued into a queue over a certain period of time than can be dequeued over that period of time).

Block 520 comprises identifying a packet at the head of the queue. Block 530 comprises popping the packet from the queue. For instance, the queue manager may issue a read request to the buffer manager for buffers associated with the packet. The exact manner in which blocks 520 and 530 are performed depends on the data structure(s) used to represent the queue. As an example, if a linked list of packets or packet identifiers is used, the node at the head of the linked list may be identified and unlinked from the rest of the list. Of course, any other suitable queue management techniques may be utilized.

Block 540 comprises determining whether the queue delay is greater than a threshold for a certain delay-based action. Block 540 may comprise, for example, calculating the queue delay based on the enqueue timestamp of a marker packet within the queue, independent of any dequeue process. Or, block 540 may comprise reading the results of such a calculation, which may have already been stored as a result of previous iterations of block 570 or on account of a background process for computing queue delay.

Depending on which delay-based actions are supported by the embodiment, and/or which delay-based actions are enabled for the queue, the queue delay may be compared to one or more different thresholds. For example, the queue delay may be compared to an expiration threshold and/or one or more different delay-based visibility threshold (e.g. for high delay, medium delay, and low delay). The thresholds themselves may be hard-coded into the queue management logic, or read from a configurable global or queue-specific profile.

If, in block 540, it is determined that the queue delay is greater than an applicable threshold, flow 500 proceeds to block 545. At block 545, for each threshold exceeded, a delay-based action associated with that threshold is performed. For example, the packet may be annotated with a tag associated with the threshold and/or other information. An expired queue tag may be used for an expiration threshold, for instance, while a delay visibility tag may be used for a delay visibility threshold. As another example, the packet may be tagged with a value indicating the queue delay or a queue delay level.

As yet another example, the status of the queue itself may be updated to indicate that the queue is in a special state corresponding to an exceeded threshold. For example, if an expiration threshold has been surpassed, the entire queue may be marked as expired. The special state of the queue may have various implications, such as accelerating the dequeuing of the queue, activating a background process that reads the packet links and frees up the associated buffers to accelerate a draining process, blocking additional enqueues to the queue, disabling traffic flow control or shaping, and so forth. In other embodiments, activation of a special queue state may instead occur at other times, such as during performance of a background threshold monitoring task. Rather than performing an actual comparison in block 540, block 540 may simply comprise looking up the state of the queue with respect to the applicable threshold.

If, in block 540, it is determined that the queue delay is not greater than any applicable threshold, flow 500 may skip block 545 and proceed to block 550. However, in some embodiments, a determination that the queue delay is not greater than a particular threshold may result in performance of certain steps in certain contexts, such as changing the status of the queue to indicate that the queue is no longer in a special state associated with the applicable threshold. In yet other embodiments, inactivation of a delay-based state instead occurs in response to other events, such as the emptying of the queue, dequeuing of a marker packet, performance of a background threshold monitoring task, and so forth.

Block 550 comprises determining whether the packet is designated as a marker packet. For example, block 550 may comprise comparing a marker identifier stored in queue delay tracking data to an identifier of the packet being dequeued. If the packet is designated as the marker packet, then flow 500 proceeds to block 555. Otherwise, flow 500 skips block 555 and proceeds to block 570. Blocks 555/560 may also be performed in parallel with block 570, in certain embodiments.

Block 555 comprises performing various steps to designate a new marker packet. These steps may include, for instance, setting a marker identifier and marker timestamp within queue delay tracking data to be the tail packet identifier and the tail enqueue timestamp, as described in other sections.

Block 560 comprises updating a stored observed queue delay time based on the current time and the marker timestamp. If the queue delay is not stored (i.e. computed every time it is needed), or if the queue delay is updated via a background process, block 560 may be optional.

Block 570 comprises forwarding the packet to a processing component associated with the queue for processing. The packet may be forwarded by sending a reference to an identifier or memory location of the packet, or by sending the packet itself, depending on the embodiment. The processing component may be any suitable processing component, as described in other sections. Flow 500 may then be repeated for other packets in the queue.

Flow 500 illustrates only one of many possible flows for dequeuing. Other flows may include fewer, additional, or different elements, in varying arrangements. For example, in some embodiments, blocks 540-545 may be performed before block 530, after blocks 550-555, and/or at different times or different thresholds. Similarly, blocks 550-555 may be performed any time after block 510, including after block 560. Many other variations are likewise possible. In yet other embodiments, no marker-based delay tracking is utilized, and blocks 540-560 would thus be omitted.

3.4. Drop Visibility and Queue Forensics

Figure 6:
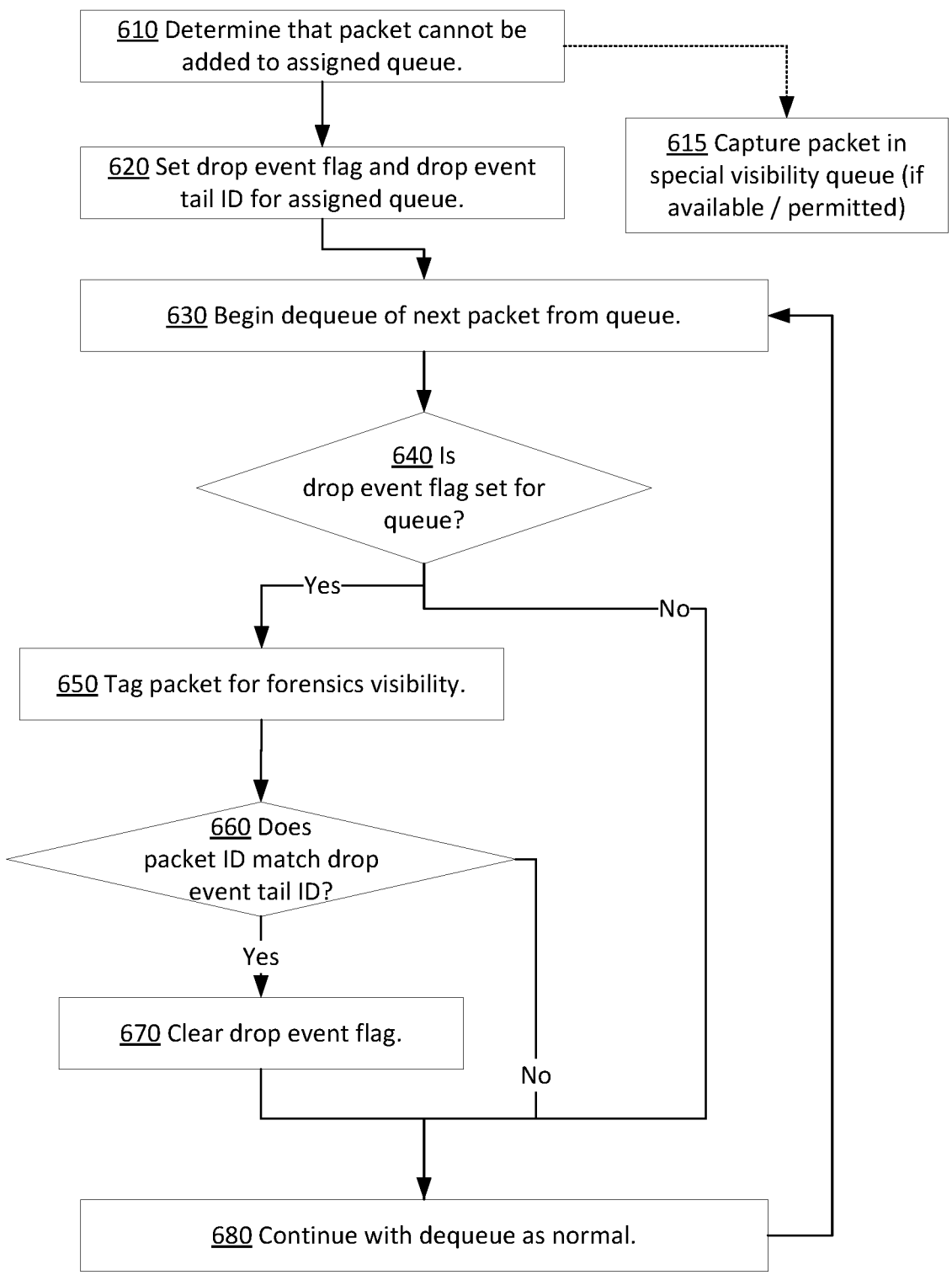
FIG. 6 illustrates an example flow for providing visibility into drops occurring prior to enqueuing packets into their assigned queues.

FIG. 6 illustrates an example flow 600 for providing visibility into drops occurring prior to enqueuing packets into their assigned queues, according to an embodiment. In some embodiments, flow 600 may be performed in conjunction with flows 300, 400, and 500, while other embodiments may involve performing only some of or even just one of flows 300, 400, 500, or 600.

The various elements of flow 600 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 610 comprises determining that a packet cannot be added to a queue to which it has been assigned. For example, if flow 600 is being used in conjunction with flow 300, block 610 may correspond to a negative determination in block 330. As explained in other sections, a device may determine that a packet cannot be added to the queue to which the packet has been assigned for any of a variety of reasons.

From block 610, two different actions may be triggered. First, in block 615, the packet may be captured via a special visibility queue, if available and permitted, as described in other sections. In an embodiment, the packet may also be provided a special drop visibility tag.

Concurrently, flow 600 may proceed to block 620. Block 620 comprises recording information describing a drop event with respect to the queue. For example, a drop counter associated with the queue may be updated. Additionally, or instead, a drop event flag may be set, or a drop visibility monitoring status may be activated for the queue. A packet identifier for the tail packet within the queue may, in some embodiments, also be recorded within a data structure intended to store a drop event tail identifier.

Block 630 comprises beginning dequeuing of a next packet from the queue. The dequeuing may involve a variety of steps, such as determining that is time to dequeue another packet from the queue, identifying the head packet, unlinking the head packet from the queue, and so forth. For example, in an embodiment, a process comprising some or all of the steps described with respect to flow 500 is performed.

Block 640 comprises, as part of the dequeuing process, determining whether queue forensics are active for the queue, using a flag or status indicator set in block 620. If queue forensics monitoring is inactive, then flow proceeds to block 680, in which the dequeue process continues as normal, by forwarding the packet to an associated processing component. Otherwise, flow proceeds to block 650.

Block 650 comprises tagging the packet with a special tag for forensics visibility. This tag may also be referred to as a forensics visibility tag. The tag, when detected by a processing component, may cause the processing component to duplicate at least a portion of the packet and send the duplicated packet or portion thereof to a visibility subsystem, as described in other sections. The packet may furthermore be annotated with a variety of other information related to the queue and/or the drop event, such as a drop event identifier, queue identifier, queue delay, and so forth.

Block 660 comprises determining whether the packet identifier of the packet being dequeued matches the drop event tail identifier. If not, flow proceeds to block 680. Otherwise, flow proceeds to block 670.

Block 670 comprises deactivating queue forensics monitoring by, for instance, unsetting a drop event flag for the queue or changing the status of the queue.

Flow 600 may loop from block 680 back to block 630 for any number of packets in the queue. Note that additional downstream actions may be performed with respect to any packets tagged via flow 600, as described in other sections.

Flow 600 illustrates only one of many possible flows for drop visibility monitoring and queue forensics. Other flows may include fewer, additional, or different elements, in varying arrangements. For example, in some embodiments, tagging may occur prior to the tag being dequeued. That is, all packets in the queue may automatically be tagged in response to block 610 rather than at dequeue time, thus avoiding the need for most of flow 600. Or, instead of a separate drop event flag or status indicator, the mere existence of a valid packet identifier stored in the drop event tail identifier field of the queue may indicate that queue forensics monitoring is active. Block 670 may thus instead constitute removing the packet identifier from the field. In yet other embodiments, flow 600 is not utilized within the network device.

3.5. Sampling

Figure 16:
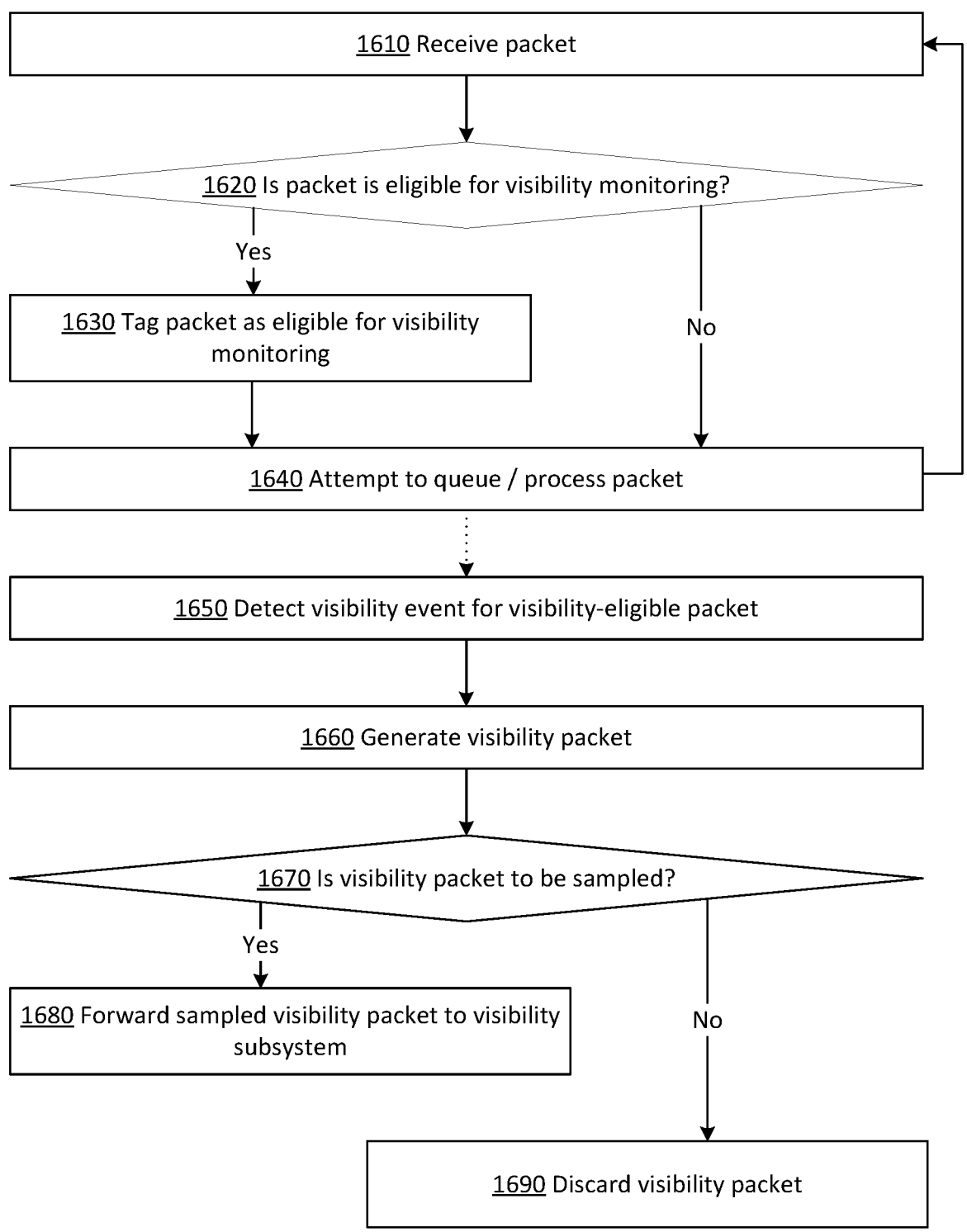
FIG. 16 illustrates an example flow for sampling packets.

FIG. 16 illustrates an example flow 1600 for sampling packets, according to an embodiment. In some embodiments, flow 1600 may be performed within any network device, including without limitation those devices described herein. Flow 1600 may further be utilized in conjunction with some or all of the other flows described herein. For instance, flow 1600 may be used to sample packets that are tagged or linked to a visibility queue in some or all of: blocks 335 or 354 of FIG. 3, blocks 615 or 650 of FIG. 6, block 1260 of FIG. 12, or block 1370 of FIG. 13. Flow 1600 may further be utilized to sample packets in a variety of other contexts.

Block 1610 comprises receiving a packet. For instance, the packet may be received at pre-event sampler 920 in a traffic manager and/or coupled to a queue manager. Block 1620 comprises determining whether the packet is eligible for visibility monitoring. If so, then in block 1630, the packet is tagged as eligible for pre-event monitoring (e.g. by inserting a tag in a packet header, inserting associated metadata, etc.) and considered to have been "sampled" for visibility-eligibility. If not, block 1630 is skipped.

Block 1640 comprises attempting to queue and process the packet. For instance, block 1640 may comprise assigning the packet to one or more queues. Block 1640 may further comprise waiting for the packet to pass through the assigned queue(s) before processing the packet with one or more packet processors. Note that some packets may not be queued and/or processed, on account of being dropped before entering a queue and/or while in the queue, as described elsewhere herein.

Blocks 1610-1640 may be repeated any number of times for any number of packets, potentially concurrently, thereby queueing and processing any number of packets using any number of queues and/or packet processors, including both packets that are eligible for visibility monitoring as well as packets that are ineligible for visibility monitoring.

Block 1650 comprises detecting a visibility event associated with a packet that has been marked as eligible for visibility monitoring. There may be many types of visibility events, depending on an embodiment. Generally, a visibility event is an exceptional event that occurs in the course of block 1640, indicating an error, unexpected, or undesirable system state. Examples of visibility events include without limitation dropping a packet and detecting delay or congestion while a packet is being processed. Other examples of visibility events are described elsewhere herein.

Block 1660 comprises generating a visibility packet based on the visibility event. Generating the visibility packet may comprise tagging the existing packet, duplicating the existing packet and tagging the duplicate, or generating a new packet describing the visibility event, as described elsewhere herein.

Block 1670 comprises determining whether to sample the visibility packet. Block 1670 may comprise processing the visibility packet with one or more samplers, such as a single post-event sampler, or chain of samplers, each configured to implement a different type of sampling logic. Examples of sampling logic may include, without limitation, probability-based sampling, rate-aware sampling, contextual sampling, flow-based sampling, class-based sampling, priority-based sampling, or sampling based on other packet attributes, as described elsewhere herein.

If the visibility packet is to be sampled, then in block 1680, the visibility packet is forwarded to a visibility subsystem for storage and/or further processing. Otherwise, the visibility packet is discarded in block 1690. For instance, block 1680 may comprise sending the visibility packet to the visibility subsystem directly, adding the visibility packet to a visibility queue coupled to the visibility subsystem, sending the visibility packet back to a traffic manager configured to add the packets that are tagged with visibility tags to a visibility queue, and/or other steps as described elsewhere herein.

Flow 1600 illustrates only one of many possible flows for sampling packets. Other flows may include fewer, additional, or different elements, in varying arrangements. For example, in some embodiments, blocks 1620 and 1630 are optional. As another example, block 1670 may be optional.

4.0. Implementation Examples

4.1. Example Delay Tracking Use Case

Figure 7:
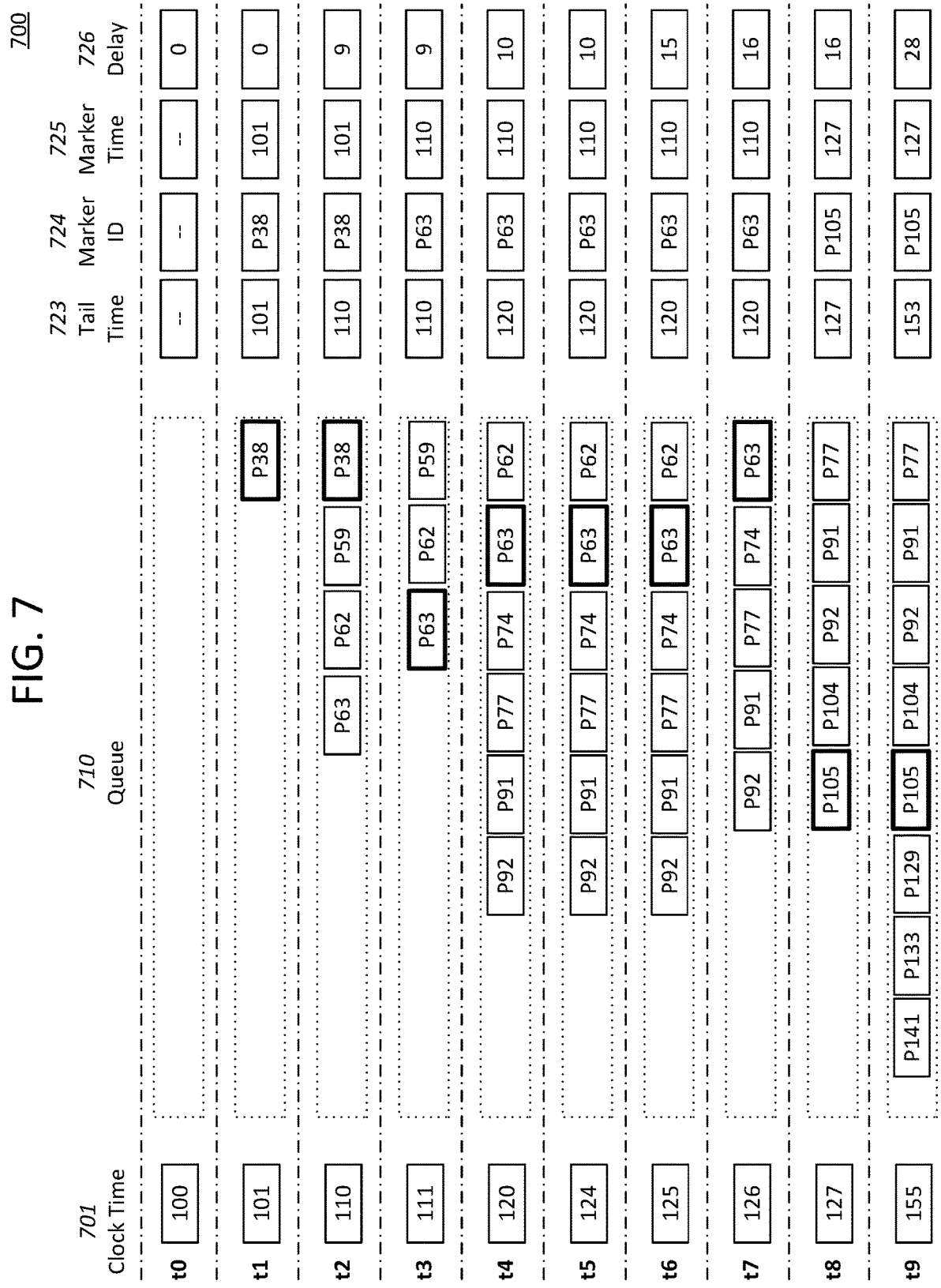
FIG. 7 illustrates example queue data for an example queue changing over time in response to example events.

FIG. 7 illustrates example queue data 700 for an example queue 710 changing over time in response to example events, according to an embodiment. The examples are given by way of illustrating techniques utilized in some of the many embodiments described herein. However, it will be apparent that the illustrated queue data 700 is merely one example of how queue data may be structured, and the example changes to the queue data 700 illustrate but one example technique for managing a queue. The actual structure of the queue data and the specific techniques utilized to manage that queue data will vary from embodiment to embodiment.

Queue data 700 comprises queue arrangement data describing the sequence of packets that form queue 710, a tail packet enqueue timestamp 723, a marker packet identifier 724, a marker packet enqueue timestamp 725, and a queue delay 726. Queue data 700 is illustrated at ten different instances in time, labeled t0 through t9, with each instance corresponding to a progressively increasing associated clock time 701.

At t0, there are no packets in queue 710. There is therefore no tail packet enqueue timestamp 723, marker packet identifier 724, or marker packet enqueue timestamp 725. The queue delay 726 is set to a nominal value of 0.

At t1, a single packet P38 is enqueued. During the enqueue of P38, the tail time 723 is set to 101, which is the current clock time 701. Since the marker packet identifier 724 was empty, the marker packet identifier 724 is set to the identifier of the enqueued packet P38, and the marker time 725 is set to that of the tail time 723. The marker packet at a given instance of time is hereafter denoted in FIG. 7 using a bold border.

By t2, three more packets have been enqueued, including, most recently, a packet P63, which has been enqueued in the current clock cycle. During the enqueue of packet P63, the tail time 723 is set to 110, which is the current clock time 701. On account of a background process configured to update the queue delay 726 every five clock cycles, queue delay 726 is updated to 9, which is the difference between the clock time 701 and the marker time 725.

At t3, packet P38 is dequeued. Since marker identifier 724 indicates that packet P38 is the marker packet, the packet at the tail of queue 710, packet P63, is designated as the new marker packet, and the marker identifier 724 is updated to reflect the packet identifier of the tail packet. The tail time 723 is copied to the marker time 725. Although the difference between the clock time 701 and the new marker time 725 is now 1, queue delay 726 is updated to 9 in response to the dequeuing of packet P38, since the queue delay of the most recently departed packet P38 is now larger than the difference between the clock time 701 and the marker time 725.

By t4, a packet P59 has been dequeued. Four more packets have been enqueued, including, most recently, a packet P92, which has been enqueued in the current clock cycle. During the enqueue of packet P92, the tail time 723 is set to 120, which is the current clock time 701. On account of a background process configured to update the queue delay 726 every five clock cycles, queue delay 726 is updated to 10, which is the difference between the clock time 701 and the marker time 725, and is now greater than the queue delay of the most recently departed packet P38.

By t5, four more clock cycles have elapsed without an enqueue or dequeue. Therefore, none of tail packet enqueue timestamp 723, marker packet identifier 724, or marker packet enqueue timestamp 725 are changed. Moreover, since no dequeue has occurred, and since the background process is configured to update the queue delay 726 only every five clock cycles, queue delay 726 remains set to 10.

At t6, another clock cycle has elapsed without an enqueue or dequeue. Since the current clock cycle is a fifth clock cycle, the background process updates queue delay 726 to 15, which is the difference between the clock time 701 and the marker time 725.

At t7, a packet P62 is dequeued. During the dequeue, queue delay 726 is updated to 16, which is the difference between the clock time 701 and the marker time 725.

At t8, packet P63 is dequeued and a packet P105 is enqueued. During the enqueue of packet P105, the tail time 723 is set to 127, which is the current clock time 701. Since marker identifier 724 indicates that packet P63 is the marker packet, the packet at the tail of queue 710, packet P105, is designated as the new marker packet, and the marker identifier 724 is updated to reflect the packet identifier of the tail packet. The tail time 723 is copied to the marker time 725. In response to dequeuing of packet P63, queue delay 726 remains at the queue delay of the most recently dequeue marker packet P63, in spite of the fact that the difference between the clock time 701 and the new marker time 725 is now 0. The queue delay can fall no lower than this value unless the next marker packet P105 is dequeued before 16 clock cycles elapse, since the queue delay is always the greater of the delay of the most recently dequeued marker packet and the difference between the clock time 701 and the new marker time 725.

By t9, three more packets have been enqueued, including, most recently, a packet P141, which was enqueued in a previous clock cycle having a clock time of 153. During the enqueue of packet P141, the tail time 723 was set to 153, being the clock time at the time of enqueue. Since the current clock cycle is a fifth clock cycle, the background process updates queue delay 726 to 28, which is the difference between the clock time 701 and the marker time 725.

To simplify explanation of the described techniques, FIG. 7 assumes that each packet arrive and are transmitted in a single clock cycle. However, in other embodiments, some or all of the packets may arrive and/or be transmitted over more than one clock cycle. For instance, a 64 Byte packet may arrive on a 100G port at $((64+20)*8)/100*1e9)=6.72$ ns whereas a 128 Byte packet will take twice as long. Application of the techniques described herein are readily extended to such embodiments. For example, the times recorded by the queue may be times when the packets begin to arrive or depart, or times when the packets have fully arrived or departed. Or, the packets may be broken into portions of packets, and processed individually.

4.2. Alternative Delay Tracking Techniques

According to an embodiment, a variety of alternative queue delay tracking techniques, other than that depicted in FIG. 7, may also or instead be utilized. As one potentially very costly alternative, a device may track the packet delay of each packet in the queue.

As another alternative, the timestamp of the tail packet need not be constantly tracked. Various mechanisms may then be utilized to designate a new marker packet once the marker packet is dequeued. For example, the tail packet may become the marker packet as previously described, but a current system time may be utilized as the marker timestamp rather than the actual enqueue time of the tail packet (since it was not recorded). This approach may provide an acceptable approximation of queue delay in many cases. As another example, the marker packet identifier may be set to some value to indicate that there is no current marker packet. When no marker packet exists, various assumptions regarding the queue delay may be made, depending on the embodiment. For example, the last known queue delay may be utilized, or the queue delay may be assumed to be some function of the last known queue delay, a default value, or even zero. When a new packet is enqueued while no marker packet exists, the new packet becomes the marker packet, its enqueue timestamp is recorded as the marker timestamp, and queue delay may once again be calculated based on the marker timestamp (and/or comparing the queue delay of the most recently dequeued marker packet with that calculated from the new marker timestamp).

As yet another alternative, a device may track packet delays for multiple marker packets in the queue. New marker packets may be selected at specific time intervals, specific packet intervals, in response to previous marker packets leaving the queue, and/or any combination thereof. To reduce resource utilization, the number of market packets that may be selected may be limited to a fixed amount.

For example, in some embodiments, a sequence of marker packets may be maintained. The sequence may comprise any number of marker packets, depending on the embodiment. An increase in the number of packets used will generally increase the accuracy of the measure of delay at any given time. Whenever the first (oldest) marker packet in the sequence departs the queue, it is removed from the sequence, and each remaining marker packet is shifted up a position within the sequence. A new marker packet (e.g. the tail packet, or the next packet to be enqueued) may then be added to the sequence. In embodiments with flexible numbers of marker packets, new marker packets may also or instead be added in response to other events, such as the lapsing of certain amounts of time, or upon n enqueues. In an embodiment, the last (newest) designated marker packet in the sequence may periodically be updated to be a different packet in the queue. For instance, the last marker packet may constantly be updated such that the tail packet in the queue is always the last designated marker packet. (In this aspect, the example of FIG. 7 may be considered a special case of this embodiment, utilizing a sequence of only two marker packets, with the tail packet being the second marker packet). On the other hand, rather than always reflecting the tail of the queue, the last designated marker packet in the sequence of marker packets may only be updated upon the next enqueue following the lapsing of a certain time interval, upon every n enqueues, or in response to other events.

In any case, depending on the embodiment, the device may compute the queue delay using the packet delay of the oldest packet for which packet delay is known, the packet delay of the newest packet for which packet delay is known, the packet delay of the most recently dequeued marker packet, and/or functions of the packet delays some or all of the packets in the queue.

4.3. Healing Engine

Certain error types may be correctable by taking action if certain criteria are satisfied. Hence, a healing engine within or outside of a node may be configured to access the visibility packets in the visibility queue. For instance, the healing engine may periodically read the visibility queue directly. Or, as another example, a node's forwarding logic may be configured to send the visibility packets (or at least those with certain types of visibility tags) to an external node configured to operate as a healing engine.

A healing engine may inspect the visibility tags and/or the contents of those visibility packets it accesses. The healing engine may further optionally inspect associated data and input from the other parts of the node which tagged the packet (e.g. port up-down status). Based on rules applied to the visibility packet, or to a group of packets received over time, the healing engine is configured to perform a healing action.

For example, a queue expiration or delay for a packet may have triggered a corresponding visibility tag to be set for the packet, indicating that the queue expiration or delay occurred. The healing engine observes the visibility tag, either in the visibility queue or upon receipt from packet processing logic. The healing engine inspects the packet and determines that the queue expiration or delay may be fixed using a prescribed corrective action, such as adding an entry to the forwarding table or implementing a traffic shaping policy. The healing engine then automatically performs this action, or instructs the node to perform this action.

The corrective set of actions for a tag are based on rules designated as being associated with the tag by either a user or the device itself. In at least one embodiment, the rules may be specified using instructions to a programmable visibility engine. However, other suitable mechanisms for specifying such rules may instead be used.

4.4. Annotations

According to an embodiment, when tagging a packet, a device may further annotate the packet with state information for a queue and/or device. State information may take a variety of forms and be generated in a variety of manners depending on the embodiment. For example, network metrics generated by any of a variety of frameworks at the node may be used as state information. An example of such a framework is the In-band Network Telemetry ("INT") framework described in C. Kim, P. Bhide, E. Doe, H. Holbrook, A. Ghanwani, D. Daly, M. Hira, and B. Davie, "Inband Network Telemetry (INT)," pp. 1-28, September 2015, the entire contents of which are incorporated by reference as if set forth in their entirety herein.

The annotated state information may be placed within one or more annotation fields within the header or the payload. When the annotated packet is a regular packet, it may be preferable to annotate the header, so as not to pollute the payload. If annotated state information is already found within the packet, the state information from the currently annotating node may be concatenated to or summed with the existing state information, depending on the embodiment. In the former case, for instance, each annotating node may provide one or more current metrics, such as a congestion metric. In the latter case, for instance, each node may add the value of its congestion metric to that already in the packet, thus producing a total congestion metric for the path.

The path that the packet is traversing itself may be identified within the packet. In an embodiment, the packet includes a path ID assigned by the source node, which may be any unique value that the source node maps to the path. In an embodiment, the path may be specified using a load balancing key, which is a value that is used by load balancing functions at each hop in the network. In an embodiment, the estimated queue delay or port delay may be used to perform the load balancing decisions. For example, the next hop/destination for a packet may be selected based on, among other factors, which queue (and consequently next hop/destination) has the lowest queue delay or port delay.

In an embodiment, a device may create special annotated packets where the packet is constructed for the purpose of providing information, or debugging or benchmarking performance. Such special annotated packets pass through the devices buffers and queues as would any other packet received by the device, and be consumed by an internal or external component configured to utilize the information carried by the annotated packet.

4.5. Example Sampling Flows

Figure 17:
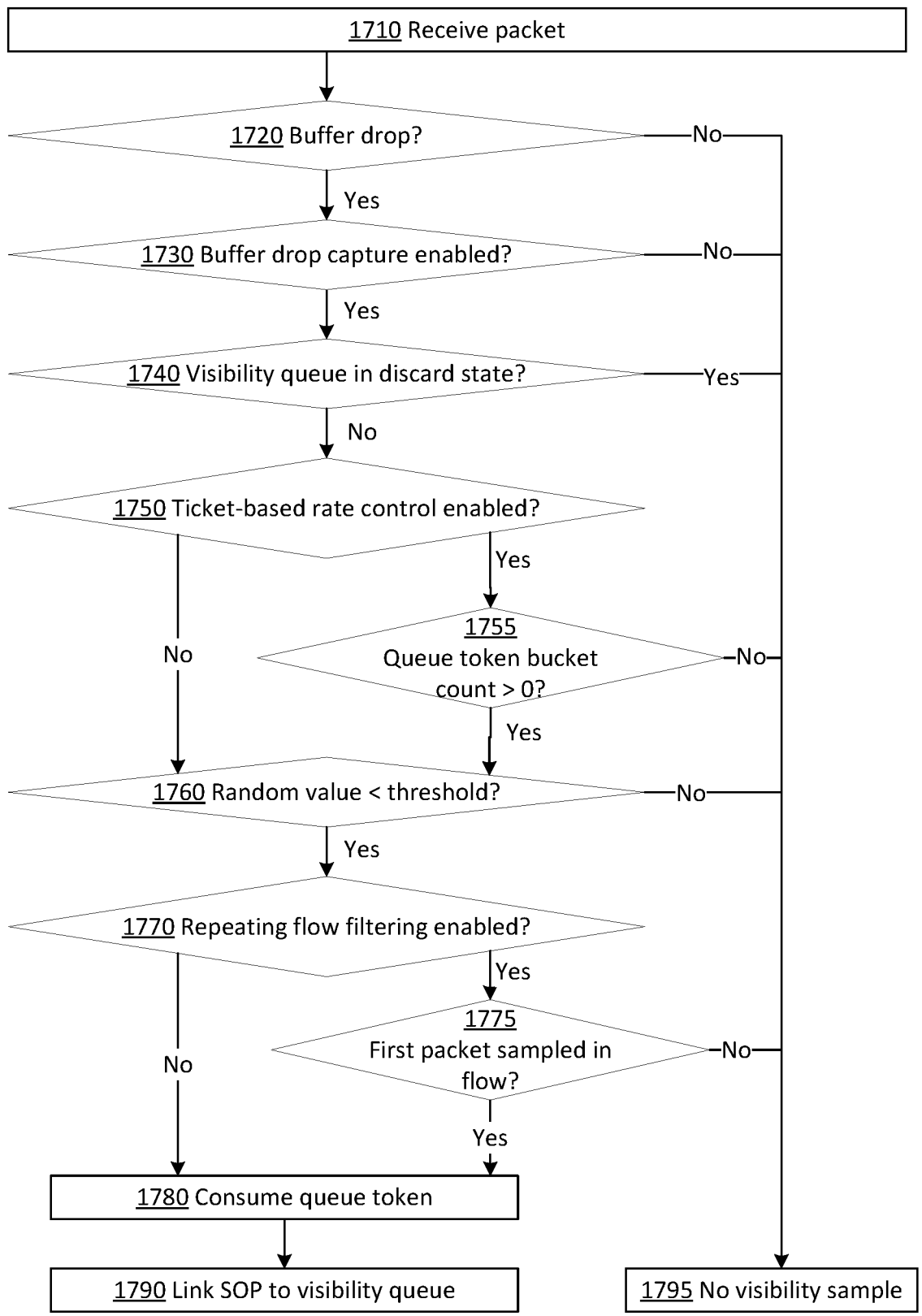
FIG. 17 illustrates an example flow for sampling buffer drop events using probabilistic sampling in a device that supports ticket-based rate aware sampling and repeating flow filtering.

FIG. 17 illustrates an example flow 1700 for sampling buffer drop events using probabilistic sampling in a device that supports ticket-based rate aware sampling and repeating flow filtering, according to an embodiment. Flow 1700 may be performed within any network device, including without limitation those devices described herein. Flow 1700 may further be utilized in conjunction with some or all of the other flows described herein. For instance, flow 1700 may be utilized to determine whether to sample packets as they are dequeued from an egress queue or other queue. Flow 1700 may further be utilized to determine whether to sample packets in a variety of other contexts.

Block 1710 comprises receiving a packet. For instance, block 1710 may comprise dequeuing a packet, receiving the packet at a sampler, and/or other steps, as described in other sections.

Block 1720 comprises determining whether the packet has been or will be dropped. For instance, the device component responsible for implementing flow 1700 may itself decide whether to drop the packet, using any suitable technique. Or, the device component may inspect the packet for a tag indicating whether the packet has been dropped. In yet another embodiment, all packets received by the device component may already be dropped, and hence block 1720 is unnecessary.

The dropping of the packet is considered to be a visibility event (a buffer drop capture event) and the packet is thus eligible for reporting to a visibility component as a visibility packet. Hence, if there is a buffer drop capture event, flow 1700 proceeds to block 1730 for a sequence of decision steps 1730-1780, by which it is determined whether or not the visibility event is to be sampled, and the packet thus forwarded to the visibility component. Otherwise, flow 1700 proceeds to terminal block 1795, which corresponds to the conclusion that the packet is not selected for visibility reporting, at least with respect to a buffer drop event.

Block 1730 comprises determining whether buffer drop capture is enabled. For instance, there may a device configuration setting that indicates whether buffer drop capture is enabled globally and/or a queue configuration setting that indicates whether buffer drop capture is enabled for the specific queue from which the packet was dropped. Such settings may be dynamically configurable, such that the buffer drop capture events may sometimes be reported for visibility purposes and other times altogether ignored, depending on the current value of the settings. Of course, in some devices, block 1730 may be unnecessary, as buffer drop capture may always be enabled. In any event, if buffer drop capture is enabled, flow 1700 proceeds to block 1740. Otherwise, flow 1700 again proceeds to terminal block 1795.

Block 1740 comprises determining whether an associated visibility queue is currently in a discard state. There may be one or more visibility queues in a device, in which visibility packets are placed while awaiting processing by or forwarding to a visibility component. A visibility queue may be associated with more than one egress queue and/or ingress queue, depending on the embodiment. Should a visibility queue itself become congested (e.g. larger in size than a certain number, occupying more than a threshold amount of buffer space, etc.), the visibility queue temporarily enters a discard state until it is no longer congested. While in the discard state, additional visibility packets may not be added to the visibility queue. Hence, if the visibility queue is in a discard state, flow 1700 will again proceed to terminal block 1795. Otherwise, flow 1700 proceeds to block 1750.

Block 1750 comprises determining whether ticket-based rate aware sampling is enabled. Similar to buffer drop capture, ticket-based rate aware sampling may be a global and/or queue-specific operating mode that may be enabled or disabled dynamically through global and/or queue-specific settings. If ticket-based rate aware sampling is enabled, then flow 1700 proceeds to block 1755, which involves determining whether a ticket box or token bucket for the queue contains a token. If so, or if ticket-based rate aware sampling was found not to be enabled in block 1750, flow 1700 proceeds to block 1760. If, however, no tokens are found in the bucket in block 1755, flow 1700 again proceeds to block 1795.

Block 1760 comprises performing probabilistic sampling on the visibility event by determining a random value (e.g. using a linear-feedback shift register or other suitable randomization mechanism) and comparing that value to a sampling threshold. The threshold represents the sampling rate. For instance, to implement a sampling rate of 55%, a random value between 0 and 1 may be selected, and then compared to a threshold of 0.55. If the random value is below (or above, depending on the embodiment) the threshold, flow 1700 proceeds to block 1770. Otherwise, flow 1700 again proceeds to block 1795.

Block 1770 comprises determining whether repeating flow filtering is enabled. Similar to ticket-based rate aware sampling, repeating flow filtering may be a global and/or queue-specific operating mode that may be enabled or disabled dynamically through global and/or queue-specific settings. If repeating flow filtering is enabled, then flow 1700 proceeds to block 1775, which involves determining whether the current packet belongs to a flow for which a visibility event has already been seen in a certain period time, using techniques such as described elsewhere herein. If not, or if repeating flow filtering was found not to be enabled in block 1770, flow 1700 proceeds to block 1780. If, however, the current packet belongs to a flow for which a visibility event has already been seen in the certain period time, flow 1700 again proceeds to block 1795.

Block 1780 comprises consuming a rate aware token from the bucket associated with the queue. That is, the number of tokens in the bucket is reduced by one (or some other corresponding amount in embodiments where packets may cost numbers of tokens other than one). This token bucket may be replenished periodically or at other intervals by another process operating asynchronously to flow 1700.

Depending on how the randomization of block 1760 is implemented, flow 1700 may further involve an undepicted step to ensure that a new random value will be obtained when flow 1700 is next performed, such as by obtaining a new linear-feedback shift register value.

Block 1790 then comprises adding the packet to the visibility queue. This may involve various steps, depending on the embodiment, such as linking a start-of-packet cell of the packet to the tail of the visibility queue.

Flow 1700 illustrates but one example flow for sampling buffer drop events. Other flows may involve additional and/or fewer steps, in varying arrangements. For instance, the sequence of blocks 1720-1770 may vary depending on the embodiment. Moreover, not all devices may support all of the operating modes implemented in flow 1700. For instance, a device may not support ticket-based rate aware sampling, and thus omit blocks 1750 and 1755.

Figure 18:
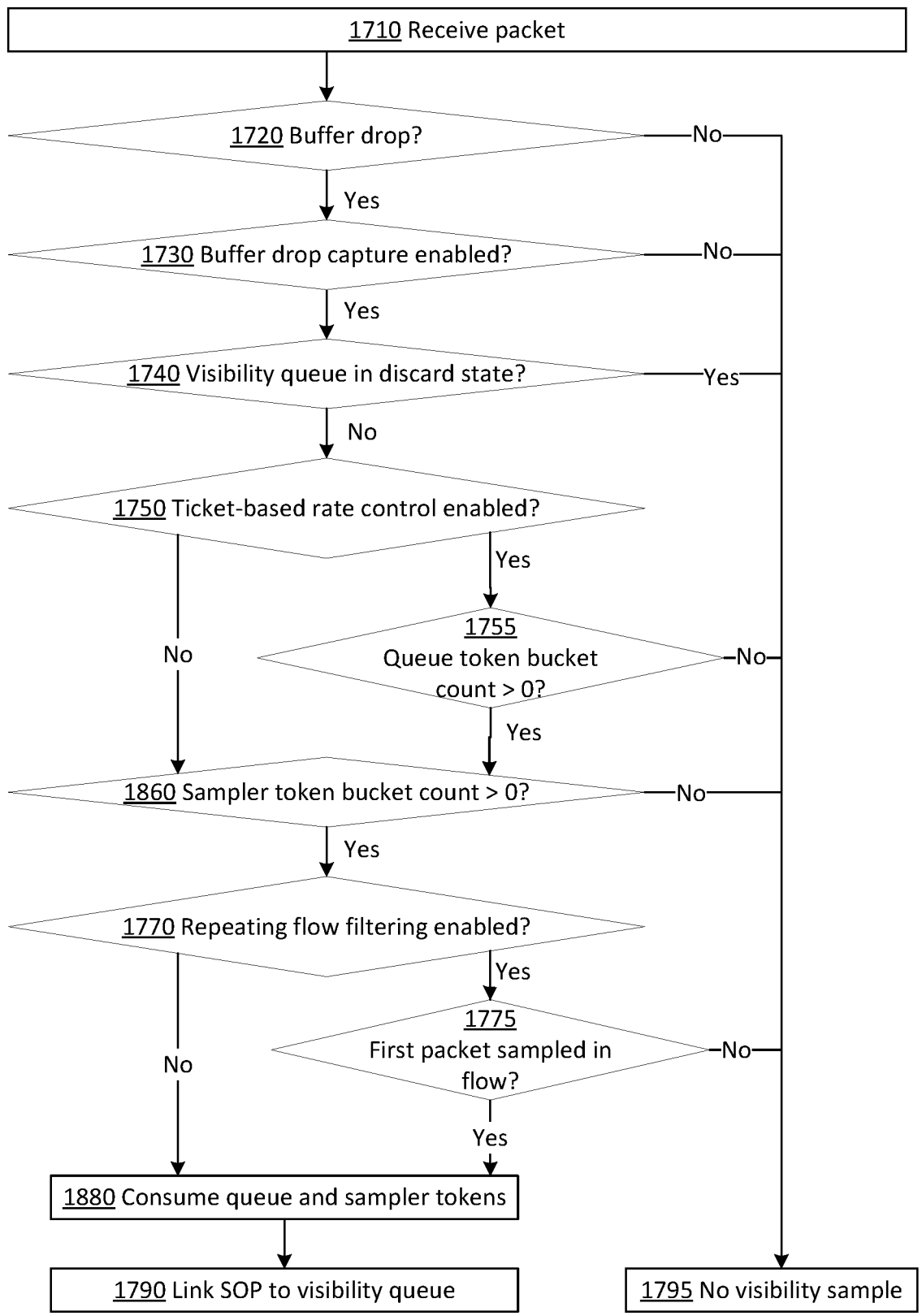
FIG. 18 illustrates an example flow for sampling buffer drop events using burst sampling in a device that supports ticket-based rate aware sampling and repeating flow filtering.

In an embodiment, a sampling mode other than probabilistic sampling may be implemented. FIG. 18, for example, illustrates an example flow 1800 for sampling buffer drop events using burst sampling in a device that supports ticket-based rate aware sampling and repeating flow filtering, according to an embodiment. Depending on the embodiment, a device may implement only one of flows 1700 or 1800, or the device may be dynamically configurable to perform either flow 1700 or flow 1800 based on a suitable configuration setting.

Flow 1800 is similar to block 1700 in many ways, and in fact begins with the same sequence of blocks 1710-1755. However, block 1760 of flow 1700 has been replaced with block 1860 in flow 1800. Block 1860 comprises determining whether a token bucket associated with the sampler in which flow 1800 is being implemented currently has a token. If not, flow 1800 proceeds to terminal block 1795. Otherwise, flow 1800 proceeds to block 1770 for repeating flow filtering.

Further, block 1780 of flow 1700 has been expanded into a block 1880, which comprises consuming both a rate aware token from the bucket associated with the queue and a token from the token bucket associated with the sampler. Both of these token buckets may be replenished periodically or at other intervals by another process operating asynchronously to flow 1800. Finally, from block 1880, flow proceeds to terminal block 1790.

Other types of visibility events may also be reported and thus involve performing flows similar to flow 1700 or flow 1800 with respect to the same packet, in parallel or in series. For instance, the subsequently described flows 1900 or 2000 may be performed in parallel with flow 1700.

Figure 19:
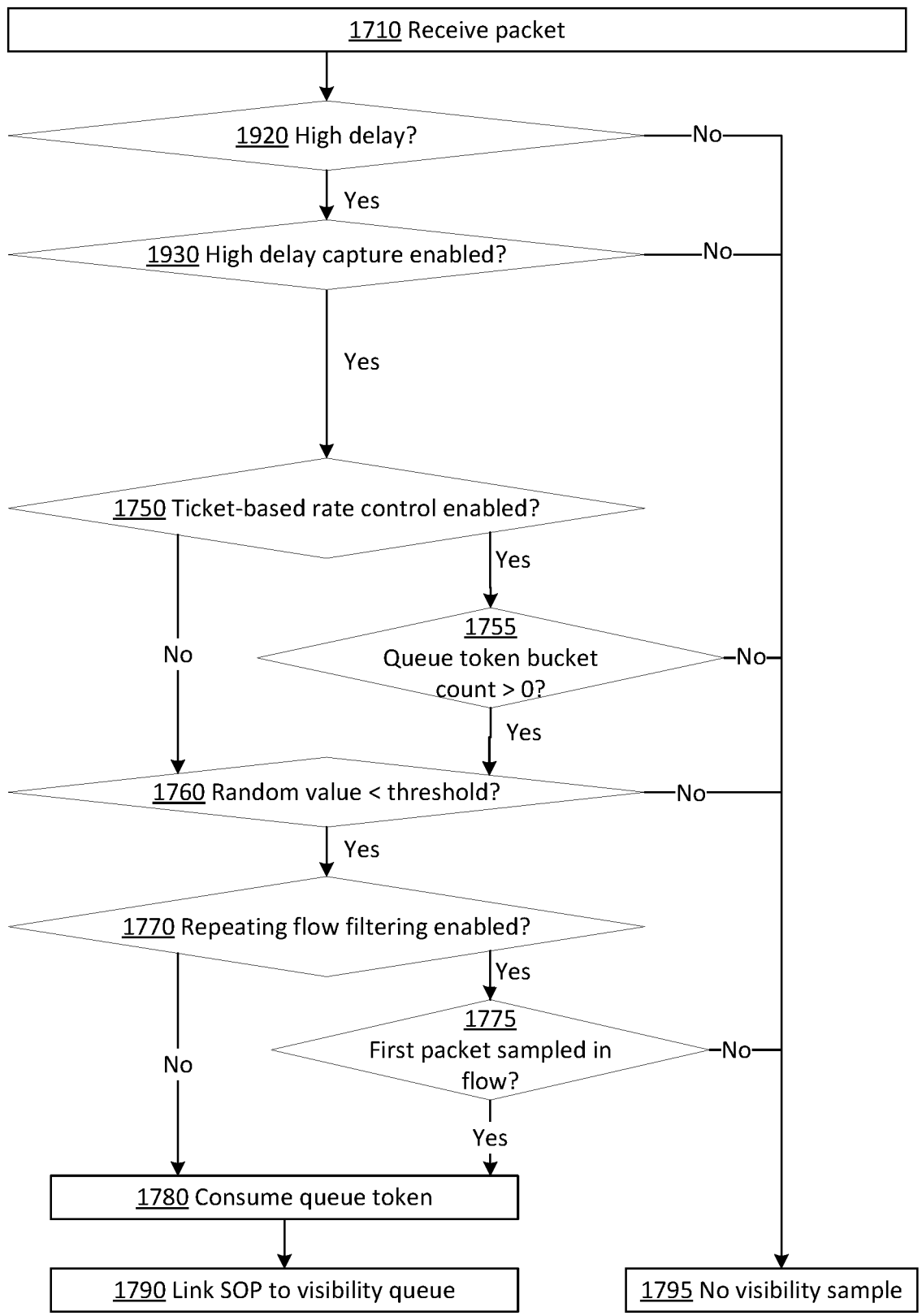
FIG. 19 illustrates an example flow for sampling high delay events using probabilistic sampling in a device that supports ticket-based rate aware sampling and repeating flow filtering.

FIG. 19 illustrates the example flow 1900 for sampling high delay capture events using probabilistic sampling in a device that supports ticket-based rate aware sampling and repeating flow filtering, according to an embodiment. Flow 1900 begins as flow 1700, with block 1710. However, instead of checking for a buffer drop event, flow 1900 then proceeds to check for a high delay capture event in block 1920.

For instance, block 1920 may comprise determining based on timestamps whether the packet itself has experienced high delay within the queue, or within the device as a whole. Block 1920 may instead comprise determining whether the queue is currently in a high delay state, as indicated by delay measures associated with marker packets or by other mechanisms described herein. Depending on the embodiment, the high delay may be associated with the packet itself, or the packet may be part of a snapshot of packets that were in the queue at the time the high delay was detected. In an embodiment, such a determination may already have been made in advance, and the packet may be marked with a tag that indicates a high-delay event. In any event, if a high delay capture event is detected, then flow 1900 proceeds to block 1930. Otherwise, flow 1900 proceeds to terminal block 1795, which corresponds to the conclusion that the packet is not selected for visibility reporting, at least with respect to a high delay capture event.

Block 1930 comprises determining whether high delay capture is enabled. Similar to buffer drop capture, high delay capture may be a global and/or queue-specific operating mode that may be enabled or disabled dynamically through global and/or queue-specific settings. If high delay capture is enabled, then flow 1900 proceeds to block 1750, and flow 1900 proceeds from there as in flow 1700. Otherwise, flow 1900 proceeds to the terminal block 1795.

Note that, in some embodiments, the order of blocks 1920 and 1930 may be reversed. Moreover, block 1740 is omitted from flow 1900, as no visibility queue admission check may be needed for high delay capture events.

Figure 20:
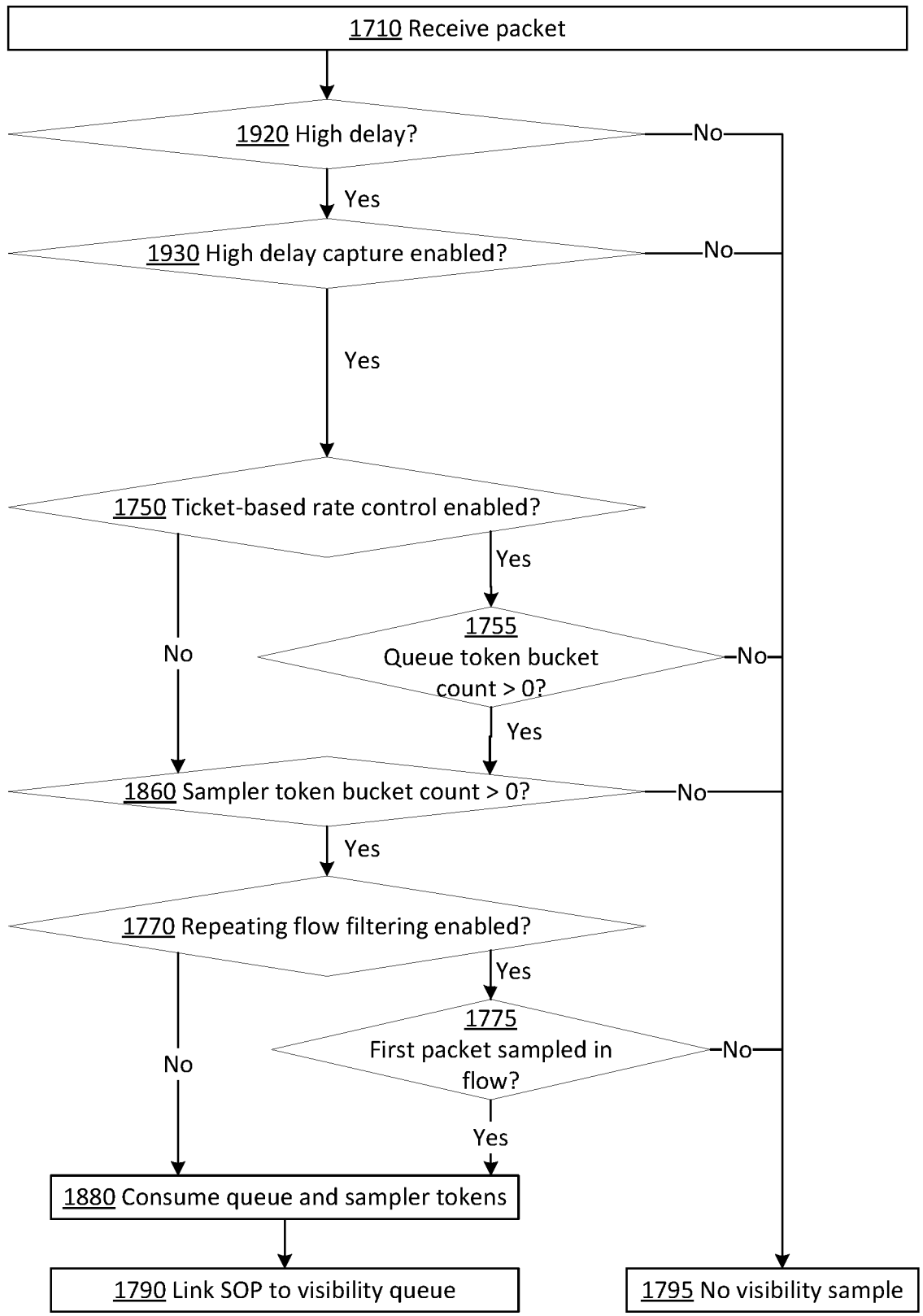
FIG. 20 illustrates an example flow for sampling high delay events using burst sampling in a device that supports ticket-based rate aware sampling and repeating flow filtering.

FIG. 20 illustrates the example flow 2000 for sampling high delay capture events using burst sampling in a device that supports ticket-based rate aware sampling and repeating flow filtering, according to an embodiment. Flow 2000 begins as with flow 1900. However, as in flow 1800, block 1760 is replaced with block 1860, and block 1780 is expanded into block 1880.

Note that flows 1900 and 2000 may also be performed in devices without buffer drop capture. In yet other embodiments, other events, such as queue drop forensic events, may be sampled using similar techniques.

5.0. Example Embodiments

Examples of some embodiments are represented, without limitation, in the following clauses:

According to an embodiment, a method comprises: assigning packets received by a network device to packet queues; based on the packet queues, determining when to process specific packets of the packets received by the network device, the packets dequeued from the packet queues when processed; tracking a delay associated with a particular packet queue of the packet queues, the delay based on a duration of time for which a designated marker packet has been in the particular packet queue, another packet being designated as the marker packet whenever the currently designated marker packet departs from the queue; when the delay exceeds an expiration threshold, marking the particular packet queue as expired; while the particular packet queue is marked as expired, dropping one or more packets assigned to the particular packet queue, including the designated packet.

According to an embodiment, an apparatus comprises: one or more network interfaces configured to receive packets over one or more networks; a packet processor configured to assigning the packets to packet queues; traffic management logic configured to: based on the packet queues, determining when to process specific packets of the received packets, the packets dequeued from the packet queues when processed; track a delay associated with a particular packet queue of the packet queues, the delay based on a duration of time for which a currently designated marker packet has been in the particular packet queue, another packet being designated as the marker packet whenever the currently designated marker packet departs form the queue; and when the delay exceeds a monitoring threshold, performing one or more delay-based actions with respect to the particular packet.

According to an embodiment, an apparatus comprises: one or more network interfaces configured to receive packets over one or more networks; a packet processor configured to assigning the packets to packet queues; a traffic manager configured to: based on the packet queues, determining when to process specific packets of the received packets, the packets dequeued from the packet queues when processed; track a delay associated with a particular packet queue of the packet queues, the delay based on a duration of time for which a currently designated marker packet has been in the particular packet queue, another packet being designated as the marker packet whenever the currently designated marker packet departs form the queue; and when the delay exceeds a monitoring threshold, associating one or more packets departing from the particular packet queue with a tag indicating that the monitoring threshold has been surpassed; a visibility subsystem configured to, based on the tag and the one or more packets, perform one or more of: changing one or more settings of the apparatus, storing copies of the one or more packets in a log or data buffer, updating packet statistics, or sending copies the one or more packets to an external device for analysis.

According to an embodiment, a method comprises: assigning packets received by a network device to packet queues; based on the packet queues, determining when to process specific packets of the packets received by the network device, the packets dequeued from the packet queues when processed; tracking a delay associated with a particular packet queue of the packet queues, the delay based on a duration of time for which a currently designated marker packet has been in the particular packet queue, another packet being designated as the marker packet whenever the currently designated marker packet departs form the queue; when the delay exceeds a monitoring threshold, annotating one or more packets departing from the particular packet queue with a tag indicating that the monitoring threshold has been surpassed; sending copies of the one or more packets that were annotated with the tag to a first component configured to, based on the tag and the one or more packets, perform one or more of: changing one or more settings of the network device, updating packet statistics for the network device, or storing copies of the one or more packets in a log or data buffer.

In an embodiment, the apparatus or network device is a network switch. In an embodiment, the packets are one of: cells, frames, IP packets, or TCP segments.

In an embodiment, the particular packet is not designated as the marker packet.

In an embodiment, the visibility subsystem is configured to update packet statistics, the packet statistics including one or more of: a number of packets from a given source, a number of packets to a given destination, a number of packets having a particular priority, a number of packets having a particular forwarding tag, or a number of packets with a particular packet attribute.

In an embodiment, changing one or more settings comprises overriding one or both of: a flow control feature or a traffic shaper feature for the particular packet queue.

In an embodiment, the traffic manager is further configured to, or the method further comprises, comparing the delay to a deadline profile associated with the particular packet queue, the deadline profile indicating multiple different deadlines, including the monitoring threshold, each associated with a different delay-based action.

In an embodiment, the traffic manager is configured to, or the method comprises, tracking the delay without tracking enqueue timestamps for one or more packets in the particular packet queue.

In an embodiment, tracking the delay comprises recording the delay in a memory or register and updating the recorded delay whenever a packet is dequeued from the particular packet queue, wherein the traffic manager is configured to update recorded delays for different packet queues using a recurring background process that updates only a fraction of the packet queues per each clock cycle of the network device.

In an embodiment, tracking the delay is performed without tracking enqueue timestamps for more than two packets in the particular packet queue, the two packets being the packet at the tail of the particular packet queue and the marker packet.

In an embodiment, the traffic manager is further configured to, or the method further comprises: designating a first packet assigned to the particular packet queue as the marker packet; responsive to the first packet departing the queue, designate a second packet assigned to the particular packet queue as the marker packet, wherein the second packet is not at the head of the particular packet queue.

In an embodiment, the second packet is at the tail of the particular packet queue. In an embodiment, the packet queues are first-in-first-out queues.

In an embodiment, the traffic manager is further configured to, or the method further comprises, annotating the one or more packets with information pertaining to the particular packet queue, the annotated information including at least one or more of a size of the delay, a timestamp associated with the departing one or more packets, a queue id, a device id, a queue size, a buffer size, or a congestion indicator.

In an embodiment, the apparatus is further configured to, or the method further comprises, annotating the one or more packets with information indicating a size of the delay.

In an embodiment, the apparatus is further configured to, or the method further comprises, tracking multiple marker packets within the particular packet queue, wherein a second set of packets assigned to the particular packet queue are not designated as marker packets.

In an embodiment, the monitoring threshold is specific to the particular packet queue, wherein other packet queues have different monitoring thresholds.

In an embodiment, the apparatus is further configured to, or the method further comprises, determining whether to enforce the monitoring threshold on the particular packet queue based on a queue monitoring flag specific to the particular packet queue.

According to an embodiment, an apparatus comprises: one or more network interfaces configured to receive packets over one or more networks; a packet processor configured to assign the packets to packet queues; a traffic manager configured to: based on the packet queues, determine when to process specific packets of the packets, the packets dequeued from the packet queues when processed; track a delay associated with a particular packet queue of the packet queues, the delay based on a duration of time for which a designated marker packet has been in the particular packet queue, another packet being designated as the marker packet whenever the currently designated marker packet departs from the queue; when the delay exceeds an expiration threshold, mark the particular packet queue as expired; while the particular packet queue is marked as expired, drop one or more packets assigned to the particular packet queue, including the designated packet.

According to an embodiment, a method comprises: receiving, at a network device, packets over one or more networks; assigning the packets to packet queues; based on the packet queues, determining when to process specific packets of the packets, the packets dequeued from the packet queues when processed; tracking a delay associated with a particular packet queue of the packet queues, the delay based on a duration of time for which a designated marker packet has been in the particular packet queue, another packet being designated as the marker packet whenever the currently designated marker packet departs from the queue; when the delay exceeds an expiration threshold, marking the particular packet queue as expired; while the particular packet queue is marked as expired, dropping one or more packets assigned to the particular packet queue, including the designated packet.

In an embodiment, the apparatus or network device is a network switch. In an embodiment, the packets are one of: cells, frames, IP packets, or TCP segments.

In an embodiment, the particular packet is not designated as the marker packet.

In an embodiment, dropping the one or more packets comprises dropping packets from the head of the particular packet queue until the queue is empty, the particular packet queue marked as unexpired upon completion of the dropping. In an embodiment, dropping the one or more packets comprises dropping packets from the head of the queue until at least the currently designated marker packet is dropped, the particular packet queue marked as unexpired upon determining that the delay of the particular packet queue no longer exceeds the threshold.

In an embodiment, dropping a given packet comprises disposing of the given packet without forwarding the given packet to an intended destination identified by the given packet. In an embodiment, dropping the one or more packets comprises dropping first packets assigned to the queue before the first packets are added to the queue.

In an embodiment, the traffic manager is further configured to, or the method further comprises, tracking the delay without tracking enqueue timestamps for one or more packets in the particular packet queue.

In an embodiment, tracking the delay is performed without tracking enqueue timestamps for more than two packets in the particular packet queue, the two packets being the packet at the tail of the particular packet queue and the marker packet.

In an embodiment, tracking the delay comprises recording the delay in a memory or register and updating the recorded delay whenever a packet is dequeued from the particular packet queue.

In an embodiment, the traffic manager is further configured to, or the method further comprises, updating recorded delays for different packet queues using a recurring background process that updates only a fraction of the packet queues per each clock cycle of the network device.

In an embodiment, the traffic manager is further configured to, or the method further comprises: designating a first packet assigned to the particular packet queue as the marker packet; responsive to the first packet departing the queue, designating a second packet assigned to the particular packet queue as the marker packet, wherein the second packet is not at the head of the particular packet queue.

In an embodiment, the second packet is at the tail of the particular packet queue. In an embodiment, the packet queues are first-in-first-out queues.

In an embodiment, the traffic manager is further configured to, or the method further comprises, sending the one or more packets that are dropped to a reporting component.

In an embodiment, the traffic manager is further configured to, or the method further comprises, annotating the one or more packets that are dropped with information pertaining to the particular packet queue, the annotated information including at least one or more of the delay, a timestamp associated with dropping the one or more packets, a queue id, a device id, a queue size, a buffer size, or a congestion indicator.

In an embodiment, the traffic manager is further configured to, or the method further comprises, while the particular packet queue is expired, overriding one or both of: a flow control feature or a traffic shaper feature for the particular packet queue.

In an embodiment, the traffic manager is further configured to, or the method further comprises, tracking multiple marker packets within the particular packet queue, wherein a second set of packets assigned to the particular packet queue are not designated as marker packets.

In an embodiment, the expiration threshold is specific to the particular packet queue, wherein other packet queues have different expiration thresholds.

In an embodiment, the traffic manager is further configured to, or the method further comprises, determining whether to enforce the expiration threshold on the particular packet queue based on a queue expiration flag specific to the particular packet queue, wherein the traffic manager is configured not to enforce the expiration threshold on a packet that is marked as ineligible for expiration.

According to an embodiment, an apparatus comprises: one or more network interfaces configured to receive packets over one or more networks; a packet processor configured to: assign the packets to packet queues; responsive to a failure to add a particular packet to a particular packet queue to which the particular packet was assigned, designate a queue forensics feature of the particular packet queue as active; traffic management logic configured to: based on the packet queues, determine when to process specific packets of the received packets, the packets dequeued from the packet queues when processed; while the queue forensics feature of the particular packet queue is designated as active, annotate one or more packets departing from the particular packet queue with a tag indicating that a drop event occurred with respect to the particular packet queue while the one or more packets were in the particular packet queue; deactivate the queue forensics feature when a first packet in the particular packet queue has been dequeued from the particular packet queue; a visibility subsystem configured to, based on the tag and the one or more packets, perform one or more of: changing one or more settings of the apparatus, storing copies of the one or more packets in a log or data buffer, updating packet statistics, or sending copies the one or more packets to an external device for analysis.

According to an embodiment, a method comprises: assigning packets received by a network device to packet queues; based on the packet queues, determining when to process specific packets of the packets received by the network device, the packets dequeued from the packet queues when processed; responsive to a failure to add a particular packet to a particular packet queue to which the particular packet was assigned, designating a queue forensics feature of the particular packet queue as active until a first packet in the particular packet queue has been dequeued from the particular packet queue; while the queue forensics feature of the particular packet queue is designated as active, annotating one or more packets departing from the particular packet queue with a tag indicating that a drop event occurred with respect to the particular packet queue while the one or more packets were in the particular packet queue; sending copies of the one or more packets that were annotated with the tag to a first component configured to, based on the tag and the one or more packets, perform one or more of: changing one or more settings of the apparatus, storing copies of the one or more packets in a log or data buffer, or updating packet statistics.

In an embodiment, the apparatus or network device is a network switch. In an embodiment, the packets are one of: cells, frames, IP packets, or TCP segments.

In an embodiment, the traffic manager is configured to, or the method further comprises, recording an identifier of the first packet in metadata associated with the particular packet queue.

In an embodiment, the traffic manager is configured to, or the method further comprises, selecting the first packet because the first packet is at the tail of the particular packet queue. In an embodiment, the packet queues are first-in-first-out queues.

In an embodiment, the packet processor is configured to, or the method further comprises, reassigning the particular packet to a visibility queue, the visibility subsystem configured to process packets in the visibility queue. In an embodiment, the packet processor is configured to truncate the particular packet before assigning the particular packet to the visibility queue.

In an embodiment, wherein the traffic manager is further configured to, or the method further comprises, forwarding copies of the one or more packets to one or more visibility queues processed by the visibility subsystem, the one or more packets associated with the with the particular packet. In an embodiment, the traffic manager is further configured to, or the method further comprises, annotating the particular packet with a drop event identifier, the one or more packets also annotated with the drop event identifier. In an embodiment, the copies are partial copies including only portions of the one or more packets.

In an embodiment, traffic manager is further configured to, or the method further comprises, annotating the one or more packets with information pertaining to the particular packet queue.

In an embodiment, the traffic manager is further configured to, or the method further comprises, annotating the one or more packets with information associated with the particular packet queue, the annotated information including at least one or more of a delay calculated based on a marker packet within the particular packet queue, a timestamp associated with the drop event, a queue id, a device id, a queue size, a buffer size, or a congestion indicator.

In an embodiment, the packet processor is further configured to, or the method further comprises, enabling the queue forensics feature on the particular packet queue based on a drop visibility monitoring flag specific to the particular packet queue. In an embodiment, the packet processor is further configured to, or the method further comprises, enabling the queue forensics feature on the particular packet queue only at times indicated by a probabilistic sampling function or a rate-aware sampling function.

According to an embodiment, an apparatus comprises: one or more memories and/or registers storing at least: queue data describing a queue of data units, the queue having a head from which data units are dequeued and a tail to which data units are enqueued; a first marker identifier that identifies a data unit, currently within the queue, that has been designated as a first marker; a first marker timestamp that identifies a time at which the data unit designated as the first marker was enqueued; a second marker identifier that identifies a data unit, currently within the queue, that has been designated as a second marker; a second marker timestamp that identifies a time at which the data unit designated as the first marker was enqueued; and a queue delay; queue management logic, coupled to the one or more memories and/or registers, configured to: whenever a data unit that is currently designated as the first marker is dequeued from the head of the queue, set the first marker identifier to the second marker identifier and the first marker timestamp to the second marker timestamp; when a new data unit is added to the tail of the queue, update the second marker timestamp to reflect a time at which the new data unit was enqueued and the second marker identifier to identify the new data unit as the second marker; and repeatedly update the queue delay based on a difference between a current time and the first marker timestamp.

According to an embodiment, a method comprises: storing queue data describing a queue of data units, the queue having a head from which data units are dequeued and a tail to which data units are enqueued; storing a first marker identifier that identifies a data unit, currently within the queue, that has been designated as a first marker; storing a first marker timestamp that identifies a time at which the data unit designated as the first marker was enqueued; storing a second marker identifier that identifies a data unit, currently within the queue, that has been designated as a second marker; storing a second marker timestamp that identifies a time at which the data unit designated as the first marker was enqueued; whenever a data unit that is currently designated as the first marker is dequeued from the head of the queue, setting the first marker identifier to the second marker identifier and the first marker timestamp to the second marker timestamp; when a new data unit is added to the tail of the queue, updating the second marker timestamp to reflect a time at which the new data unit was enqueued and the second marker identifier to identify the new data unit as the second marker; storing a queue delay; repeatedly updating the queue delay based on a difference between a current time and the first marker timestamp.

In an embodiment, the queue management logic is further configured to, or the method further comprises, updating the second marker identifier and second marker timestamp whenever a new data unit is added to the tail of the queue to designate the new data unit as the second marker.

In an embodiment, repeatedly updating the queue delay comprises updating the queue delay whenever a data unit is dequeued from the queue. In an embodiment, repeatedly updating the queue delay comprises executing a background process that updates the queue delay at approximately equal time intervals.

In an embodiment, the apparatus further comprises one or more data unit processors configured to, or the method further comprises, determining when to perform one or more delay-based actions based on a comparison of one or more corresponding thresholds for the one or more delay-based action to the queue delay.

In an embodiment, the queue management logic is further configured to, or the method further comprises, determining when to expire the queue based on the queue delay, the expiring of the queue including one or more of: dropping data units within the queue, preventing new data units from being added to the queue, disabling a flow control policy for the queue, or disabling a traffic shaping policy for the queue.

In an embodiment, the queue management logic is further configured to, or the method further comprises, determining when to tag data units within the queue for monitoring based on the queue delay.

In an embodiment, the one or more memories and/or registers further store, or the method further comprises storing, multiple marker identifiers for multiple markers in between the first marker and the second marker, and multiple marker timestamps corresponding to the multiple marker identifiers.

In an embodiment, updating the queue delay based on a difference between a current time and the first marker timestamp comprises setting the queue delay to the greater of the difference between a current time and the first marker timestamp and a difference between a dequeue time of a most recently dequeued data unit and the first marker timestamp when the most recently dequeued data unit was dequeued.

In an embodiment, the apparatus is a network switch, the apparatus further comprising one or more communication interfaces coupled to one or more networks via which the data units are received, at least some of the data units being forwarded through the network switch to other devices in the one or more networks. In an embodiment, the method is performed by such an apparatus.

In an embodiment, a method comprises: receiving packets over network interfaces coupled to one or more networks; detecting visibility events associated with certain packets of the particular packets, based on one or more of: packet attributes of the certain packets, one or more states of one or more device resources used while attempting to forward the certain packets to one or more devices, or one or more actions occurring in association with the certain packets while attempting to forward the certain packets to one or more devices; generating visibility packets associated with the visibility events; selecting a sample of the visibility events to report to a visibility subsystem; reporting the sample by forwarding particular visibility packets associated with the visibility events in the sample to the visibility subsystem; at the visibility subsystem, performing one or more of: storing the particular visibility packets, or forwarding the particular visibility packets to an external collector.

In an embodiment, an apparatus comprises: network interfaces configured to receive packets over one or more networks; visibility event monitoring logic configured to detect visibility events associated with certain packets of the particular packets, based on one or more of: packet attributes of the certain packets, one or more states of one or more device resources used while attempting to forward the certain packets to one or more devices, or one or more actions occurring in association with the certain packets while attempting to forward the certain packets to one or more devices, and to generate visibility packets from the certain packets; visibility sampling logic configured to select a sample of the visibility events to report to a visibility subsystem, the sample being reported by forwarding particular visibility packets associated with the visibility events in the sample to the visibility subsystem; said visibility subsystem, configured to perform one or more of: storing the particular visibility packets, or forwarding the particular visibility packets to an external collector.

In an embodiment, the apparatus further comprises: a plurality of packet queues; queue management logic configured to assign particular packets of the packets to particular packet queues of the plurality of packet queues and, based on the packet queues, determine when to process the particular packets with one or more packet processors.

In an embodiment, selecting the sample of the detected visibility events comprises one or more of: selecting which of the packets are eligible to become the visibility packets; selecting which of the packets the visibility event monitoring logic monitors to detect the visibility events; selecting which of the visibility packets generated by the visibility event monitoring logic are to be forwarded to the visibility subsystem; or selecting for which of the detected visibility events to generate the visibility packets.

In an embodiment, the visibility sampling logic comprises a plurality of samplers, wherein a first sampler of the samplers is configured to select a first sample of the visibility packets using first sampling logic, wherein a second sampler of the samplers is configured to select the particular visibility packets from at least the first sample based on second sampling logic.

In an embodiment, the second sampler is an aggregate sampler that is configured to select the particular visibility packets from samples selected by a plurality of samplers.

In an embodiment, each of the plurality of samplers is associated with a different port, different traffic class, or different event type.

In an embodiment, detecting the visibility events includes determining that a given visibility event has occurred with respect to a given packet in response to one or more of: failing to enqueue the given packet in a given one of the packet queues to which the given packet was assigned, dropping the given packet, dequeuing the given packet while a given queue to which the given packet belongs has a queue delay measure above a certain threshold, dequeuing the given packet while the given queue to which the given packet belongs has a queue size measure outside an expected queue size range.

In an embodiment, detecting the visibility events includes determining that a given visibility event has occurred with respect to a given packet in response to determining that a queue growth rate or queue growth acceleration rate surpasses a certain threshold.

In an embodiment, generating the visibility packets comprises tagging the certain packets, or duplicates of the certain packets, with a visibility tag.

In an embodiment, selecting the sample of the visibility events comprises determining whether to sample a given visibility event of the visibility events probabilistically based on an assigned sampling rate.

In an embodiment, selecting the sample of the visibility events comprises determining whether to sample a given visibility event of the visibility events based on a number of available tickets in a ticket box, the apparatus further including replenishment logic configured to replenish the tickets in the ticket box.

In an embodiment, selecting the sample of the visibility events comprises determining whether to sample a given visibility event of the visibility events based on an attribute of a given packet with respect to which the given visibility event was detected.

In an embodiment, selecting the sample of the visibility events comprises determining whether to sample a given visibility event of the visibility events based on whether a given packet with respect to which the given visibility event was detected is associated with a flow for which no other packets have been received within a certain period of time.

In an embodiment, the apparatus further comprises a flow tracking unit configured to track numbers of packets received for flows associated with the certain packets over the certain period of time, wherein the visibility subsystem is configured to correlate the numbers to specific ones of the particular visibility packets.

In an embodiment, the apparatus further comprises pre-sampling logic configured to select an eligible sample of the particular packets that is eligible for the visibility event monitoring logic to monitor, the visibility event monitoring logic configured to ignore events not associated with any packet from the eligible sample.

In an embodiment, visibility packets associated with visibility events other than those in the sample are not forwarded to the visibility subsystem, the visibility events including at least first visibility events not in the sample.

In an embodiment, one or more non-transitory computer-readable storage media store instructions that, when executed by one or more computing devices, cause performance of one or more of the methods described herein, and/or cause implementation of one or more of the apparatuses or systems described herein.

6.0. Implementation Mechanism-Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 8:
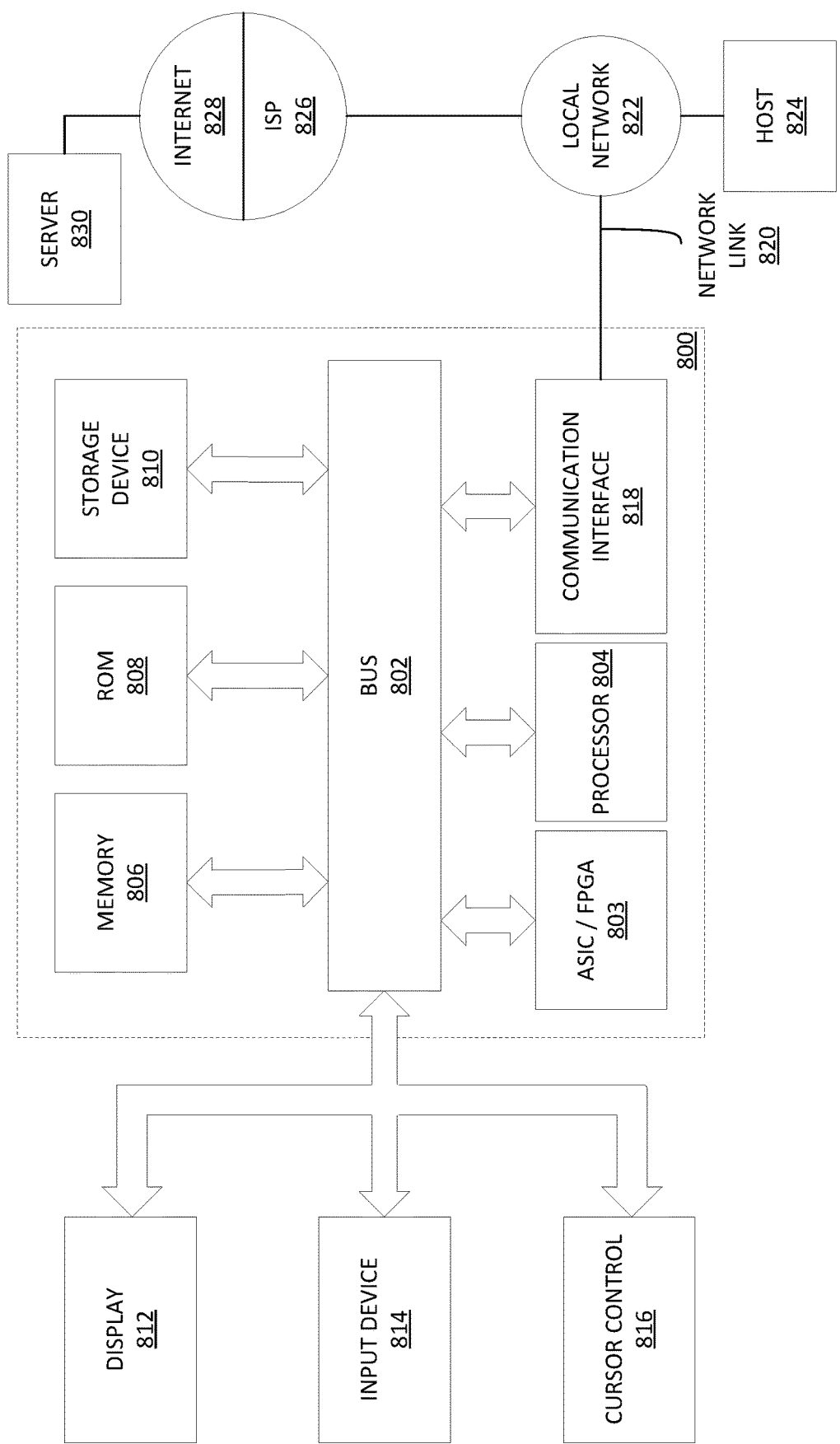
FIG. 8 is block diagram of a computer system upon which embodiments of the inventive subject matter may be implemented.

FIG. 8 is a block diagram that illustrates an example computer system 800 that may be utilized in implementing the above-described techniques, according to an embodiment. Computer system 800 may be, for example, a desktop computing device, laptop computing device, tablet, smartphone, server appliance, computing mainframe, multimedia device, handheld device, networking apparatus, or any other suitable device. In an embodiment, FIG. 8 constitutes a different view of the devices and systems described in previous sections.

Computer system 800 may include one or more ASICs, FPGAs, or other specialized circuitry 803 for implementing program logic as described herein. For example, circuitry 803 may include fixed and/or configurable hardware logic blocks for implementing some or all of the described techniques, input/output (I/O) blocks, hardware registers or other embedded memory resources such as random access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 800 may include one or more hardware processors 804 configured to execute software-based instructions. Computer system 800 may also include one or more busses 802 or other communication mechanism for communicating information. Busses 802 may include various internal and/or external components, including, without limitation, internal processor or memory busses, a Serial ATA bus, a PCI Express bus, a Universal Serial Bus, a HyperTransport bus, an InfiniBand bus, and/or any other suitable wired or wireless communication channel.

Computer system 800 also includes one or more memories 806, such as a RAM, hardware registers, or other dynamic or volatile storage device for storing data units to be processed by the one or more ASICs, FPGAs, or other specialized circuitry 803. Memory 806 may also or instead be used for storing information and instructions to be executed by processor 804. Memory 806 may be directly connected or embedded within circuitry 803 or a processor 804. Or, memory 806 may be coupled to and accessed via bus 802. Memory 806 also may be used for storing temporary variables, data units describing rules or policies, or other intermediate information during execution of program logic or instructions.

Computer system 800 further includes one or more read only memories (ROM) 808 or other static storage devices coupled to bus 802 for storing static information and instructions for processor 804. One or more storage devices 810, such as a solid-state drive (SSD), magnetic disk, optical disk, or other suitable non-volatile storage device, may optionally be provided and coupled to bus 802 for storing information and instructions.

A computer system 800 may also include, in an embodiment, one or more communication interfaces 818 coupled to bus 802. A communication interface 818 provides a data communication coupling, typically two-way, to a network link 820 that is connected to a local network 822. For example, a communication interface 818 may be an integrated services digital network (ISDN) card, cable modem, satellite modem, or a modem to provide a data communication connection to a corresponding type of telephone line. As another example, the one or more communication interfaces 818 may include a local area network (LAN) card to provide a data communication connection to a compatible LAN. As yet another example, the one or more communication interfaces 818 may include a wireless network interface controller, such as a 802.11-based controller, Bluetooth controller, Long Term Evolution (LTE) modem, and/or other types of wireless interfaces. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by a Service Provider 826. Service Provider 826, which may for example be an Internet Service Provider (ISP), in turn provides data communication services through a wide area network, such as the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

In an embodiment, computer system 800 can send messages and receive data through the network(s), network link 820, and communication interface 818. In some embodiments, this data may be data units that the computer system 800 has been asked to process and, if necessary, redirect to other computer systems via a suitable network link 820. In other embodiments, this data may be instructions for implementing various processes related to the described techniques. For instance, in the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. As another example, information received via a network link 820 may be interpreted and/or processed by a software component of the computer system 800, such as a web browser, application, or server, which in turn issues instructions based thereon to a processor 804, possibly via an operating system and/or other intermediate layers of software components.

Computer system 800 may optionally be coupled via bus 802 to one or more displays 812 for presenting information to a computer user. For instance, computer system 800 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 812 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 812.

One or more input devices 814 are optionally coupled to bus 802 for communicating information and command selections to processor 804. One example of an input device 814 is a keyboard, including alphanumeric and other keys. Another type of user input device 814 is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Yet other examples of suitable input devices 814 include a touch-screen panel affixed to a display 812, cameras, microphones, accelerometers, motion detectors, and/or other sensors. In an embodiment, a network-based input device 814 may be utilized. In such an embodiment, user input and/or other information or commands may be relayed via routers and/or switches on a Local Area Network (LAN) or other suitable shared network, or via a peer-to-peer network, from the input device 814 to a network link 820 on the computer system 800.

As discussed, computer system 800 may implement techniques described herein using customized hard-wired logic, one or more ASICs or FPGAs 803, firmware and/or program logic, which in combination with the computer system causes or programs computer system 800 to be a special-purpose machine. According to one embodiment, however, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 800 can receive the data on the network and demodulate the signal to decode the transmitted instructions. Appropriate circuitry can then place the data on bus 802. Bus 802 carries the data to main memory 806, from which processor 804 retrieves and executes the instructions. The instructions received by main memory 806 may optionally be stored on storage device 810 either before or after execution by processor 804.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus, comprising:
 a plurality of network interfaces configured to receive a plurality of packets over one or more networks;
 a plurality of pre-event samplers configured to sample packets of the plurality of packets and, based on sampling criteria, tag certain packets as visibility-eligible, the plurality of pre-event samplers are arranged hierarchically;
 a queue manager configured to assign the plurality of packets to packet queues;
 one or more visibility event monitors configured to generate visibility packets comprising information associated with the certain packets that have been tagged as visibility-eligible and forward the visibility packets to a visibility subsystem;
 a packet processor configured to process particular packets of the plurality of packets in the packet queues and forward the particular packets to destinations indicated by the particular packets.

2. The apparatus of claim 1, wherein one or more aggregating samplers sample packets received from pre-event samplers in the hierarchy.

3. The apparatus of claim 1, wherein one or more aggregating samplers sample packets received from pre-event samplers in the hierarchy to remove duplicate packets.

4. The apparatus of claim 1, wherein one or more aggregating samplers sample packets received from pre-event samplers in the hierarchy, and wherein the one or more aggregating samplers insert tags into the certain packets.

5. The apparatus of claim 1, and wherein pre-event samplers are dynamically coupled to other pre-event samplers to form a hierarchy.

6. A method, comprising:
 receiving a plurality of packets at a plurality of network interfaces of a network apparatus over one or more networks;
 sampling packets of the plurality of packets using a plurality of pre-event samplers and, based on sampling criteria, tagging certain packets of the plurality of packets as visibility-eligible, the plurality of pre-event samplers are arranged hierarchically;
 assigning the plurality of packets to packet queues;
 generating visibility packets comprising information associated with the certain packets that have been tagged as visibility-eligible;
 forwarding the visibility packets to a visibility subsystem;
 processing particular packets of the plurality of packets in the packet queues;
 forwarding the particular packets to destinations indicated by the particular packets.

7. The method of claim 6, further comprising:
 sampling packets received from pre-event samplers in the hierarchy using one or more aggregating samplers.

8. The method of claim 6, further comprising:
 sampling packets received from pre-event samplers in the hierarchy using one or more aggregating samplers; and
 removing duplicate packets by the one or more aggregating samplers.

9. The method of claim 6, further comprising:
 sampling packets received from pre-event samplers in the hierarchy using one or more aggregating samplers; and
 inserting tags into the certain packets by the one or more aggregating samplers.

10. The method of claim 6, further comprising:
 dynamically coupling pre-event samplers to other pre-event samplers to form a hierarchy.

11. One or more non-transitory computer-readable media storing instructions that, when executed by one or more computing devices, cause:
 receiving a plurality of packets at a plurality of network interfaces of a network apparatus over one or more networks;
 sampling packets of the plurality of packets using a plurality of pre-event samplers and, based on sampling criteria, tagging certain packets of the plurality of packets as visibility-eligible, the plurality of pre-event samplers are arranged hierarchically;
 assigning the plurality of packets to packet queues;
 generating visibility packets comprising information associated with the certain packets that have been tagged as visibility-eligible;

forwarding the visibility packets to a visibility subsystem;

processing particular packets of the plurality of packets in the packet queues;

forwarding the particular packets to destinations indicated by the particular packets.

12. The one or more non-transitory computer-readable media of claim 11, wherein the instructions that, when executed by the one or more computing devices, further cause:

sampling packets received from pre-event samplers in the hierarchy using one or more aggregating samplers; and inserting tags into the certain packets by the one or more aggregating samplers.

13. The one or more non-transitory computer-readable media of claim 11, wherein the instructions that, when executed by the one or more computing devices, further cause:

sampling packets received from pre-event samplers in the hierarchy using one or more aggregating samplers.

14. The one or more non-transitory computer-readable media of claim 11, wherein the instructions that, when executed by the one or more computing devices, further cause:

sampling packets received from pre-event samplers in the hierarchy using one or more aggregating samplers; and removing duplicate packets by the one or more aggregating samplers.

15. The one or more non-transitory computer-readable media of claim 11, wherein the instructions that, when executed by the one or more computing devices, further cause:

dynamically coupling pre-event samplers to other pre-event samplers to form a hierarchy.

* * * * *